United States Patent
Tokuchi

(10) Patent No.: US 10,712,981 B2
(45) Date of Patent: Jul. 14, 2020

(54) INFORMATION PROCESSING DEVICE AND NON-TRANSITORY COMPUTER READABLE MEDIUM

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/581,794

(22) Filed: Sep. 25, 2019

(65) Prior Publication Data

US 2020/0019356 A1 Jan. 16, 2020

Related U.S. Application Data

(63) Continuation of application No. 15/960,563, filed on Apr. 24, 2018, now Pat. No. 10,437,532.

(30) Foreign Application Priority Data

Sep. 11, 2017 (JP) .................. 2017-174219

(51) Int. Cl.
*G06F 3/12* (2006.01)
*H04L 12/58* (2006.01)
*H04L 12/24* (2006.01)

(52) U.S. Cl.
CPC .......... *G06F 3/1231* (2013.01); *G06F 3/1204* (2013.01); *G06F 3/1205* (2013.01); *G06F 3/1232* (2013.01); *G06F 3/1275* (2013.01); *G06F 3/1285* (2013.01); *H04L 41/22* (2013.01); *H04L 51/02* (2013.01)

(58) Field of Classification Search
CPC .... G06F 3/1231; G06F 3/1204; G06F 3/1275; G06F 3/1232; G06F 3/1205; G06F 3/1285; H04L 41/22; H04L 51/02
USPC ....................................... 358/1.15
See application file for complete search history.

(56) References Cited

U.S. PATENT DOCUMENTS

| | | | | |
|---|---|---|---|---|
| 2015/0074554 | A1* | 3/2015 | Sasaki .................. | G06F 3/0481 715/753 |
| 2015/0178388 | A1* | 6/2015 | Winnemoeller .... | H04L 12/1827 707/722 |
| 2016/0182709 | A1* | 6/2016 | Kim ...................... | H04W 4/14 455/556.2 |
| 2016/0182854 | A1* | 6/2016 | Suzuki .................. | H04N 7/147 348/14.07 |
| 2016/0253083 | A1* | 9/2016 | Lee ...................... | G06F 3/04847 715/771 |
| 2018/0240458 | A1* | 8/2018 | Zass ...................... | G09B 19/04 |

* cited by examiner

*Primary Examiner* — Allen H Nguyen
(74) *Attorney, Agent, or Firm* — JCIPRNET

(57) ABSTRACT

An information processing device includes a controller that controls a notification of a linkage function which is executable by using at least one object to be linked when a user transmits information of the object to be linked to a conversation partner on an interface for making a conversation with the conversation partner.

16 Claims, 39 Drawing Sheets

FIG.6

<DEVICE FUNCTION MANAGEMENT TABLE>

| DEVICE ID | DEVICE NAME (TYPE) | FUNCTION | IMAGE ID |
|---|---|---|---|
| A | PC | DISPLAYING FUNCTION, SAVING FUNCTION ··· | ··· |
| B | MULTIFUNCTION MACHINE | PRINTING FUNCTION, SCANNING FUNCTION, COPYING FUNCTION, FAXING FUNCTION, POST-PROCESSING FUNCTION ··· | ··· |
| C | PROJECTOR | PROJECTING FUNCTION ··· | ··· |
| ··· | ··· | ··· | ··· |

FIG.7

<LINKAGE FUNCTION MANAGEMENT TABLE>

| DEVICE ID COMBINATION | DEVICE NAME (TYPE) | LINKAGE FUNCTION |
|---|---|---|
| A, B | PC A, MULTIFUNCTION MACHINE B | SCANNING TRANSMITTING FUNCTION |
| | | PRINTING FUNCTION |
| A, C | PC A, PROJECTOR C | PROJECTING FUNCTION |
| | | PRINTING FUNCTION |
| B, C | MULTIFUNCTION MACHINE B, PROJECTOR C | PROJECTING FUNCTION |
| | | PRINTING FUNCTION |
| ··· | ··· | ··· |

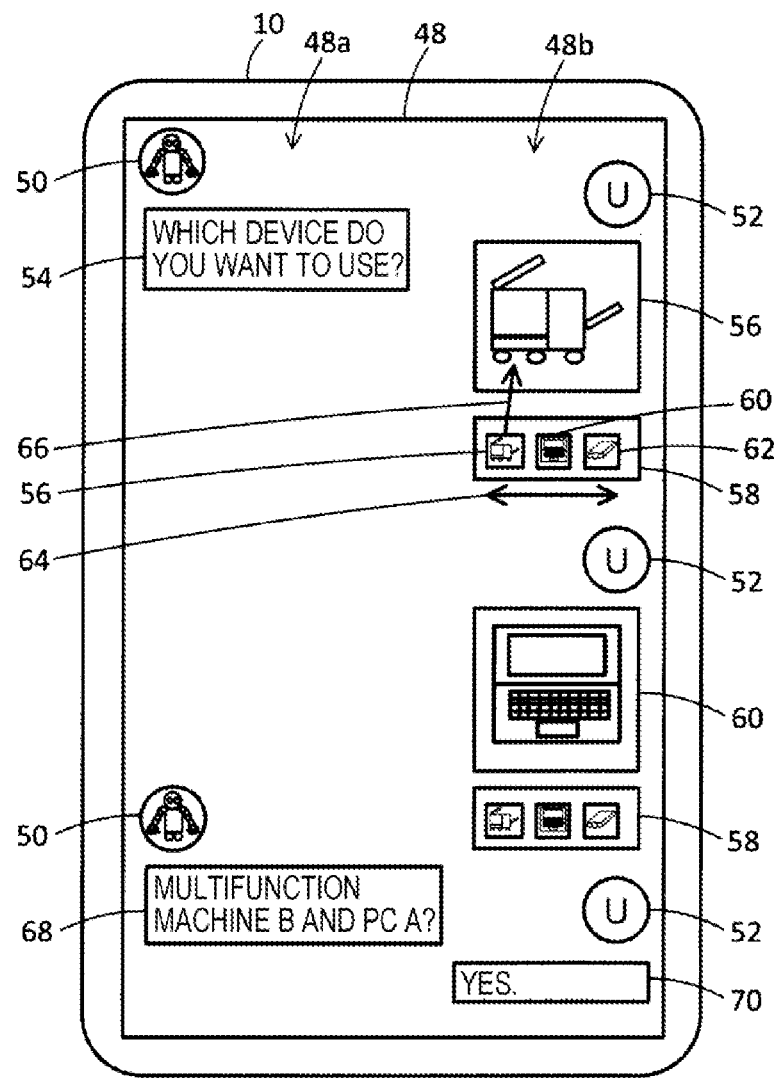

FIG.15

<LINKAGE FUNCTION MANAGEMENT TABLE>

| DEVICE ID COMBINATION | DEVICE NAME (TYPE) | LINKAGE FUNCTION | ACCESS ORDER | PRIORITY |
|---|---|---|---|---|
| A, B | PC A, MULTIFUNCTION MACHINE B | SCANNING TRANSMITTING FUNCTION | B→A | 1 |
| | | | A→B | 2 |
| | | PRINTING FUNCTION | A→B | 1 |
| | | | B→A | 2 |
| A, C | PC A, PROJECTOR C | PROJECTING FUNCTION | A→C | 1 |
| | | | C→A | 2 |
| | | ... | C→A | 1 |
| | | | A→C | 2 |
| ... | ... | ... | ... | ... |

FIG. 18
<DEVICE FUNCTION MANAGEMENT TABLE>
| DEVICE ID | DEVICE NAME (TYPE) | POSITION IN IMAGE | FUNCTION | IMAGE ID |
|---|---|---|---|---|
| A | PC | ... | SCREEN DISPLAYING FUNCTION | ... |
|   |    | ... | DATA SAVING FUNCTION |   |
|   |    | ... | ... |   |
| B | MULTIFUNCTION MACHINE | ... | PRINTING FUNCTION | ... |
|   |    | ... | SCANNING FUNCTION |   |
|   |    | ... | STAPLING FUNCTION |   |
|   |    | ... | ... |   |
| ... | ... | ... | ... | ... |
FIG. 19A
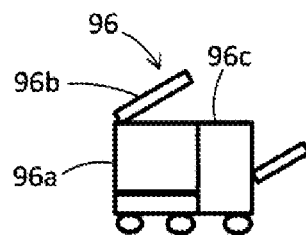
FIG. 19B
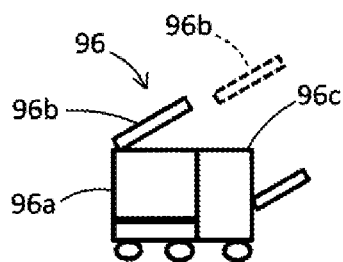

FIG.23

<DEVICE FUNCTION MANAGEMENT TABLE>

| DEVICE ID | DEVICE NAME (TYPE) | PORTION | PORTION ID | FUNCTION | PORTION IMAGE ID |
|---|---|---|---|---|---|
| A | PC | | Aa | SCREEN DISPLAYING FUNCTION | ... |
| | | MAIN BODY PORTION | Ab | DATA SAVING FUNCTION | ... |
| | | ... | ... | ... | ... |
| B | MULTIFUNCTION MACHINE | MAIN BODY PORTION | Ba | PRINTING FUNCTION | ... |
| | | READING UNIT | Bb | SCANNING FUNCTION | ... |
| | | POST-PROCESSING DEVICE | Bc | STAPLING FUNCTION | ... |
| | | ... | ... | ... | ... |
| C | PROJECTOR | MAIN BODY PORTION | Ca | PROJECTING FUNCTION | ... |
| | | ... | ... | ... | ... |
| ... | ... | ... | ... | ... | ... |

FIG.24

<LINKAGE FUNCTION MANAGEMENT TABLE>

| COMBINATION OF PORTIONS OF DEVICES | PORTION ID COMBINATION | LINKAGE FUNCTION |
|---|---|---|
| DISPLAY UNIT OF PC A, MAIN BODY PORTION OF MULTIFUNCTION MACHINE B | Aa, Ba | PRINTING FUNCTION |
| | ... | ... |
| MAIN BODY PORTION OF MULTIFUNCTION MACHINE B, MAIN BODY PORTION OF PROJECTOR C | Ba, Ca | PRINTING FUNCTION |
| | ... | ... |
| READING UNIT OF MULTI-FUNCTION MACHINE B, MAIN BODY PORTION OF PROJECTOR C | Bb, Ca | SCANNING PROJECTING FUNCTION |
| | ... | ... |

FIG.26

<LINKAGE FUNCTION MANAGEMENT TABLE>

| FUNCTION ID COMBINATION | FUNCTION NAME (TYPE) | LINKAGE FUNCTION |
|---|---|---|
| α, β | DATA TRANSMITTING (α) | ... |
| | PASSWORD SETTING (β) | ... |
| α, γ | DATA TRANSMITTING (α) | ... |
| | SOUND OUTPUTTING (γ) | ... |
| β, γ | PASSWORD SETTING (β) | ... |
| | SOUND OUTPUTTING (γ) | ... |
| ... | ... | ... |

FIG.30

<LINKAGE FUNCTION MANAGEMENT TABLE>

| ID COMBINATION | DEVICE NAME, FUNCTION NAME(TYPE) | LINKAGE FUNCTION |
|---|---|---|
| A, α | PC(A), DATA TRANSMITTING (α) | ... |
| | | ... |
| A, β | PC(A), PASSWORD SETTING (β) | ... |
| | | ... |
| B, α | MULTIFUNCTION MACHINE (B), DATA TRANSMITTING (α) | ... |
| | | ... |
| ... | ... | ... |

*FIG.33*

<LINKAGE FUNCTION MANAGEMENT TABLE>

| COMBINATION OF FILE FORMATS | LINKAGE FUNCTION |
|---|---|
| DOCUMENT FORMAT, TABLE FORMAT | • INSERT TABLE INTO DOCUMENT, • INSERT DOCUMENT INTO TABLE |
| DOCUMENT FORMAT, IMAGE FORMAT | • INSERT IMAGE INTO DOCUMENT, • SUPERIMPOSE DOCUMENT ON IMAGE |
| DOCUMENT FORMAT, VIDEO FORMAT | • INSERT VIDEO INTO DOCUMENT, • INSERT STILL IMAGE INTO DOCUMENT |
| DOCUMENT FORMAT, DOCUMENT FORMAT | • INTEGRATE DOCUMENTS WITH EACH OTHER |
| TABLE FORMAT, TABLE FORMAT | • INTEGRATE TABLES WITH EACH OTHER |
| VIDEO FORMAT, VIDEO FORMAT | • INTEGRATE VIDEOS WITH EACH OTHER |
| SPREADSHEET FORMAT, DOCUMENT FORMAT | • INSERT DOCUMENT INTO PRESENTATION SHEET |
| ... | ... |

INFORMATION PROCESSING DEVICE AND NON-TRANSITORY COMPUTER READABLE MEDIUM

CROSS-REFERENCE TO RELATED APPLICATIONS

The application is a Continuation of U.S. patent application Ser. No. 15/960,563 filed on Apr. 24, 2018, which claims priority under 35 U.S.C. § 119(a) to Japanese Patent Application No. 2017-174219 filed Sep. 11, 2017. The entirety of each of the above mentioned patent applications is hereby incorporated by reference herein and made a part of this specification.

BACKGROUND

Technical Field

The present invention relates to an information processing device and a non-transitory computer readable medium.

SUMMARY

According to an aspect of the invention, an information processing device includes a controller that controls a notification of a linkage function which is executable by using at least one object to be linked when a user transmits information of the object to be linked to a conversation partner on an interface for making a conversation with the conversation partner.

BRIEF DESCRIPTION OF THE DRAWINGS

Exemplary embodiments of the present invention will be described in detail based on the following figures, wherein:

FIG. 6 is a view illustrating a device function management table;
FIG. 7 is a view illustrating a linkage function management table;
FIG. 8 is a view illustrating a screen;
FIG. 15 is a view illustrating a linkage function management table according to Modification 3;
FIG. 18 is a view illustrating a device function management table according to Modification 4;
FIGS. 19A and 19B are views illustrating device images;
FIG. 23 is a view illustrating another example of the device function management table according to Modification 4;
FIG. 24 is a view illustrating a linkage function management table according to Modification 4;
FIG. 26 is a view illustrating a linkage function management table according to a second exemplary embodiment;
FIG. 30 is a view illustrating a linkage function management table according to a third exemplary embodiment;
FIG. 33 is a view illustrating a linkage function management table according to a fourth exemplary embodiment.

DETAILED DESCRIPTION

First Exemplary Embodiment

Figure 1:
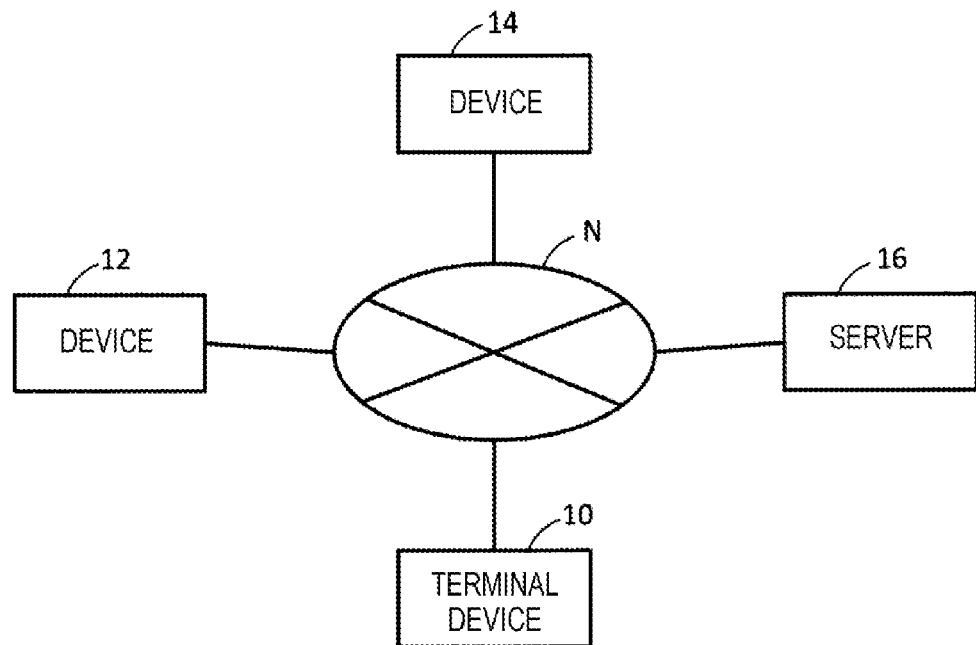
FIG. 1 is a block diagram illustrating a configuration of a device system according to a first exemplary embodiment of the invention.

Descriptions will be made on a device system which is an information processing system according to a first exemplary embodiment of the invention, with reference to FIG. 1. FIG. 1 illustrates an example of the device system according to the first exemplary embodiment.

The device system according to the first exemplary embodiment includes, for example, a terminal device 10, plural devices (for example, devices 12 and 14), and a server 16 which is an example of an external device. In the example illustrated in FIG. 1, the terminal device 10, the devices 12 and 14, and the server 16 have a function of communicating with each other via a communication path N such as a network. The terminal device 10, the devices 12 and 14, and the server 16 may communicate with another device via different communication paths, rather than using the communication path N. In the example illustrated in FIG. 1, the device system includes two devices (the devices 12 and 14). However, the device system may include three or more devices. In addition, the device system may include plural terminal devices 10 or plural servers 16. In addition, the device system may not include the server 16.

The terminal device 10 is a device such as a personal computer (PC), a tablet PC, a smart phone, or a mobile phone, and has a function of transmitting and receiving data with another device. In addition, the terminal device 10 may be a wearable terminal (for example, a wristwatch type terminal, a wristband type terminal, an eyeglass type terminal, a ring type terminal, a contact lens type terminal, an intracorporeal implanting type terminal, or a hearable terminal). The terminal device 10 functions as, for example, a user interface unit (UI unit) when the device is used.

Each of the devices 12 and 14 has a function and is, for example, an image forming device having an image forming function, a PC, a tablet PC, a smart phone, a mobile phone, a robot (for example, a humanoid robot, an animal (other than human) type robot, or another type robot), a projector, a display device such as a liquid crystal display, a recording device, a playback device, an image capturing device such as a camera, a refrigerator, a rice cooker, a microwave oven, a coffee maker, a vacuum cleaner, a washing machine, an air conditioner, a lighting device, a watch, a surveillance camera, an automobile, a motorcycle, an aircraft (for example, an unmanned aircraft (so-called, drone)), a game device, or various sensing devices (for example, a temperature sensor, a humidity sensor, a voltage sensor, or a current sensor). Each of the devices 12 and 14 may be a device that outputs an output to a user (for example, an image forming device or a PC) or a device that outputs no output to the user (for example, a sensing device). In addition, all of plural devices executing a linkage function which will be described later may output an output to the user. Some of the devices may output an output to the user, and the other devices may not output an output to the user. All the devices may not output an output to the user. The concept of the devices 12 and 14 may include all general kinds of devices. For example, the devices according to the present exemplary embodiment may also include an information device, a video device, an audio device, and other devices. In addition, the devices 12 and 14 have a function of transmitting and receiving data with other devices.

The server 16 is a device that manages, for example, data, user information, and the devices 12 and 14. Further, the server 16 has a function of transmitting and receiving data with other devices.

In the terminal device 10, a conversation partner having a function of making a conversation with a user is used. For example, the conversation partner has a function of receiving a message of a user, analyze the content of the message, create a response such as a reply to the message, and provide the response to the user. For example, the user's message is made by character input, voice input, image input or the like. The response such as the reply is made by character output, voice output, image output or the like. The conversation partner is implemented by, for example, executing a program, and the program is installed in, for example, the terminal device 10. In addition, the program for the conversation partner may be installed in an external device such as the server 16 such that the function of the conversation partner may be provided from the external device such as the server 16 to the terminal device 10.

The conversation partner described above is configured with, for example, an automatic response artificial intelligence (AI) implemented by AI. The automatic response AI has a function of analyzing a message content of a user and providing the user with a response such as a reply to the message content. The automatic response AI may be a so-called chatbot (an automatic chatting program using AI). The automatic response AI may have a learning function by AI and have an ability to make a determination similar to a human decision through the learning function. In addition, neural network type deep learning may be used, reinforcement learning or the like for partially reinforcing a learning field may be used, or a genetic algorithm, cluster analysis, a self-organization map, ensemble learning and others may be used. In addition, an AI related technology other than the technologies described above may be used.

When the automatic response AI is used, for example, a notification of a function that each device has or a notification of a linkage function executable by using plural functions is implemented while the user makes a conversation with the automatic response AI. In addition, a process of specifying a function that each device has or a linkage function may be performed by the terminal device 10 or an external device such as the server 16. Hereinafter, it is assumed that the specifying process is performed by the terminal device 10.

Figure 2:
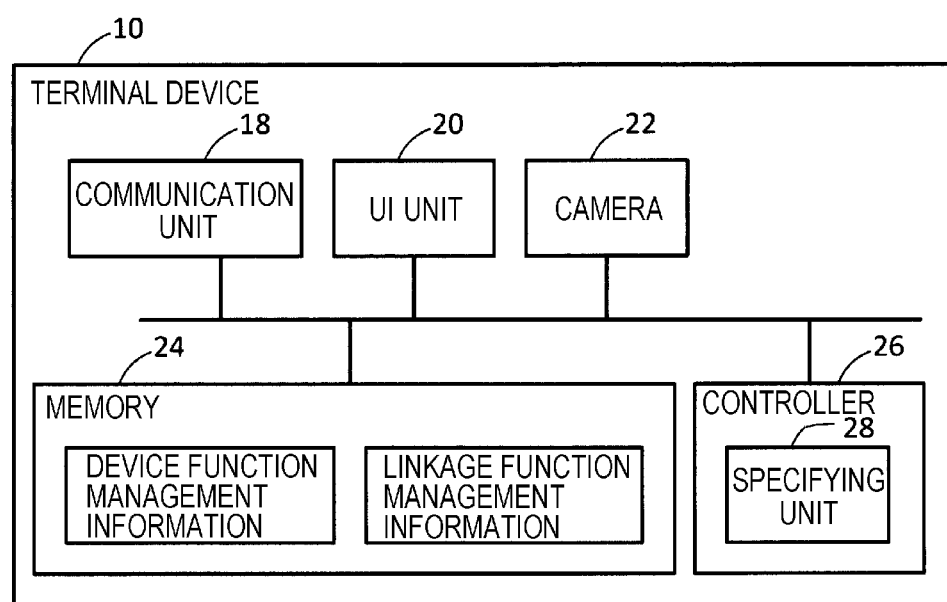
FIG. 2 is a block diagram illustrating a configuration of a terminal device.

Hereinafter, a configuration of the terminal device 10 will be described in detail with reference to FIG. 2.

A communication unit 18 is a communication interface and has a function of transmitting data to another device and a function of receiving data from another device. The communication unit 18 may be a communication interface having a wireless communication function or a communication interface having a wired communication function. For example, the communication unit 18 is compatible with one type or plural types of communication methods and may communicate with a communication partner according to a communication method suitable for the communication partner (that is, a communication method with which the communication partner is compatible). The communication method is, for example, an infrared communication, a visible light communication, a Wi-Fi (registered trademark) communication, or a near-field wireless communication (for example, a near field communication (NFC)). As for the near-field wireless communication, for example, Felica (registered trademark), Bluetooth (registered trademark), or a radio frequency identifier (RFID) is used. Another type of a wireless communication may be used as the near-filed wireless communication. The communication unit 18 may switch a communication method or a frequency band according to, for example, a communication partner or a surrounding environment.

A UI unit 20 is a user interface unit and includes a display unit and an operation unit. The display unit is, for example, a display device such as a liquid crystal display. The operation unit is, for example, an input device such as a touch panel or a keyboard. In addition, the UI unit 20 may be a user interface serving as both the display unit and the operation unit (for example, a touch type display or a device of which display electronically displays a keyboard or the like). In addition, the UI unit 20 may include a sound collecting unit such as a microphone and a sound generating unit such as a speaker. In this case, information may be input to the terminal device 10 by a voice input or information may be output by voice.

The display unit of the UI unit 20 may display, for example, an image captured by a camera, an image associated with a device identified as a device to be used (for example, a device to be used alone or a device to be linked), and an image associated with a function. The image associated with a device may be an image (a still image or a video) representing the device captured by a camera, or an image schematically representing the device (for example, an icon). For example, the image data schematically representing the device may be created by a controller 26 of the terminal device 10, stored in advance in a memory 24 of the terminal device 10, stored in the server 16 to be provided from the server 16 to the terminal device 10, or stored in another device to be provided from the other device to the terminal device 10. The image associated with a function is, for example, an image such as an icon representing the function.

A camera 22 which is an image capturing unit generates image data (for example, still image data or video data) by capturing an object to be captured. The image is displayed on, for example, the display unit of the UI unit 20. The image displayed on the display unit may be operated by the user. In addition, image data obtained by capturing with an external camera may be transmitted to the terminal device 10 via a communication path, and the image may be displayed on the display unit of the UI unit 20. In this case as well, the image may be operated by the user.

The memory 24 is a storage device such as a hard disk or a memory (for example, an SSD). The memory 24 stores, for example, device function management information, linkage function management information, various data, various programs (for example, an operating system (OS), a program (software) for implementing the automatic response AI, and various application programs (application software)), information indicating an address of each device (device address information), information indicating an address of the server 16 (server address information), information on an identified device, information on an identified device to be linked, information on a function that an identified device has, and information on a linkage function. These pieces of information may be stored in different storage devices or in a single storage device. In addition, the program for implementing the automatic response AI may be stored in an external device such as the server 16, such that the program itself may be executed by the external device, and the function of the automatic response AI may be provided from the external device to the terminal device 10. In this case, the program for implementing the automatic response AI may not be stored in the memory 24.

Hereinafter, the device function management information and the linkage function management information will be described.

The device function management information is information for managing the function that each device has, and represents, for example, an association between device identification information (device identification information) for identifying a device and function information indicating the function that the device has. The device identification information is, for example, a device ID, a device name, information indicating a device type, a model number of a device, information for managing a device (for example, an asset management number), information indicating a position where a device is installed (device position information), a device image associated with a device, and address information of a device. The device image is, for example, an external appearance image representing a device. The external appearance image may be an image representing an outer side of a device (for example, a casing of a device), an image representing a state where the casing is opened such that the inside of the device is seen from the outside (for example, the internal structure), or an image representing a state where the device is covered with, for example, a packing sheet. The device image may be an image generated by capturing a device (for example, an image representing the outer side or the inside of a device) or an image emulating a device (for example, an icon). The function information is, for example, a function ID or a function name. For example, in a case where the device 12 is an image forming device and the image forming device has a printing function, a scanning function, and a copying function, the device identification information of the image forming device is associated with, for example, function information indicating the printing function, function information indicating the scanning function, and function information indicating the copying function. The function that each device has is specified (identified) by referring to the device function management information.

A device managed by the device function management information is, for example, a device included in the device system (for example, the device 12 or 14). In addition, a device which is not included in the device system may be managed by the device function management information. For example, the terminal device 10 may acquire information on a new device which is not included in the device system (including the device identification information and the function information), and newly register the information in the device function management information. The information on a device may be acquired by using, for example, the Internet or may be input by, for example, an administrator. In addition, the terminal device 10 may update the device function management information, for example, at any timing, regularly, or at a timing designated by, for example, an administrator. Thus, function information indicating the function that a device did not have before updating but the device has after updating may be registered in the device function management information. Similarly, function information indicating the function that a device did not have before updating but the device has after updating may be deleted from the device function management information or registered as unusable information. Information for the updating may be acquired by using, for example, the Internet or may be input by, for example, an administrator. In addition, the terminal device 10 itself may not acquire the information on a device to perform the generation or updating of the device function management information. An external device such as the server 16 may acquire the information on a device and perform the generation or updating of the device function management information. In this case, the device function management information generated or updated by the external device is transmitted from the external device to the terminal device 10 and stored in the memory 24.

The linkage function management information is information for managing a linkage function which is executed by linking plural functions to each other. One or plural linkage functions is executed by linking plural functions to each other. For example, the linkage function may be a function executable by linking plural functions that a single device (for example, the device 12) has to each other, or a function executable by linking plural functions that plural devices (for example, the devices 12 and 14) have to each other. In addition, the terminal device 10 that makes an operation instruction may also be used as a device to be linked, and the function that the terminal device 10 has may also be used as a portion of the linkage function.

The linkage function may be executed without using hardware devices. For example, the linkage function may be executed by linking plural pieces of software to each other. In addition, the linkage function may be executed by linking the function that a hardware device has and the function implemented by software to each other.

The linkage function management information represents, for example, an association between a combination of pieces of function information indicating respective functions used for a linkage function and linkage function information indicating the linkage function. The linkage function information is, for example, a linkage function ID or a linkage function name. When a single function is updated, the linkage function management information is also updated according to the updating of the single function. Thus, a linkage function by plural functions which are unable to be linked to each other before updating may become usable after updating, or in the meantime, a linkage function which is usable before updating may become unusable after updating. The linkage function information indicating the linkage function which becomes usable after updating is registered in the linkage function management information, and the linkage function information indicating the linkage function which becomes unusable after the updating is deleted from the linkage function management information or registered as unusable information. The updating of the linkage function management information may be performed by the terminal device 10 or an external device such as the server 16. When the updating of the linkage function management information is executed by an external device, the updated linkage function management information is transmitted from the external device to the terminal device 10 and stored in the memory 24.

When plural devices are linked to each other, the linkage function management information is, for example, information for managing a linkage function using plural functions that the plural devices have, and indicates an association between a combination of pieces of device identification information for identifying the respective devices used for the linkage function and the linkage function information. In addition, when a device having plural output functions (a device having plural output functions to output an output to the user) and a sensing device which does not have the output function (a device outputting no output to the user) are linked to each other, the linkage function management information may include information indicating a combination of the specific sensing device and a specific one of the plural output functions. Accordingly, among the plural output functions, an output function to be used in combination with the specific sensing device is specified. As described above, when the device function management information is updated, the linkage function management information is also updated according to the updating of the device function management information. Thus, a linkage function by plural devices which are unable to be linked to each other before updating may become usable after updating, or in the meantime, a linkage function which is usable before updating may become unusable after updating.

The linkage function may be a function executable by linking plural different functions to each other or a function executable by linking identical functions to each other. The linkage function may be a function which is unusable before the linkage. The function which is unusable before the linkage may be a function usable by using identical functions among functions that devices to be linked have or a function usable by combining different functions with each other among functions that devices to be linked have. For example, when a device having the printing function (a printer) and a device having the scanning function (a scanner) are linked to each other, a copying function is implemented as a linkage function. That is, the copying function is implemented by linking the printing function and the scanning function to each other. In this case, the copying function which is a linkage function is associated with the combination of the printing function and the scanning function. For example, in the linkage function management information, linkage function information indicating the copying function as the linkage function is associated with the combination of device identification information for identifying the device having the printing function and device identification information for identifying the device having the scanning function.

The concept of the linkage function may include a coalescing function which executes a new function by linking plural functions or plural devices to each other. For example, an extended displaying function as a coalescing function may be implemented by combining plural displays. As another example, a recording function as a coalescing function may be implemented by combining a television and a recorder. The video recording function may be a function of recording an image displayed on the television. In addition, an image capturing area extension function as a coalescing function may be implemented by combining plural cameras. The extension function is, for example, a function to capture an image by linking the capturing areas of the respective cameras to each other. In addition, a translated call function (a function of translating a conversation via a telephone) as a coalescing function may be implemented by combining a telephone with a translator or translation software. As described above, the concept of the linkage function includes a function which may be implemented by linking identical types of devices or functions to each other, and a function which may be implemented by linking different types of devices or functions to each other.

The controller 26 controls the operation of each unit of the terminal device 10. The controller 26 performs, for example, the control of a communication by the communication unit 18 and a control of information display on the display unit of the UI unit 20. Further, the controller 26 includes a specifying unit 28.

The specifying unit 28 has a function to specify a function that a device designated by the user has or a linkage function executable by using plural devices designated by the user. The specifying unit 28 is implemented by, for example, the automatic response AI. In addition, the specifying unit 28 may be implemented by another program or the like rather than the automatic response AI.

For example, the specifying unit 28 receives device identification information for identifying a device designated by the user, and specifies function information indicating a function associated with the device identification information in the device function management information stored in the memory 24. Accordingly, the function that the device has is specified (identified).

The controller 26 controls a notification (guidance) of the information on the function specified by the specifying unit 28 (for example, function information or function explanation information). As for the notification, the controller 26 may display the information on the function on the display unit of the UI unit 20 or issue the information on the function as voice information by using, for example, a speaker. In addition, the controller 26 may control execution of the function. In addition, the designation of a device by the user may be performed on the screen of the display unit of the UI unit 20 or may be performed by voice. For example, when an image associated with a device is displayed on the screen of the UI unit 20, the user may designate the device by designating the image on the screen. As another example, the user may designate a device by voice, regardless of whether an image associated with the device is displayed on the screen of the UI unit 20. For example, when the user utters a device name by voice, the voice is collected by the sound collecting unit such as a microphone, and voice information indicating the device name is input to the terminal device 10. The specifying unit 28 determines that the device having the device name is designated by the user, and specifies the function of the device. As described above, the operation to designate a device and the notification of a function may be performed either by a display on the screen or by voice. The display on the screen and the voice may be combined with each other. For example, the user may designate an image associated with a device on the screen so as to designate the device, and information indicating the function of the device may be displayed on the screen. As another example, a device may be designated in the manner that the user designates an image associated with the device on the screen, and information indicating the function of the device may be output by voice. As further another example, a device may be designated in the manner that a device name is input as voice information to the terminal device 10, and information indicating the function of the device may be displayed on the screen. As still further another example, a device may be designated in the manner that a device name is input as voice information to the terminal device 10, and information indicating the function of the device may be output by voice.

In addition, the process of specifying a function may be performed by the server 16. In this case, device identification information is transmitted from the terminal device 10 to the server 16, and function information indicating a function associated with the device identification information is specified by the specifying unit 28 provided in the server 16. In addition, when the specifying process is performed by the server 16, the server 16 stores the device function management information. The information on the function is transmitted from the server 16 to the terminal device 10, and may be displayed on the display unit of the UI unit 20 or output as voice information.

In addition, the specifying unit 28 receives pieces of device identification information for identifying respective devices to be linked, and specifies linkage function information indicating a linkage function associated with a combination of the pieces of the device identification information in the linkage function management information stored in the memory 24. Accordingly, the linkage function executable by linking the functions that the respective devices to be linked have with each other is specified (identified). The controller 26 controls a notification (guidance) of the information on the specified linkage function (for example, linkage function information or linkage function explanation information). The controller 26 may display the information on the linkage function on the display unit of the UI unit 20 or issues the information of the linkage function as voice information. In addition, as described above, the designation of the respective devices to be linked may be performed on the screen or by voice.

In addition, the process of specifying a linkage function may be performed by the server 16. In this case, plural pieces of device identification information are transmitted from the terminal device 10 to the server 16, and linkage function information indicating a linkage function associated with the plural pieces of device identification information is specified by the specifying unit 28 provided in the server 16. In addition, when the specifying process is performed by the server 16, the server 16 stores the linkage function management information. The information on the linkage function is transmitted from the server 16 to the terminal device 10, and may be displayed on the display unit of the UI unit 20 or output as voice information.

For example, when a single device is designated, a function that the device has is specified, and when plural devices are designated, a linkage function executable by using the plural devices is specified.

In addition, the specifying unit 28 may receive pieces of function information indicating respective functions used for a linkage function, and specify linkage function information indicating a linkage function associated with a combination of the pieces of the function information in the linkage function management information. Accordingly, the linkage function executable by linking the respective functions to be linked to each other is specified (identified). The specifying process may also be performed by the server 16, and the process result may be displayed on the display unit of the UI unit 20 or output as voice information.

For example, a device is designated in the manner that the user transmits information of the device to the automatic response AI. When the user transmits information of plural devices to the automatic response AI, the specifying unit 28 identifies the plural devices as devices to be linked and specifies a linkage function executable by using the plural devices. In addition, when the user transmits information of a single device to the automatic response AI, the specifying unit 28 identifies the device and specifies a function that the device has. The information of a device is device identification information for identifying the device and is, for example, a device image associated with the device or character information or voice information indicating the device identification information. For example, when the user transmits a device image associated with a device to the automatic response AI, when the user provides the automatic response AI with a character string indicating device identification information of a device by inputting the character string to the terminal device 10, or when the user provides the automatic response AI with device identification information of a device by voice, the specifying unit 28 (the specifying unit 28 implemented by the automatic response AI) identifies the device.

In addition, a function usable by the user (a solo function that a device has or a linkage function) may be managed for each user. This management may be performed by the terminal device 10 or an external device such as the server 16. The function usable by the user is, for example, a function provided to the user for free or a function provided to the user for a charge and purchased by the user. Usable function information indicating a function usable by the user (for example, function purchase history information) may be created and managed for each user. When the management of the usable function is performed by the terminal device 10, the usable function information is stored in the memory 24, and when the management is performed by an external device such as the server 16, the usable function information is stored in the external device. In addition, since the usable function also includes, for example, a function usable for free, an additional updating function, and a function specifically managed by an administrator, the usable function may not be determined simply according to the purchase of a function or not. A process of purchasing a function is performed by an external device such as the server 16.

The usable function management information is information for managing a function usable by each user, and indicates, for example, an association between user identification information for identifying a user and function information (which may include linkage function information) indicating a function usable by the user. As described above, the function usable by the user is, for example, a function provided to the user for free or a function purchased by the user, and may be a single function or a linkage function. The user identification information is, for example, user account information such as a user ID or a name of the user. A function usable by each user is specified (identified)

by referring to the usable function management information. The usable function management information may be updated, for example, each time a function is provided to the user (for example, each time a function is provided to the user for free or for a charge).

When the function usable by the user is managed, the specifying unit 28 may receive the user identification information for identifying the user and specify function information indicating each function associated with the user identification information in the usable function management information (for example, the information stored in the terminal device 10 or the server 16). Accordingly, the function usable by the user is specified (identified). The controller 26 may display the information on the specified function on the display unit of the UI unit 20 or issue the information of the specified function as voice information. For example, the specifying unit 28 receives device identification information and user identification information. Then, the specifying unit 28 specifies function information indicating a function associated with the device identification information in the device function management information, and specifies function information indicating a function associated with the user identification information in the usable function management information. Accordingly, the function usable by the user that is specified by the user identification information is specified as the function that the device specified by the device identification information has.

In addition, the function usable by the user may be specified by an external device such as the server 16. In this case, the user identification information is transmitted from the terminal device 10 to the server 16, and function information indicating each function associated with the user identification information is specified by the specifying unit 28 provided in the server 16. When the specifying process is performed by the server 16, the server 16 stores the usable function management information. The information on each function usable by the user is transmitted from the server 16 to the terminal device 10, and may be displayed on the display unit of the UI unit 20 or output as voice information.

Figure 3:
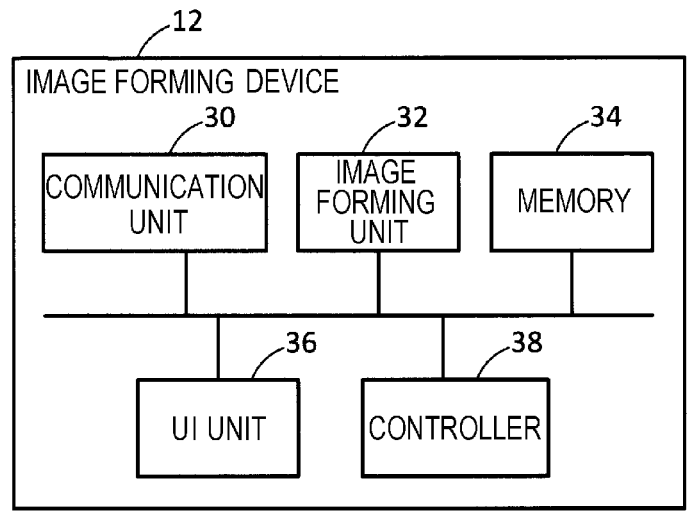
FIG. 3 is a block diagram illustrating a configuration of an image forming device.

Hereinafter, a configuration of the device 12 will be described in detail with reference to FIG. 3. For example, it is assumed that the device 12 is an image forming device. Hereinafter, the device 12 may be referred to as an image forming device 12. FIG. 3 illustrates a configuration of the image forming device 12.

A communication unit 30 is a communication interface and has a function of transmitting data to another device and a function of receiving data from another device. The communication unit 30 may be a communication interface having a wireless communication function or a communication interface having a wired communication function. For example, the communication unit 30 is compatible with one type or plural types of communication methods and may communicate with a communication partner according to a communication method suitable for the communication partner (that is, a communication method with which the communication partner is compatible). The communication method is, for example, an infrared communication, a visible light communication, a Wi-Fi communication, or a near-field wireless communication. For example, the communication unit 30 may switch a communication method or a frequency band according to a communication partner or a surrounding environment.

An image forming unit 32 has an image forming function. Specifically, the image forming unit 32 has at least one of a scanning function, a printing function, a copying function, or a faxing function. When the scanning function is executed, a document is read, and scanned data (image data) is generated. When the printing function is executed, an image is printed on a recording medium such as a paper. When the copying function is executed, a document is read and printed on a recording medium. When the faxing function is executed, image data is transmitted or received by facsimile. In addition, a linkage function using plural functions may be executed. For example, a scanning transmitting function which is a combination of a scanning function and a transmitting function may be executed. When the scanning transmitting function is executed, a document is read so that scanned data (image data) is generated, and transmitted to a transmission destination (for example, an external device such as the terminal device 10). In addition, the linkage function is merely an example, and another linkage function may be executed.

A memory 34 is a storage device such as a hard disk or a memory (for example, an SSD). The memory 34 stores, for example, information indicating an instruction of image formation (for example, job information), image data to be printed, scanned data which is generated by executing the scanning function, device address information indicating an address of another device, information indicating an address of the terminal device 10 (terminal address information), server address information of the server 16, various control data, and various programs. These pieces of information may be stored in different storage devices or in a single storage device.

A UI unit 36 is a user interface unit including a display unit and an operation unit. The display unit is, for example, a display device such as a liquid crystal display. The operation unit is, for example, an input device such as a touch panel or a keyboard. In addition, the UI unit 36 may be a user interface serving as both the display unit and the operation unit (for example, a touch type display or a device of which display electronically displays a keyboard or the like). In addition, the image forming device 12 may not include the UI unit 36, and may include a hardware user interface unit (a hardware UI unit) having no display unit. The hardware UI unit is, for example, a hardware key specialized in input of numerals (for example, a numeric keypad) or a hardware key specialized in indication of directions (for example, direction indication keys).

A controller 38 controls the operation of each unit of the image forming device 12.

Figure 4:
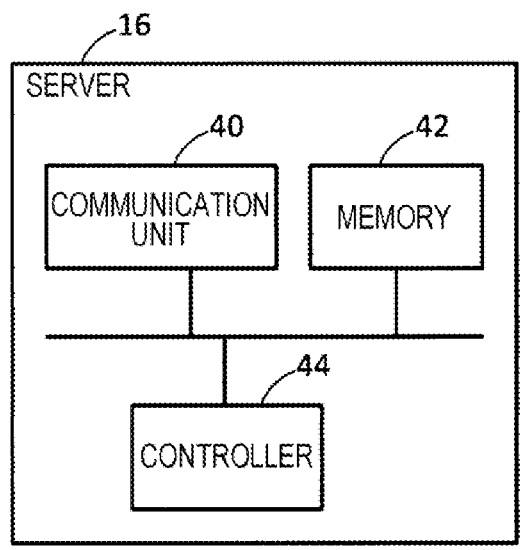
FIG. 4 is a block diagram illustrating a configuration of a server.

Hereinafter, a configuration of the server 16 will be described in detail with reference to FIG. 4. FIG. 4 illustrates a configuration of the server 16.

A communication unit 40 is a communication interface and has a function of transmitting data to another device and a function of receiving data from another device. The communication unit 40 may be a communication interface having a wireless communication function or a communication interface having a wired communication function.

A memory 42 is a storage device such as a hard disk or a memory (for example, an SSD). The memory 42 stores, for example, various data, various programs, address information of the terminal device 10, address information of each device, and server address information of the server 16. These pieces of information may be stored in different storage devices or in a single storage device.

When the function that each device has and the linkage function are managed by the server 16, the above-described device function management information and linkage function management information are stored in the memory 42, such that the device function management information and the linkage function management information may be updated in the server 16. In this case, when the process of specifying a function is performed by the terminal device 10, the device function management information and the linkage function management information (updated information when information is updated) are transmitted from the server 16 to the terminal device 10. The transmission may be performed periodically or at a designated timing. Accordingly, the information stored in the terminal device 10 is updated. In addition, the specifying unit 28 of the terminal device 10 may specify the function that each device has or linkage function by referring to the device function management information and the linkage function management information that are stored in the server 16. In addition, the process of specifying the function may be executed by the server 16.

A controller 44 controls the operation of each unit of the server 16. The controller 44 controls, for example, the communication by the communication unit 40.

The controller 44 may execute the process of purchasing a function and manage the history of the purchase. For example, when the user purchases a paid function, the controller 44 may apply a charging process to the user.

In addition, the controller 44 may execute the functions related to image processing such as a character recognition function, a translation function, an image processing function, and an image forming function. In addition, the controller 44 may execute the function related to a process other than the image processing. When the character recognition function is executed, characters in an image are recognized, and character data indicating the characters is generated. When the translation function is executed, characters in an image are translated into characters expressed in a specific language, and character data indicating the translated characters is generated. When the image processing function is executed, an image is processed. For example, the controller 44 may receive scanned data that has been generated by executing the scanning function from the image forming device 12, and execute the function related to the image processing such as the character recognition function, the translation function, or the image processing function, for the scanned data. The controller 44 may receive image data from the terminal device 10 and execute each function for the image data. For example, the character data or the image data generated by the controller 44 is transmitted from the server 16 to the terminal device 10. The server 16 may be used as an external device, and a linkage function may use functions that plural devices including the server 16 have.

As described above, the device function management information may be stored in the memory 42 of the server 16. In this case, the device function management information may not be stored in the memory 24 of the terminal device 10. Similarly, the linkage function management information may be stored in the memory 42 of the server 16. In this case, the linkage function management information may not be stored in the memory 24 of the terminal device 10. The controller 44 of the server 16 includes the specifying unit 28 described above, and may specify the function that a device has or a linkage function executable by using plural functions, by identifying a device based on the device identification information. In this case, the terminal device 10 may not include the specifying unit 28.

When the usable function management information is created, the usable function management information may be stored in the memory 42 of the server 16. In this case, the usable function management information may not be stored in the memory 24 of the terminal device 10. The controller 26 of the terminal device 10 may manage the history of purchase of a function by the user. In this case, the controller 44 of the server 16 may not have the function of managing the history.

As another example, a device such as the device 12 or 14 may store the device function management information or the linkage function management information, or the device such as the device 12 or 14 may include the specifying unit 28. That is, the process by the specifying unit 28 may be performed by the terminal device 10, a device such as the device 12 or 14, the server 16, or another device.

In the first exemplary embodiment, the device identification information is acquired by applying, for example, the augmented reality (AR) technique so that a device is identified. For example, by applying the AR technique, device identification information of a device used alone is acquired so that the device is identified, and device identification information of devices to be linked is acquired so that the devices to be linked are identified. A known AR technique may be used as the AR technique. For example, a marker AR technique using a marker such as a two-dimensional barcode, a markerless AR technique using an image recognition technique, or a position information AR technique using position information is used. In addition, the device identification information may be acquired without using the AR technique so that a device is identified. For example, when a device is connected to a network, the device may be identified based on an IP address, or device ID may be read so that the device may be identified. In addition, when a device or a terminal device having various wireless communication functions such as an infrared communication, a visible light communication, Wi-Fi, and Bluetooth is used, device ID may be acquired by using the wireless communication functions so that the device is identified.

Figure 5:
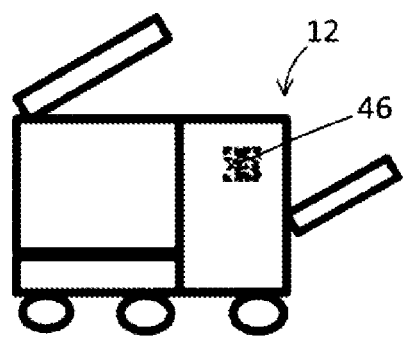
FIG. 5 is a schematic view illustrating the external appearance of the image forming device.

Hereinafter, the process of acquiring device identification information will be described in detail with reference to FIG. 5. As an example, a case where device identification information of the image forming device 12 is acquired will be described. FIG. 5 schematically illustrates the external appearance of the image forming device 12. Here, the process of acquiring device identification information by applying the marker AR technique will be described. A marker 46 such as a two-dimensional barcode is provided on a casing of the image forming device 12. The marker 46 is information obtained by encoding device identification information of the image forming device 12. The user activates the camera 22 of the terminal device 10 and captures the marker 46 provided on the image forming device 12 to be used, using the camera 22. Accordingly, image data representing the marker 46 is generated. The controller 26 of the terminal device 10 extracts the device identification information by applying a decoding process to the marker image represented in the image data. Accordingly, the image forming device 12 to be used (the image forming device 12 having the captured marker 46) is identified. The specifying unit 28 of the terminal device 10 specifies function information indicating a function associated with the extracted device identification information, in the device function management information. Accordingly, the function that the image forming device 12 to be used has is specified (identified).

In addition, the controller 44 of the server 16 may extract the device identification information by applying the decoding process to the image data representing the marker 46. In this case, the image data is transmitted from the terminal device 10 to the server 16, and the decoding process is applied to the image data in the server 16. When the server 16 is provided with the specifying unit 28, the function associated with the device identification information may be specified in the server 16.

The function information indicating the function that the image forming device 12 has may be encoded and included in the marker 46. In this case, when the decoding process is applied to the image data representing the marker 46, the device identification information of the image forming device 12 is extracted, and the function information indicating the function that the image forming device 12 has is also extracted. Accordingly, the image forming device 12 is specified (identified), and the function that the image forming device 12 has is specified (identified). The decoding process may be performed by the terminal device 10 or the server 16.

In addition, device identification information of each of plural devices is acquired by capturing each marker in the plural devices.

For example, when device identification information is acquired by applying the markerless AR technique, the user captures the entire external appearance or a portion of the external appearance of a device to be used (for example, the image forming device 12), with the camera 22 of the terminal device 10. In order to acquire information for specifying a device to be used such as a name (for example, a product name), a model number, or an asset management number, it is helpful to capture the external appearance of the device. By the capturing, external appearance image data representing the entire external appearance or a portion of the external appearance of the device to be used is generated. The controller 26 of the terminal device 10 identifies the device to be used based on the external appearance image data. For example, the memory 24 of the terminal device 10 stores external appearance image association information, for each device, indicating an association between external appearance image data representing the entire external appearance or a portion of the external appearance of the device and device identification information of the device. For example, the controller 26 compares the external appearance image data with each external appearance image data included in the external appearance image association information, and specifies the device identification information of the device to be used based on the comparison result. For example, the controller 26 extracts an external appearance feature of the device to be used from the acquired external appearance image data, specifies external appearance image data representing the same or similar external appearance feature as or to the extracted external appearance feature, in the external appearance image data group included in the external appearance image association information, and specifies device identification information associated with the external appearance image data. Accordingly, the device to be used (the device captured by the camera 22) is identified. As another example, when external appearance image data representing a name (for example, a product name) or a model number of the device to be used is generated by capturing the name or the model name, the device to be used may be identified based on the name or the model number represented in the external appearance image data. The specifying unit 28 of the terminal device 10 specifies function information indicating each function associated with the specified device identification information, in the device function management information. Accordingly, the function that the device to be used (for example, the image forming device 12) has is specified.

In addition, the controller 44 of the server 16 may compare the external appearance image data representing the entire external appearance or a portion of the external appearance of the device to be used (for example, the image forming device 12) with each appearance image data included in the external appearance image association information, and specify the device identification information of the device to be used based on the comparison result. The external appearance image association information is stored in the memory 42 of the server 16. In this case, the controller 44 of the server 16 specifies the device identification information of the device to be used, by referring to the external appearance image association information.

Device identification information of each of plural devices is acquired by capturing the entire external appearance or a portion of the external appearance of each device.

When device identification information is acquired by applying the position information AR technique, position information indicating a position where a device (for example, the image forming device 12) is installed is acquired by using, for example, a global positioning system (GPS) function. For example, each device has the GPS function and acquires device position information indicating a position of the own device. The terminal device 10 outputs information indicating a request for acquiring device position information to a device to be used, and receives the device position information of the device from the device as a response to the acquisition request. The controller 26 of the terminal device 10 identifies the device to be used based on the device position information. For example, the memory 24 of the terminal device 10 stores position association information, for each device, indicating an association between device position information indicating a position where a device is provided and device identification information of the device. The controller 26 specifies device identification information associated with the device position information in the position association information. Accordingly, the device to be used is specified (identified). The specifying unit 28 of the terminal device 10 specifies function information indicating each function associated with the specified device identification information, in the device function management information. As a result, the function that the device to be used (for example, the image forming device 12) has is specified (identified).

In addition, the controller 44 of the server 16 may specify the device identification information associated with the position information of the device to be used in the position association information. The position association information is stored in the memory 42 of the server 16. In this case, the controller 44 of the server 16 specifies the device identification information of the device to be used, by referring to the position association information.

Device position information of each of plural devices is acquired, and device identification information of each device is specified based on the device position information.

In addition, a device may be identified by using plural identification techniques. For example, a device may be identified by using plural techniques selected from the marker AR technique, the markerless AR technique, and the position information AR technique. In addition, when a device is not identified by a certain identification technique, the device may be identified by using another identification technique. For example, when a device is not identified by the marker AR technique or the markerless AR technique, the device may be identified by using the position information AR technique.

Hereinafter, the device system according to the first exemplary embodiment will be described in more detail.

The device function management information will be described in detail with reference to FIG. 6. FIG. 6 illustrates an example of a device function management table which is the device function management information. In the device function management table, for example, a device ID, information indicating a device name (for example, a device type), information indicating a function that a device has (function information), and an image ID are associated with each other. The device ID and the device name correspond to an example of the device identification information. The image ID is an example of image identification information for identifying a device image associated with a device. In addition, the device function management table may not include the image ID. For example, a device with the device ID "B" is a multifunction machine (an image forming device having plural image forming functions), and has functions such as the printing function and the scanning function. The device is associated with an image ID for identifying a device image associated with the device. For example, data of a device image associated with a device may be stored in the terminal device 10, the server 16, or another device.

For example, a device ID for identifying a device to be used is acquired by applying the AR technique. The specifying unit 28 of the terminal device 10 specifies the device name, the function, and the image ID which are associated with the device ID, by referring to the device function management table. Accordingly, the device to be used is identified. The information indicating the device name or the device image may be displayed on the display unit of the UI unit 20. In addition, an image itself captured by the camera 22 may be displayed on the display unit of the UI unit 20. In addition, when a device image associated with the device (for example, an image captured by the camera 22 or an image schematically representing the device) is designated by the user in the UI unit 20, information on a function that the device has (for example, function information or function explanation information) may be displayed on the display unit of the UI unit 20.

Hereinafter, the linkage function management information will be described in detail with reference to FIG. 7. FIG. 7 illustrates an example of a linkage function management table which is the linkage function management information. In the linkage function management table, for example, a combination of device IDs, information indicating a device name of each device to be linked (for example, types of respective devices), and information indicating a linkage function (linkage function information) are associated with each other. For example, a device with the device ID "A" is a personal computer (PC), and a device with the device ID "B" is a multifunction machine. When the PC A and the multifunction machine B are linked to each other, for example, the "scanning transmitting function" or the "printing function" is implemented as a linkage function. The "scanning transmitting function" is a function of transmitting image data generated by scanning by the multifunction machine B to the PC A. The "printing function" is a function of transmitting data (for example, image data or document data) saved in the PC A to the multifunction machine B and print the data by the multifunction machine B. In addition, a linkage function executable by using three or more devices may be set. In this case, a combination of the three or more devices and a linkage function are associated with each other, and the association is registered in the linkage function management table.

Hereinafter, the operation of the terminal device 10 will be described in detail by using specific examples.

FIG. 8 illustrates an example of a screen which is displayed on the terminal device 10. The controller 26 of the terminal device 10 displays a screen 48 on the display unit of the UI unit 20 to and displays various pieces of information of the screen 48. The screen 48 is an interface (an interaction response screen) on which the user makes a conversation with the automatic response AI. The screen 48 displays information (for example, a character string or an image) input by the user to the terminal device 10, and information (for example, a character string or an image) indicating a message content of the automatic response AI. The conversation between the user and the automatic response AI may be a so-called chatting type conversation (that is, a real-time conversation. In further other words, a conversation conducted in the manner that the user and the automatic response AI post messages to each other). For example, when a program for making a conversation with the automatic response AI (for example, a chatting program) is executed, the screen 48 for the conversation (the interaction response screen) is displayed on the display unit of the UI unit 20.

A display area for each party making a conversation may be formed on the screen 48, and a message content of each party making a conversation may be displayed in the own display area. For example, a display area 48a is an area that displays a message content of the automatic response AI, and a display area 48b displays a message content of the user (information input by the user to the terminal device 10). In the example illustrated in FIG. 8, the display area 48a for the automatic response AI is provided at the left side of the screen 48 in the direction toward the screen 48, and the display area 48b for the user is provided at the right side of the screen 48. In addition, the example of the display is merely an example. The arrangement relationship of the display areas may be reversed, the respective display areas may be provided vertically, the respective display areas may entirely or partially overlap with each other, or a specific area of the screen 48 (for example, the center area) may display the latest message content, and the periphery of the specific area may display past message contents. In addition, the respective display areas may have the same size or different sizes from each other, or the size of each display area may be expanded or reduced according to an amount of message contents for each message or the number of times a messages is made. The controller 26 performs the control of the setting or size of each display area.

In the example illustrated in FIG. 8, the parties making a conversation are one user and one automatic response AI. However, plural users or plural automatic response AIs may join the conversation. In this case, a display area for each of the parties making a conversation may be provided on the screen 48. For example, when two users and one automatic response AI join the conversation, three display areas are provided on the screen 48, and a message content of each party making a conversation is displayed in the own display area. For example, when plural users conduct a conversation with each other via the screen 48 by conducting a communication among plural terminal devices 10, message contents of the plural users are displayed on the screen 48. This display is identically applied to the case where plural automatic response AIs join the conversation. Programs for plural automatic response AIs may be installed in the same terminal device 10 such that the plural automatic response AIs are stored in the same terminal device 10, or programs for plural automatic response AIs may be installed in different terminal devices 10 such that the automatic response AIs are stored in the different terminal devices 10, respectively. For example, the screen 48 displays a message content of the automatic response AI stored in the own terminal device 10, and further, message contents of the automatic response AIs stored in other terminal devices 10. The automatic response AIs stored in the other terminal devices 10 join the conversation via, for example, the communication path N.

For example, when a chatting program is activated, the controller 26 of the terminal device 10 displays the screen 48 on the display unit of the UI unit 20. An image 50 associated with the automatic response AI is displayed in the display area 48a for the automatic response AI, and an image 52 associated with the user is displayed in the display area 48b for the user. The image 50 identifies the automatic response AI, and the image 52 identifies the user. In addition, a character string indicating the automatic response AI (a character string for identifying the automatic response AI) may be displayed in place of or along with the image 50. Similarly, a character string indicating the user (for example, a character string for identifying the user such as a name, a user ID, a handle name, or a nickname) may be displayed in place of or along with the image 52.

Then, a conversation is conducted between the user and the automatic response AI. In the conversation, the message content of the user may be input to the terminal device 10 in the manner that the user inputs information such as a character string or an image by operating the UI unit 20, or may be input by voice. In addition, the message content of the user may or may not be displayed as information such as a character string or an image on the screen 48. Similarly, the message content of the automatic response AI may be displayed as information such as a character string or an image on the screen 48, or may be or may not be displayed on the screen 48 along with output by voice. Hereinafter, for example, descriptions will be made by assuming that a message content of each party making a conversation is displayed on the screen 48. However, the message content may be output by voice.

In addition, when a conversation is conducted on the screen 48, the screen 48 is scrolled so that past message contents which may not be displayed on the screen 48 disappear from the screen 48, and the latest message content and nearby message contents thereof are displayed on the screen 48.

When the chatting program is activated, first, the automatic response AI makes a common question (a question asking about a user's request) such as "How can I help you?," and a character string indicating the question is displayed as a message content of the automatic response AI on the screen 48 (not illustrated in FIG. 8). In addition, the message content of the automatic response AI may be output by voice in place of or along with the character string. Since the message content is one made by the automatic response AI, the controller 26 display the message content in the display area 48a as a message content associated with the image 50 of the automatic response AI. The same is applied to subsequent conversations.

Next, when the user requests for a linkage function by putting a message, for example, "I want to execute a linkage function," a character string indicating the request is displayed as a message content of the user on the screen 48 (not illustrated in FIG. 8). For example, the user may input information indicating the message content to the terminal device 10 by inputting a character string by operating the screen 48, or may input the information indicating the message content to the terminal device 10 by voice. Since the message content is made by the user, the controller 26 displays the message content in the display area 48b as a message content associated with the image 52 of the user. The same is applied to subsequent conversations.

The automatic response AI identifies the request of the user by analyzing the message content of the user, and creates a response such as a reply to the request. The controller 26 displays a character string indicating the response in the display area 48a as a message content 54 of the automatic response AI. For example, the message content 54 that "Which device do you want to use?" is displayed in the display area 48a as a message content of the automatic response AI. In addition, the automatic response AI may search for information by using, for example, the Internet and analyze the search result, or may acquire information on the devices 12 and 14 and analyze the information. The automatic response AI may reflect the analysis result on the response. In addition, the automatic response AI may manage, for example, the history of use of various applications by the user, the history of an operation of the terminal device 10 by the user, and the history of use of the devices 12 and 14 by the user. In addition, the automatic response AI may acquire information from the automatic response AIs stored in the other different devices by communicating with the automatic response AIs. The automatic response AI may reflect the information managed by the own automatic response AI or the acquired information, on the response.

When the user designates devices in response to the question above, the specifying unit 28 (the specifying unit 28 implemented by the automatic response AI) identifies the devices as devices to be linked. For example, as illustrated in FIG. 8, when the user designates a device image 56 associated with a device and places the device image 56 at the position where a message content of the user is displayed, the controller 26 transmits the device image 56 as a message content of the user to the automatic response AI. In response to this operation, the specifying unit 28 identifies the device associated with the device image 56 as a device to be linked. In the example illustrated in FIG. 8, the operation by the user to display the device image 56 in the display area 48b corresponds to an act for the user to make a message content. In addition, the user may input a character string indicating a device as a message content of the user to the terminal device 10 by operating the UI unit 20. In this case, the specifying unit 28 identifies the device indicated by the character string as a device to be linked. In addition, information of a device to be linked may be input by voice as a message content of the user to the terminal device 10. In addition, the user may designate a type of a device, rather than designating an individual device. In this case, the type of the device is identified as a type of a device to be linked. For example, the user may designate a device itself such as the multifunction machine B or may designate a device type such as a multifunction machine.

The device image 56 is an image associated with the multifunction machine B (the image forming device) serving as a device. The multifunction machine B is a device identified by the specifying unit 28 by using the AR technique described above (the marker AR technique, the markerless AR technique, or the position information AR technique) or another identification technique. In addition, the device image 56 may be an image associated with a device type such as a multifunction machine, rather than the multifunction machine B itself.

For example, the controller 26 displays a stock area 58 in the display area 48b for the user, and displays device images in the stock area 58. The stock area 58 is an area where information of one or plural candidates for objects to be linked is displayed, and in the example illustrated in FIG. 8, device images are displayed as an example of the information of the candidates. For example, the controller 26 displays device images associated with already identified devices in the stock area 58. In the example illustrated in FIG. 8, device images 56, 60, and 62 are displayed in the stock area 58. The device image 60 is an image associated with the PC A which is a device. The device image 62 is an image associated with a projector C which is a device. As described above, for the identified devices, the controller 26 displays device images associated with the devices in the stock area 58. In addition, the controller 26 may display device images associated with device types, rather than devices themselves, in the stock area 58. For example, the controller 26 may display, in the stock area 58, the device image 56 associated with a device type such as a multifunction machine rather than the multifunction machine B itself, the device image 60 associated with a device type such as a PC rather than the PC A itself, and the device image 62 associated with a device type such as a projector rather than the projector C itself.

For example, the information on the already identified devices is stored in the memory 24, and the device images associated with the devices are displayed in the stock area 58 later even when the process of identifying the devices is not performed again. In addition, the information on the identified devices may be deleted from the memory 24 through an operation by the user. In this case, the device images associated with the devices are also deleted. As another example, the information on the identified devices may be deleted from the memory 24 after a linkage function is executed by using the identified devices or after a predetermined time elapses from the time when the devices are identified.

The device image 56 may be an image generated by capturing the multifunction machine B by the camera 22 (an image having a size at the capturing time or an enlarged or reduced image), or a schematic image (for example, an icon) associated with the multifunction machine B. Similarly, the device image 60 may also be an image generated by capturing the PC A or a schematic image associated with the PC A. Similarly, the device image 62 may also be an image generated by capturing the projector C or a schematic image associated with the projector C.

When a schematic image is used, the specifying unit 28 specifies the schematic image associated with the identified device by referring to the device function management table illustrated in FIG. 6. The schematic image is displayed as a device image. The data of the schematic image may be stored in the terminal device 10 or an external device such as the server 16.

In addition, when image data generated by capturing a device is used, the image reflects the current external appearance of the device itself (for example, the external appearance reflecting a scratch, a memo, and a seal adhered to a device), and thus, there is an effect in that the user may visually confirm the difference from a similar type of other devices. Further, since a device image associated with a device itself (for example, an image obtained by capturing or an icon associated with a device itself) is a unique image of the device, the automatic response AI may identify the device itself as a device to be linked when the device image is transmitted to the automatic response AI. Meanwhile, when the device image is an image associated with a device type rather than a device itself, the automatic response AI may identify the device type from the device image, but may not identify an individual device itself. For example, when the device image 56 is an image associated with the multifunction machine B, the automatic response AI may identify the multifunction machine B itself as a device to be linked, from the device image 56. Meanwhile, when the device image 56 is an image associated with a device type such as a multifunction machine, the automatic response AI identifies the device type such as a multifunction machine as a type of a device to be linked, from the device image 56. In the descriptions hereinbelow, it is assumed that each device image is an image associated with an individual device itself. That is, it is assumed that the device image 56 is an image associated with the multifunction machine B itself, the device image 60 is an image associated with the PC A itself, and the device image 62 is an image associated with the projector C itself.

In addition, when a device is identified, information indicating the name of the device may be displayed on the screen 48. For example, a character string "Multifunction Machine B" may be displayed along with the device image 56.

In addition, when there exists another device image that may not be displayed in the stock area 58, the other device image is displayed in the stock area 58 in the manner that the user performs an operation to scroll the device images displayed in the stock area 58, as indicated by an arrow 64.

As indicated by an arrow 66, the user may select an image associated with a device to be linked (the device image 56 in the example illustrated in FIG. 8) from the stock area 58, move the image to the outside of the stock area 58, and transmit the device image 56 as a message content of the user to the automatic response AI. For example, the user moves the device image 56 from the stock area 58 to the position where a message content of the user is displayed, by performing a dragging operation, and performs a dropping operation at the position where a message content is displayed. With the operations, the controller 26 transmits the device image 56 as a message content of the user to the automatic response AI.

In the example illustrated in FIG. 8, in addition to the device image 56, the user selects the device image 60 from the stock area 58 and moves the device image 60 to the position where a message content of the user is displayed. With the operation, the device image 60 is transmitted as a message content of the user to the automatic response AI.

When the user transmits information of the plural devices to the automatic response AI on the screen 48, that is, when the user makes a message indicating information of the plural devices as information of devices to be linked, the specifying unit 28 specifies linkage functions associated with the plural devices in the linkage function management table illustrated in FIG. 7. The controller 26 displays the information on the linkage functions in the display area 48*a* as a message content of the automatic response AI.

In the example described above, the device images 56 and 60 are transmitted as information of devices to be linked to the automatic response AI. In this case, the specifying unit 28 identifies the multifunction machine B associated with the device image 56 and the PC A associated with the device image 60 as devices to be linked. In addition, the device image 56 may be first transmitted to the automatic response AI, and then, the device image 60 may be transmitted to the automatic response AI, or the device image 60 may be first transmitted to the automatic response AI, and then, the device image 56 may be transmitted to the automatic response AI.

For example, when the user selects and extracts images (the device images 56 and 60 in the example described above) from the stock area 58 by using a pointer (for example, the user's finger, a pen, or a stylus) on the screen 48, the images are included in a message content of the user to be transmitted to the automatic response AI. For example, the device images are moved from the stock area 58 to the position where a message content of the user is displayed, by the dragging and dropping operations, and transmitted as a message content of the user to the automatic response AI. The controller 26 detects the movement of the pointer on the screen 48 by detecting the contact of the pointer with the screen 48.

When the device images 56 and 60 are transmitted to the automatic response AI, and the multifunction machine B and the PC A are identified as devices to be linked as described above, the controller 26 displays the information of the devices identified in the display area 48*a* as devices to be linked, as a message content 68 of the automatic response AI. When the user approves the message content 68 (for example, when the user makes a message content 70 answering "Yes"), information on linkage functions executable by using the PC A and the multifunction machine B is displayed on the screen 48.

The specifying unit 28 specifies the linkage functions associated with the combination of the PC A and the multifunction machine B (for example, the "scanning transmitting function" and the "printing function") in the linkage function management table illustrated in FIG. 7, at a timing when the device images 56 and 60 are transmitted as information of devices to be linked to the automatic response AI, or at a timing when the user approves the message content 68. Accordingly, the linkage functions executable by using the PC A and the multifunction machine B are specified. The "scanning transmitting function" is a function of transmitting image data generated by scanning by the multifunction machine B, to the PC A. The "printing function" is a function of transmitting image data stored in the PC A to the multifunction machine B and print the image data by the multifunction machine B. The information on the linkage functions specified as described above is displayed as a message content of the automatic response AI on the screen 48. In addition, the process of specifying the devices or the linkage functions may be performed by the server 16.

Figure 9:
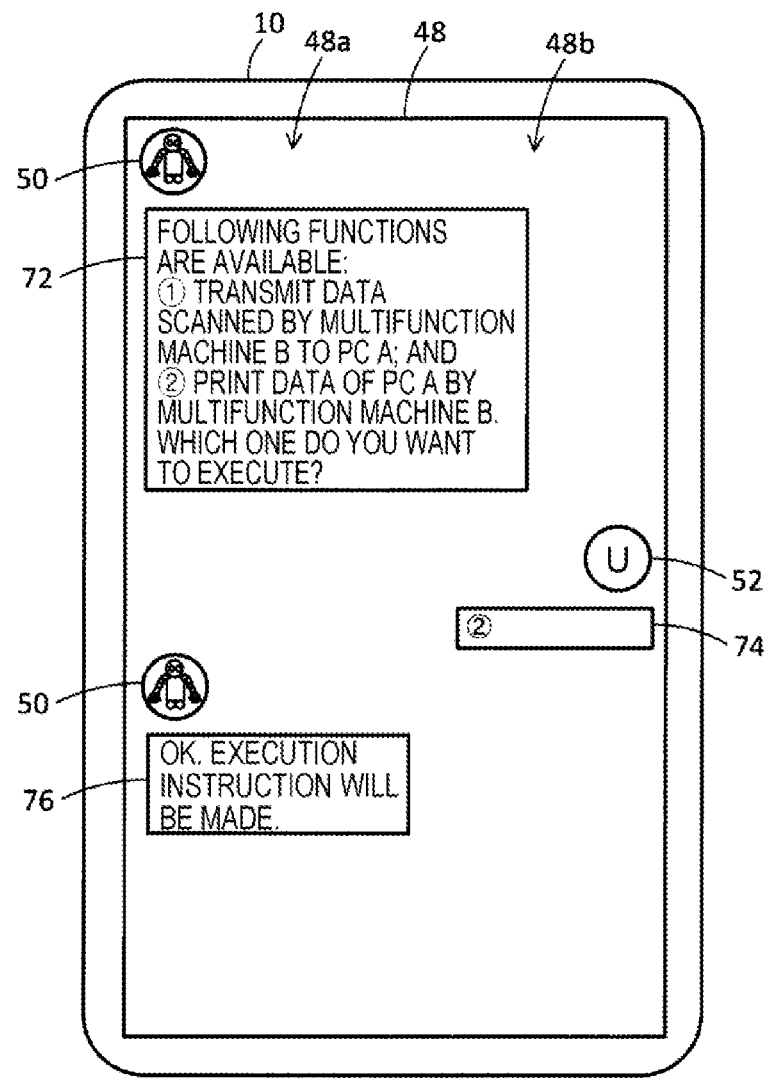
FIG. 9 is a view illustrating a screen.

FIG. 9 illustrates the screen 48 which is continuous to FIG. 8. When the linkage functions are specified as described above, the controller 26 of the terminal device 10 displays the information on the linkage functions in the display area 48*a* as a message content 72 of the automatic response AI.

When the user designates a linkage function and gives an instruction to execute the linkage function by a message content 74 in response to the message content 72, the controller 26 (for example, the controller 26 implemented by the automatic response AI) receives the execution instruction and transmits information indicating the execution instruction (execution instruction information) to the devices to be linked. Further, the controller 26 displays information indicating that the execution instruction has been received, in the display area 48*a* as a message content 76 of the automatic response AI. As another example, the screen 48 may display a button image for instructing execution of a linkage function, and the user may press the button image to make the instruction to execute the linkage function. When the PC A and the multifunction machine B are selected as devices to be linked, the execution instruction information is transmitted to the PC A and the multifunction machine B. Upon receiving the execution instruction information, the PC A and the multifunction machine B execute the linkage function indicated in the execution instruction information (the linkage function designated by the user). For example, when an instruction to execute the "printing function" as a linkage function is made, the PC A transmits image data to be printed to the multifunction machine B, and the multifunction machine B prints the image data on a paper which is a recording medium.

Figure 10:
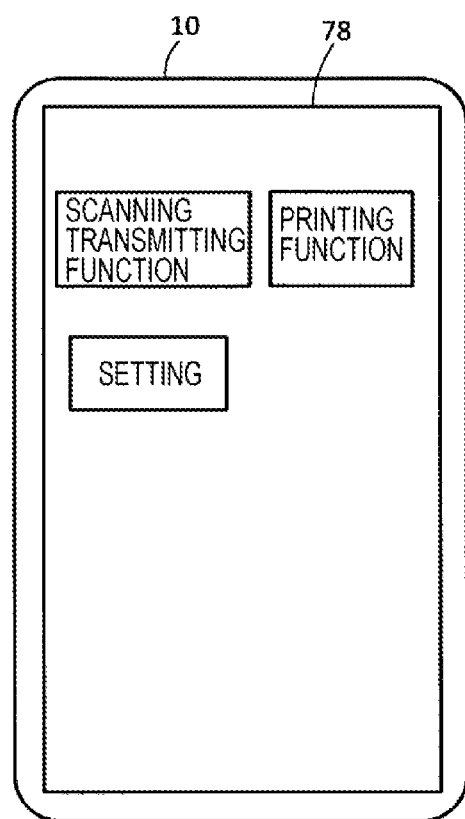
FIG. 10 is a view illustrating a screen.

In addition, when the user designates the linkage function by the message content 74, the controller 26 (the automatic response AI) may cause the UI unit 20 to display a screen for controlling the devices to be linked, without giving the instruction to execute the linkage function to the devices to be linked. FIG. 10 illustrates a screen 78 for that case. The screen 78 is, for example, a screen for controlling the PC A and the multifunction machine B (a remote control screen) by the terminal device 10. The screen 78 displays, for example, button images for instructing execution of linkage functions (for example, a button image for instructing the execution of the "scanning transmitting function" and a button image for instructing the execution of the "printing function"). When the user presses a button image on the screen 78, the linkage function associated with the button image is executed. In addition, for example, setting of various parameters may be performed on the screen 78.

Figure 11:
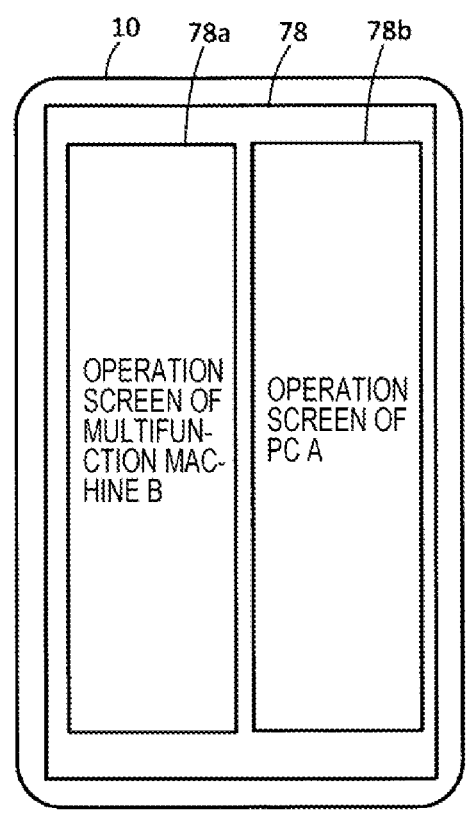
FIG. 11 is a view illustrating a screen.

FIG. 11 illustrates another remote control screen. The screen 78 includes a screen 78*a* for controlling the multifunction machine B and a screen 78*b* for controlling the PC A. The screen 78*a* may display, for example, a button image for instructing execution of a solo function that the multifunction machine B has (for example, a button image for instructing execution of the "copying function" or a button image for instructing execution of the "printing function"). In addition, for example, setting of various parameters used in the multifunction machine B may be performed on the screen 78*a*. The screen 78*b* displays, for example, data (file) stored in the PC A or a storage location (folder) in the PC A. In addition, for example, setting of various parameters used in the PC A may be performed on the screen 78*b*. In addition, setting of a linkage function (for example, the "scanning transmitting function" or the "printing function") or an instruction to execute the linkage function may be made on the screens 78*a* and 78*b*.

In addition, the device images displayed in the stock area 58 in FIG. 8 or the information on the devices associated with the device images may be edited by the user. For example, when the user designates a device image displayed in the stock area 58 and gives an instruction to edit the device image, the controller 26 displays an editing screen on the display unit of the UI unit 20. The controller 26 displays the editing screen on the display unit of the UI unit 20, for example, when the user presses the device image for a long time (for example, the length of time during which the device image is pressed becomes equal to or longer than a threshold), when the user presses a button image for displaying the editing screen, or when the user inputs an editing instruction to the terminal device 10 by voice. On the editing screen, the device image may be edited, and for example, a portion image associated with a portion of the device may be cut out from the device image. In addition, the information on the device associated with the device image may also be edited.

In addition, the controller 26 may display a device image associated with a device established for a communication with the terminal device 10 in the stock area 58, or a device image associated with a device registered in the terminal device 10 in the stock area 58.

In addition, when respective devices are identified by the marker AR technique or the markerless AR technique, the devices may be individually captured and identified, or may be captured all together and identified. For example, the multifunction machine B is captured in a state where the multifunction machine B is included in the capturing area of the camera 22, and then, the PC A is captured in a state where the PC A is included in the capturing area of the camera 22, so that the multifunction machine B and the PC A are sequentially identified. The respective devices to be linked may not be arranged near to each other, and thus, the multifunction machine B and the PC A may not be included together in the capturing area of the camera 22. This circumstance may be coped with by, for example, changing the angle of the capturing area, or enlarging or reducing the capturing area. However, this operation may not cope with the circumstance. In this case, the respective devices are identified by capturing the devices plural times.

As another example, a device to be linked may be preset as a basic linkage device. For example, it is assumed that the multifunction machine B is preset as a basic linkage device. The device identification information of the basic linkage device may be stored in advance in the memory 24 of the terminal device 10. The user may designate the basic linkage device by using the UI unit 20. When the basic linkage device is set, the user transmits a device image associated with a device to be linked other than the basic linkage device as a message content to the automatic response AI. Accordingly, the device to be linked is specified (identified), and a linkage function executable by using the basic linkage device and the specified device is specified (identified).

Figure 12:
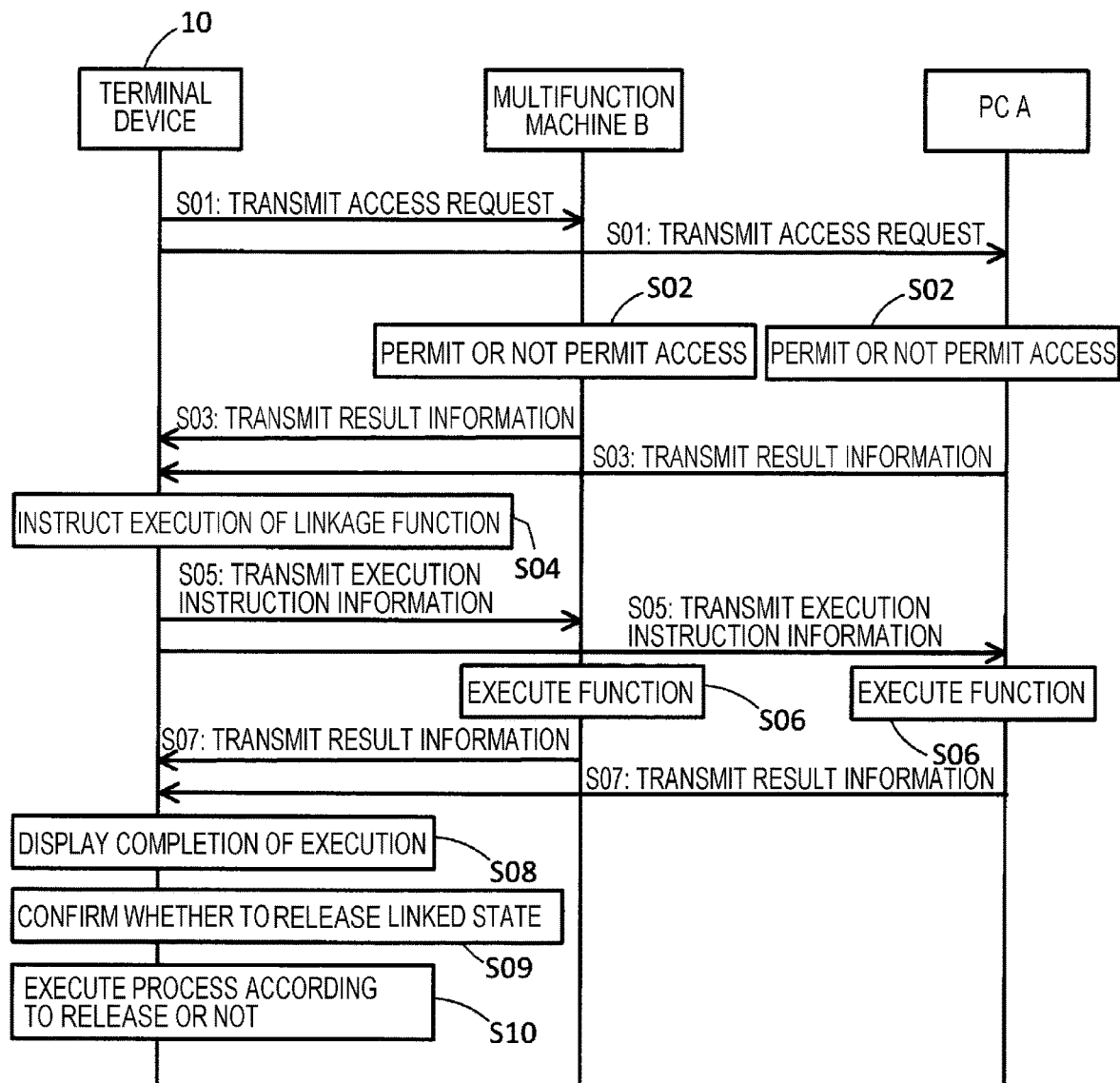
FIG. 12 is a sequence diagram illustrating an operation of the device system.

Hereinafter, operations when a linkage function is executed will be described. For example, when a linkage function is executed, an access request is transmitted from the terminal device 10 to each of the devices to be linked, and the terminal device 10 is connected to each of the devices. Hereinafter, the access process will be described with reference to FIG. 12. FIG. 12 is a sequence diagram illustrating the process.

In the terminal device 10, when the user designates the multifunction machine B and the PC A as devices to be linked (that is, when the user transmits the information of the multifunction machine B and the PC A as a conversation content of the user to the automatic response AI), the terminal device 10 transmits information indicating an access request to the devices to be linked (the multifunction machine B and the PC A) (S01). The control of the transmission may be performed by the automatic response AI. For example, when address information of each of the devices to be linked is stored in the server 16, the terminal device 10 acquires the address information of each of the devices from the server 16. When the device identification information of each of the devices includes the address information, the controller 26 of the terminal device 10 acquires the address information from the device identification information. The process of acquiring the address information may be performed by the automatic response AI. In addition, the address information of each of the devices may be stored in the memory 24 of the terminal device 10. The terminal device 10 may acquire the address information of each of the devices by another method. The terminal device 10 transmits the information indicating the access request to each of the devices to be linked (for example, the multifunction machine B and the PC A), by using the address information of each of the devices to be linked.

Upon receiving the information indicating the access request, the multifunction machine B and the PC A determine whether or not to permit the access to the terminal device 10 (S02). For example, when the multifunction machine B and the PC A correspond to devices to which access is not permitted, or when the number of devices requesting an access exceeds an upper limit, the access is not permitted. In addition, when the access from the terminal device 10 is permitted, the terminal device 10 may be prohibited from performing an operation to change the unique setting information of each of the multifunction machine B and the PC A. For example, it may be prohibited to change color parameters of the multifunction machine B or setting time for shifting to power saving. Thus, the security of the devices to be linked is improved. As another example, when the devices are linked to each other, the change of the setting information may be restrictively performed, as compared with a case where each device is used alone. For example, it may be permitted to change a smaller number of setting items, as compared with a case where a device is used alone. In addition, it may be prohibited to refer to personal information of another user such as the operation history. Accordingly, the security of the personal information of the user is improved.

Result information indicating a permission or non-permission of the access is transmitted from the multifunction machine B and the PC A to the terminal device 10 (S03). When the access to the multifunction machine B and the PC A is permitted, a communication between the terminal device 10 and the multifunction machine B is established, and further, a communication between the terminal device 10 and the PC A is established.

Next, in the terminal device 10, the user instructs an execution of a linkage function (for example, the "printing function") (S04). According to the instruction, the terminal device 10 transmits information indicating the instruction to execute the linkage function (execution instruction information) to each of the devices to be linked (for example, the multifunction machine B and the PC A) (S05). The control of the transmission may be performed by the automatic response AI. The execution instruction information transmitted to the multifunction machine B includes information indicating a process to be executed by the multifunction machine B (for example, job information), and the execution instruction information transmitted to the PC A includes information indicating a process to be executed by the PC A (for example, job information).

Upon receiving the execution instruction information, the multifunction machine B and the PC A execute the linkage function (for example, the "printing function") according to the execution instruction information (S06). When the linkage function to be executed includes a process of transmitting and receiving data between the multifunction machine B and the PC A, a communication between the multifunction machine B and the PC A is established. For example, the execution instruction information transmitted to the multifunction machine B includes the address information of the PC A, and the execution instruction information transmitted to the PC A includes the address information of the multifunction machine B. The communication between the multifunction machine B and the PC A is established by using the address information. When the communication is established, the PC A transmits image data to be printed to the multifunction machine B, and the multifunction machine B prints the image data on a paper which is a recording medium.

When the execution of the linkage function is completed, information indicating the completion of the execution of the linkage function is transmitted from the multifunction machine B and the PC A to the terminal device 10 (S07). The UI unit 20 of the terminal device 10 displays the information indicating the completion of the execution of the linkage function (S08). In addition, when the information indicating the completion of the execution is not displayed even after preset time elapses from the time when the execution instruction is given, the controller 26 of the terminal device 10 may cause the UI unit 20 to display information indicating an error, and transmit the execution instruction information or the information indicating the access request to the multifunction machine B and the PC A again.

Next, the user confirms whether to release the linked state between the multifunction machine B and the PC A (S09), and a process corresponding to the confirmation result is executed (S10). When the linked state is released, the user gives a release instruction by using the terminal device 10. Accordingly, the communication between the terminal device 10 and the multifunction machine B is disconnected, and the communication between the terminal device 10 and the PC A is disconnected. Similarly, the communication between the multifunction machine B and the PC A is also disconnected. When the linked state is not released, the execution instruction may be continuously given.

In addition, the number of devices to be linked may be increased. For example, an image associated with a third device may be transmitted as a conversation content to the automatic response AI, and the three devices including the multifunction machine B and the PC A may be linked to each other. In addition, the information indicating that the multifunction machine B and the PC A have already been identified as devices to be linked is stored in the terminal device 10 or the server 16.

Device identification information indicating devices to be linked and a linkage function information indicating an executed linkage function may be stored in, for example, the terminal device 10 or the server 16. For example, user account information (user identification information) of the user using the terminal device 10 may be acquired, and history information may be created which indicates an association among the user account information, the device identification information indicating devices to be linked, and the linkage function information indicating an executed linkage function. The history information may be stored in, for example, the terminal device 10 or the server 16. The history information may be created by the terminal device 10 or the server 16. By referring to the history information, the linkage function that has been executed and the device group that has been used for the linkage function are specified.

In addition, the devices to be linked (for example, the multifunction machine B and the PC A) may store the user account information of the user making the access request or the terminal identification information indicating the terminal device 10 which is an access requesting source, as history information. The user who has used the devices is specified by referring to the history information. For example, when the user who is using a device needs to be specified because the device is broken down, or when a process of charging for consumables or the like is performed, the user may be specified by using the history information. The history information may be stored in the terminal device 10, the server 16, or another device.

The user account information is stored in advance in, for example, the memory 24 of the terminal device 10, and the controller 26 of the terminal device 10 functions as an example of a user identification unit and identifies the user using the terminal device 10 by reading the user account information of the user from the memory 24. When the user account information of plural users is stored in the memory 24, the user designates his/her own account information by using the terminal device 10. Accordingly, the user account information of the user is read, and the user is identified. As another example, the controller 26 of the terminal device 10 may identify the user by reading user account information of a user who is logging into the terminal device 10. As yet another example, when only one piece of user account information is stored in the same terminal device 10, the controller 26 of the terminal device 10 may identify the user by reading the user account information. In addition, when no user account has been set and no user account information has been created, initial setting is performed, and accordingly, user account information is created.

When the user has been identified, for example, an image representing the user himself/herself (for example, a user's own photo (for example, a face photo)) or an icon associated with the user rather than the image representing the user himself/herself may be displayed as the image 52 associated with the user in FIG. 8. In addition, user identification information such as a user name, a user ID, a handle name, or a nickname of the identified user may be displayed in a character string on the screen 48.

The use history of a linkage function may be managed for each user, and information indicating linkage functions used in the past by the user indicated by the read user account information may be displayed on the UI unit 20 of the terminal device 10. The information indicating the use history may be stored in the terminal device 10 or the server 16. In addition, information indicating a linkage function which has been used with frequency equal to or higher than preset use frequency may be displayed. By providing this shortcut function, the user's effort for the operation related to a linkage function is reduced.

As described above, according to the first exemplary embodiment, information on a linkage function is provided when information of devices to be linked is transmitted as a conversation content of the user to the automatic response AI, on the screen 48 for making a conversation with the automatic response AI. Thus, the information on a linkage function is provided by the simple method using a conversation with the automatic response AI.

In addition, when three or more device images are transmitted as a conversation content to the automatic response AI, information on a linkage function executable by using the three or more devices is provided.

In addition, when information of plural devices is transmitted as a message content of the user to the automatic response AI within a predetermined time limit, the specifying unit 28 may specify a linkage function executable by using the plural devices, and when information of a single device is transmitted as a message content of the user to the automatic response AI within the time limit, the specifying unit 28 may specify a function (a solo function) that the device has. In this case, information on the linkage function or the solo function specified by the specifying unit 28 is displayed on the display unit of the UI unit 20. A starting time point of the time limit may be, for example, a time point when the automatic response AI requests the user to inform about devices to be linked as in the message content 54, or a time point when the user transmits a first device image to the automatic response AI after the message content 54 occurs.

For example, in the example illustrated in FIG. 8, in a case where the user transmits only the device image 56 as a message content to the automatic response AI within the time limit from the time point when the automatic response AI requests the user to inform devices to be linked as in the message content 54, the specifying unit 28 specifies a function (a solo function) associated with the multifunction machine B in the device function management table illustrated in FIG. 6. The controller 26 displays the information on the solo function as a message content of the automatic response AI in the display area 48a. In this case, similarly to the process illustrated in FIG. 10, the information indicating an access request is transmitted to the multifunction machine B, and when the access is permitted, the solo function designated by the user is executed by the multifunction machine B.

Meanwhile, in a case where the user transmits the device images 56 and 60 as a message content to the automatic response AI within the time limit from the time point when the automatic response AI requests the user to inform devices to be linked as in the message content 54, the specifying unit 28 specifies linkage functions associated with the combination of the multifunction machine B and the PC A in the linkage function management table illustrated in FIG. 7. The controller 26 displays the information on the linkage functions in the display area 48a.

The similar process described above is also performed in a case where the starting time point of the time limit is the time point when the user transmits a first device image (for example, the device image 56) to the automatic response AI.

By providing the time limit as described above, a switching between providing a linkage function and providing a solo function is possible.

In the example illustrated in FIG. 8, when the user captures a device (for example, the multifunction machine B) by the camera 22 after the automatic response AI requests the user to inform devices to be linked as in the message content 54, the controller 26 transmits the device image 56 associated with the device (the multifunction machine B) (for example, an image obtained by the capturing or a schematic image) as a message content of the user to the automatic response AI. The specifying unit 28 identifies the multifunction machine B associated with the device image 56 as a device to be linked. Further, when the user captures another device (for example, the PC A) by the camera 22, the controller 26 transmits the device image 60 associated with the device (the PC A) as a message content of the user to the automatic response AI. The specifying unit 28 identifies the PC A associated with the device image 60 as a device to be linked. In this case, the specifying unit 28 specifies linkage functions associated with the combination of the multifunction machine B and the PC A in the linkage function management table illustrated in FIG. 7. The information on the linkage functions is displayed in the display area 48a as a message content of the automatic response AI. In addition, the capturing of a device to be linked may be performed by an image capturing device other than the camera 22. In this case, the device image data generated by the capturing by the image capturing device is transmitted to the terminal device 10 via a communication path such as a network, and the device image is transmitted as a message content of the user to the automatic response AI.

In addition, when a linkage function associated with the combination of the plural devices designated by the user is not registered in the linkage function management table, the specifying unit 28 determines that the usable linkage function is not registered. In this case, the controller 26 displays a message indicating that the usable linkage function is not registered, in the display area 48a as a message content of the automatic response AI. Even in this case, the linkage function may become usable according to, for example, an updating status of a device. In this case, the specifying unit 28 specifies the linkage function that becomes usable.

(Modification 1)

Figure 13:
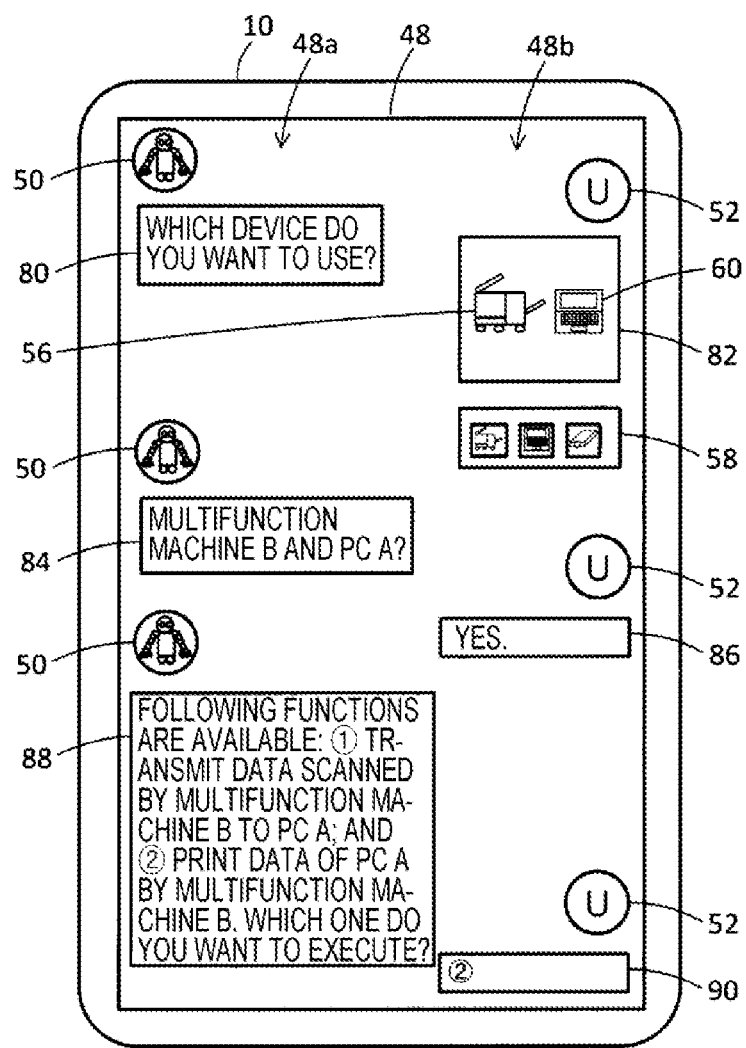
FIG. 13 is a view illustrating a screen.

Hereinafter, Modification 1 will be described with reference to FIG. 13. FIG. 13 illustrates the screen 48. In Modification 1, when information of plural devices to be linked is transmitted as a message content of the user to the automatic response AI, a linkage function executable by using the plural devices is notified. Hereinafter, Modification 1 will be described in detail.

As in FIG. 8, the screen 48 displays the image 50 associated with the automatic response AI and the image 52 associated with the user, and further, displays information indicating a conversation between the user and the automatic response AI.

As in FIG. 8, the message content that "Which device do you want to use?" is displayed in the display area 48a as a message content 80 of the automatic response AI.

When the user designates and transmits an image 82 representing plural devices as a message content of the user to the automatic response AI in response to the above described message content 80, the specifying unit 28 identifies the plural devices represented in the image 82 as devices to be linked. For example, when the image 82 represents the device image 56 associated with the multifunction machine B and the device image 60 associated with the PC A, the specifying unit 28 identifies the multifunction machine B as a device to be linked based on the device image 56, and identifies the PC A as a device to be linked based on the device image 60.

The user may select the device images 56 and 60 from the stock area 58 and superimpose the device images 56 and 60 on the image 82, by operating the screen 48. Accordingly, the device images 56 and 60 are represented in the image 82, and the image 82 is transmitted as a message content of the user to the automatic response AI.

As another example, the image 82 may be generated by capturing the multifunction machine B and the PC A together, by an image capturing device such as the camera 22. In addition, the user may capture the multifunction machine B and the PC A together by using the camera 22, and transmit the image 82 representing the multifunction machine B and the PC A together as a message content of the user to the automatic response AI, after the message content 80 is made.

As described above, when the multifunction machine B and the PC A are identified, the controller 26 displays the information of the devices identified in the display area 48a as devices to be linked, as a message content 84 of the automatic response AI. When the user approves the message content 84 (for example, when the user makes a message content 86 answering "Yes"), the information on linkage functions executable by using the PC A and the multifunction machine B is displayed in the display area 48a as a message content 88 of the automatic response AI. When the user designates a linkage function and gives an instruction to execute the linkage function by making a message content 90 in response to the message content 88, the controller 26 receives the execution instruction and transmits the execution instruction information to the devices to be linked (the PC A and the multifunction machine B). Accordingly, the linkage function is executed by the PC A and the multifunction machine B. In addition, a screen for controlling the devices to be linked (a remote control screen) may be displayed on the display unit of the UI unit 20.

In addition, when three or more device images are represented in the image 82, information on a linkage function executable by using the three or more devices is notified. In addition, when one device image is represented in the image 82, information on a function (a solo function) that the device associated with the one device image has is notified.

In addition, when a device image associated with a device to be linked is selected from the stock area 58, the information on a linkage function or a solo function may be notified under the control using the time limit described above. For example, when plural device images are taken out from the stock area 58 and superimposed on the image 82 within the time limit, the specifying unit 28 specifies a linkage function executable by using the devices associated with the respective plural device images. In this case, the information on the linkage function is displayed in the display area 48a as a message content of the automatic response AI. Meanwhile, when one device image is taken out from the stock area 58 and superimposed on the image 82 within the time limit, the specifying unit 28 specifies a function (a solo function) that the device associated with the device image has. In this case, the information on the solo function is displayed in the display area 48a as a message content of the automatic response AI.

For example, in the example illustrated in FIG. 13, when the user selects the device image 56 associated with the multifunction machine B from the stock area 58 and superimposes the device image 56 on the image 82, without superimposing another device image on the image 82, within the time limit, the specifying unit 28 specifies a function (a solo function) associated with the multifunction machine B in the linkage function management table illustrated in FIG. 6. The controller 26 displays the information on the solo function in the display area 48a as a message content of the automatic response AI.

Meanwhile, when the user selects the device images 56 and 60 from the stock area 58 and superimposes the device images 56 and 60 on the image 82 within the time limit, the specifying unit 28 specifies linkage functions associated with the combination of the multifunction machine B and the PC A in the linkage function management table illustrated in FIG. 7. The controller 26 displays the information on the linkage functions in the display area 48a as a message content of the automatic response AI.

(Modification 2)

Figure 14A:
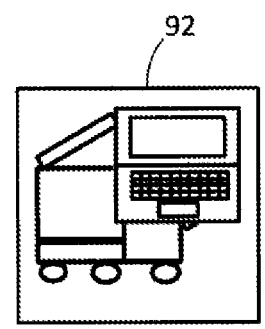
FIGS. 14A and 14B are views illustrating composite images.

Hereinafter, Modification 2 will be described. In Modification 2, when plural device images are transmitted as a message content of the user to the automatic response AI, the controller 26 may generate a new composite image representing a state where the plural device images are superimposed on each other, or a state where the plural device images are adjacent and connected to each other. FIG. 14A illustrates an example of the composite image. For example, when the device images 56 and 60 are transmitted in this order as a message content of the user to the automatic response AI, the controller 26 generates a new composite image 92 by grouping the device images 56 and 60. The controller 26 may display the composite image 92 on the display unit of the UI unit 20 or may register the composite image 92 as an image to be displayed in the stock area 58, in the terminal device 10. The composite image 92 may be an image representing the state where the device image 60 is superimposed on the device image 56 or an image schematically representing the state (that is, an icon).

When the device images 60 and 56 are transmitted in this order as a message content of the user to the automatic response AI, the controller 26 generates a composite image representing a state where the device image 56 is superimposed on the device image 60.

Figure 14B:
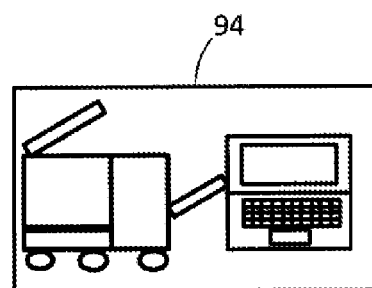

In addition, as illustrated in FIG. 14B, the controller 26 may generate a composite image 94 representing a state where the device images 56 and 60 are adjacent and connected to each other. The controller 26 may display the composite image 94 on the display unit of the UI unit 20 or may register the composite image 94 as an image to be displayed in the stock area 58, in the terminal device 10.

In addition, when plural device images are selected from the stock area 58 and superimposed on the image 82 as in Modification 1, the controller 26 may register the image 82 representing the plural device images as a new composite image in the terminal device 10.

When the composite image is generated as described above, the user may transmit the composite image as a message content of the user to the automatic response AI. For example, when the user transmits the composite image and another device image as a message content of the user to the automatic response AI, the specifying unit 28 identifies the plural devices associated with the composite image and the device associated with the other device image as devices to be linked. For example, when the user transmits the composite image 92 and the device image associated with the projector C as a message content of the user to the automatic response AI, the specifying unit 28 identifies the multifunction machine B and the PC A which are associated with the composite image 92, as devices to be linked, and further, identifies the projector C associated with the other device image as a device to be linked. In this case, the specifying unit 28 specifies a linkage function associated with the combination of the PC A, the multifunction machine B, and the projector C in the linkage function management table illustrated in FIG. 7. In addition, the information on the linkage function is displayed as a message content of the automatic response AI on the screen 48. In addition, a new composite image in which the composite image 92 and the device image associated with the projector C are superimposed on each other, or a new composite image in which the composite image 92 and the device image associated with the projector C are adjacent and connected to each other may be generated.

As described above, the number of devices to be linked may be increased by the simple operation using the composite image. Further, since the composite image represents plural devices to be linked, the user may visually grasp which devices are designated as devices to be linked, by displaying the composite image.

The composite image described above may be used as a shortcut image when the linkage function is executed next time and thereafter. For example, when the user gives an instruction to register the composite image as a shortcut image by using the terminal device 10, a registration screen is displayed on the display unit of the UI unit 20. The registration screen displays the composite image, and displays information indicating the registered contents of the linkage function executable by using the plural devices to be linked. For example, information indicating the linkage function name, an outline of the linkage function, and devices required for the linkage function is displayed as the information indicating the registered contents. The user may edit the registered contents (for example, the linkage function name and an outline of the linkage function) by using the terminal device 10. When the user gives the registration instruction on the registration screen, the composite image is registered as a shortcut image. In addition, when the user edits the registered contents, the edited contents are also registered in association with the composite image. For example, the shortcut image which is the composite image is generated and displayed in the stock area 58. The shortcut image is generated by, for example, the controller 26 of the terminal device 10. When plural shortcut images are generated and registered, the screen 48 may display a list of the shortcut images. In addition, the shortcut image and the information indicating the registered contents are stored in the terminal device 10. As another example, the shortcut image and the information indicating the registered contents may be stored in the server 16 in association with the user account information. In this case, when the user account information is transmitted from the terminal device 10 to the server 16, the information associated with the user account information (the shortcut image and the information indicating the registered contents) is transmitted from the server 16 to the terminal device 10 and displayed in the terminal device 10.

In addition, the shortcut image may include information (for example, an image) indicating a status of each device to be linked. For example, when each device to be linked is in a state of being able to execute the linkage function, an image indicating the state (for example, a green or blue image) is displayed as the information indicating the status. When each device to be linked is in a state of being unable to execute the linkage function, an image indicating the state (for example, a white or red image) is displayed as the information indicating the status. The state where the device is able to execute the linkage function refers to, for example, a state where the device is not being currently used or a state where the device is not broken down. The state where the device is unable to execute the linkage function refers to, for example, a state where the device is being currently used or a state where the device is broken down. For example, the automatic response AI acquires the information indicating the status of each device to be linked from the device to be linked, and displays the status information based on the acquired information. The acquisition of the information may be performed by the server 16.

When the user transmits the shortcut image as a message content of the user to the automatic response AI, the information on the linkage function associated with the shortcut image may be displayed, or the execution of the linkage function may be controlled.

As described above, the linkage function and the shortcut image are managed in association with each other, so that the user's burden to perform the operation to execute the linkage function next time and thereafter is lessened.

(Modification 3)

Hereinafter, Modification 3 will be described. In Modification 3, the notification of a linkage function is controlled according to an order of transmitting information of a device to the automatic response AI. Hereinafter, Modification 3 will be described in detail with reference to FIGS. 15 to 17.

FIG. 15 illustrates an example of a linkage function management table according to Modification 3. In the linkage function management table, for example, information indicating a combination of device IDs, information indicating a device name of each device to be linked (for example, a type of each device), information indicating a linkage function (linkage function information), information indicating an access order, and information indicating a priority are associated with each other. The device ID and the device name correspond to an example of the device identification information. In addition, a linkage function executable by using three or more devices may be set. In this case, a combination of the three or more devices and a linkage function are associated with each other, and the association is registered in the linkage function management table.

The access order corresponds to an order of designating a device, and for example, corresponds to an order of transmitting information of a device (for example, a device image, character information, or voice information) as a message content of the user to the automatic response AI. For example, when the user sequentially transmits information of each of plural devices as a message content of the user to the automatic response AI, the sequential order corresponds to the access order. Specifically, when the user first transmits information of a first device as a message content of the user to the automatic response AI, and then, transmits information of a second device as a message content of the user to the automatic response AI, the first device is considered designated first, and the second device is considered designated second.

The priority corresponds to a priority for the notification (for example, display or voice output) of information on a linkage function. For example, the combination of the PC A and the multifunction machine B is associated with the "scanning transmitting function" and the "printing function" which are linkage functions. For example, when the information of each of the multifunction machine B and the PC A is transmitted in this order as a message content of the user to the automatic response AI, the "scanning transmitting function" has a "first priority," and the "printing function" has a "second priority." In this case, the information on the "scanning transmitting function" is notified in preference to the information on the "printing function." For example, the information on the "scanning transmitting function" is displayed at a higher rank or earlier than the information on the "printing function." Meanwhile, when the information of each of the PC A and the multifunction machine B is transmitted in this order as a message content of the user to the automatic response AI, the "printing function" has a "first priority," and the "scanning transmitting function" has a "second priority." In this case, the information on the "printing function" is displayed in preference to the information on the "scanning transmitting function."

Figure 16:
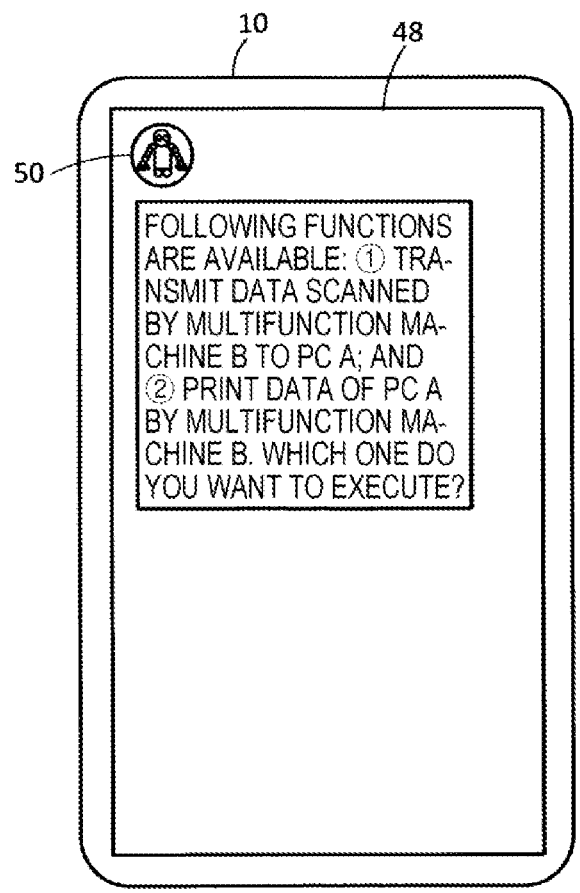
FIG. 16 is a view illustrating a screen.

FIG. 16 illustrates an example of the display according to the priority. For example, when the device images 56 and 60 are transmitted in an order of the multifunction machine B and the PC A as a message content of the user to the automatic response AI, the "scanning transmitting function" has a "first priority," and the "printing function" has a "second priority." Thus, the information on the "scanning transmitting function" is displayed in preference to (for example, at a higher rank) the information on the "printing function" on the screen 48. When the user designates a linkage function and gives an execution instruction of the linkage function on the screen 48, the designated linkage function is executed.

Figure 17:
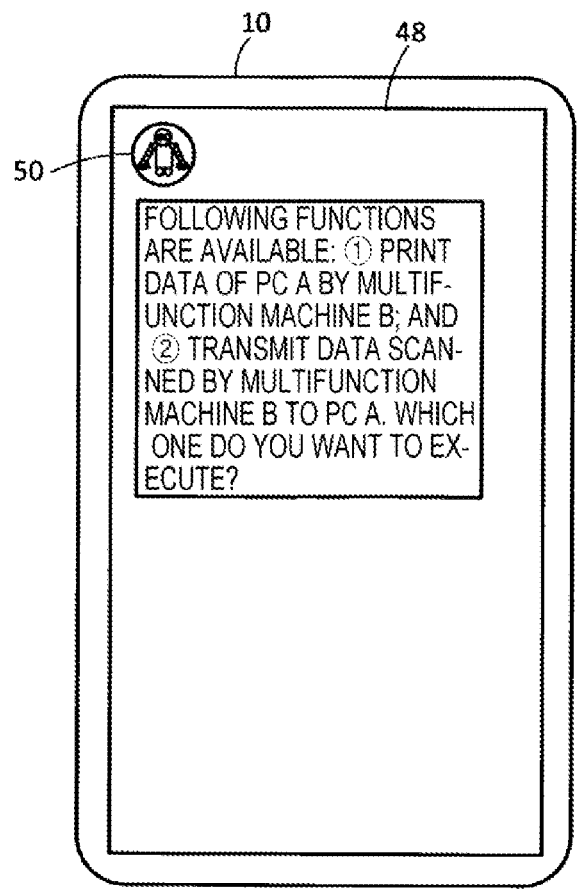
FIG. 17 is a view illustrating a screen.

FIG. 17 illustrates another example of the display according to the priority. For example, when the device images 56 and 60 are transmitted in an order of the PC A and the multifunction machine B as a message content of the user to the automatic response AI, the "printing function" has a "first priority," and the "scanning transmitting function" has a "second priority." Thus, the information on the "printing function" is displayed (for example, at a higher rank) in preference to the information on the "scanning transmitting function" on the screen 48.

As described above, the order of notifying information on a linkage function (for example, a displaying order) is changed according to the order of transmitting information of a device as a message content of the user to the automatic response AI. The access order of a device (the order of transmitting information of a device to the automatic response AI) also serves as an order of using a function of each device or an order of moving data between linked devices. Further, the operation to designate a device also serves as an operation to designate the order of using a function or the order of moving data. Thus, information on a linkage function which is predicted to be used by the user is preferentially notified, by changing the order of notifying information of a linkage function according to the access order. That is, information on a linkage function which is highly likely to be used by the user is preferentially notified. For example, when information of the multifunction machine B and the PC A is transmitted in this order as a message content of the user to the automatic response AI, it is predicted that the user is to use a linkage function to "transmit data from the multifunction machine B to the PC A by using the function of the multifunction machine B in preference to the PC A." In addition, when information of the PC A and the multifunction machine B is transmitted in this order as a message content of the user to the automatic response AI, it is predicted that the user is to use a linkage function of "transmitting data from the PC A to the multifunction machine B by using the function of the PC A in preference to the multifunction machine B." Thus, information on a linkage function which is highly likely to be used by the user is preferentially notified, by changing the order of notifying information on a linkage function according to the order of selecting a device.

(Modification 4)

Hereinafter, Modification 4 will be described. In Modification 4, different functions are assigned to respective portions in a device image associated with a device. When portions in a device image are designated by the user, and information of the portions is transmitted as a message content of the user to the automatic response AI, information on a linkage function executable by using the functions assigned to the portions is notified. Hereinafter, Modification 4 will be described in detail.

FIG. 18 illustrates an example of a device function management table according to Modification 4. In the device function management table, for example, a device ID, information indicating a device name (for example, a type of a device), information indicating a position in a device image (a position of a portion), and information indicating a function corresponding to a position in a device image (a position of a portion) (function information), and an image ID are associated with each other. The position in a device image is a specific position (a specific portion) in a device image associated with a device and is, for example, a specific position in a device image schematically representing a device or a specific position in a device image captured by the camera. The respective specific positions (portions) in a device image are associated with different functions. In addition, a linkage function executable by using three or more portions may be set. In this case, the combination of the three or more portions and a linkage function are associated with each other, and the association is registered in the linkage function management table. In addition, a linkage function executable by using a portion and an entire device may be set, and the association between the combination of the portion and the entire device and the linkage function may be registered in the linkage function management table.

Figure 20A:
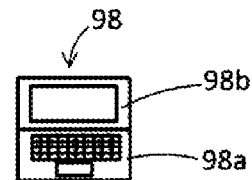
FIGS. 20A and 20B are views illustrating device images.
Figure 20B:
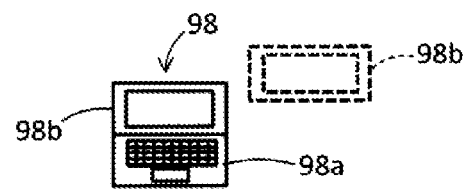

Hereinafter, portions of a device will be described in detail with reference to FIGS. 19A, 19B, 20A, and 20B. Each of FIGS. 19A and 19B illustrates a device image 96 associated with the multifunction machine B as a device. Each of FIGS. 20A and 20B illustrates a device image 98 associated with the PC A as a device. The multifunction machine B or the PC A is identified by applying the identification technique as described above (for example, the AR technique). In addition, the identification of a portion is also implemented by using the identification technique described above. For example, each portion of a device is identified by capturing each portion and using the markerless AR technique.

For example, as illustrated in FIG. 19A, the "printing function" is assigned to the position associated with the main body portion of the multifunction machine B (a portion image 96a) in the device image 96. The "scanning function" is assigned to the position associated with the document cover, the document glass, or the automatic document feeder of the multifunction machine B (a portion image 96b) in the device image 96. A "stapling function" is assigned to the position associated with the post-processing device (a portion image 96c) in the device image 96. The "stapling function" is a function of binding output papers with a staple.

In addition, as illustrated in FIG. 20A, a "data saving function" is assigned to the position associated with the main body portion of the PC A (a portion image 98a) in the device image 98. A "screen displaying function" is assigned to the specific position associated with the display unit of the PC A (a portion image 98b) in the device image 98. The "data saving function" is a function of saving data transmitted from another device in the PC A. The "screen displaying function" is a function of displaying data transmitted from another device by the PC A.

Each portion image may be operated to be separated from the device image. For example, when the device image 96 is displayed on the display unit of the UI unit 20, and the user selects the portion image 96b and perform an operation to separate the portion image 96b from the device image 96, the portion image 96b is displayed apart from the device image 96 as illustrated in FIG. 19B. In FIG. 19B, the separated portion image 96b is indicated by a dashed line. For example, the portion image may be operated by the dragging and dropping operations. Specifically, the user may select a portion image, separate the portion image from the device image by performing the dragging operation, and display the portion image at a desired display position by performing the dropping operation at the display position. In addition, when the device image 96 is displayed in the stock area 58, and the user selects a portion image of the device image 96 (for example, the portion image 96b) and performs an operation to separate the portion image from the device image 96, the portion image 96b may be displayed apart from the device image 96 outside the stock area 58. In addition, even though the operation to separate the portion image from the device image has been performed, the portion image may be still displayed at the original position. The portion images 96a and 96c may also be displayed to be separated from the device image 96.

In the device image 98 as well, the portion images 98a and 98b may be displayed to be separated from the device image

98, as in the device image 96. In FIG. 20B, the portion image 98b (indicated by a dashed line) is separated from the device image 98.

In Modification 4, the user may transmit portion images as a message content of the user to the automatic response AI. In this case, the specifying unit 28 identifies the portions associated with the portion images as portions to be linked. When the user transmits plural portion images as a message content of the user to the automatic response AI, the specifying unit 28 identifies the portions associated with the respective plural portion images as portions to be linked, and specifies a linkage function executable by using the plural portions.

In addition, when a device image is displayed on the display unit of the UI unit 20, the controller 26 may display the name of a function assigned to each position in the device image (for example, printing or scanning) on the display unit of the UI unit 20. Accordingly, the information of the function assigned to each position is provided to the user. In addition, the name of the function may not be displayed.

Hereinafter, a process using portion images will be described by using specific examples.

Figure 21:
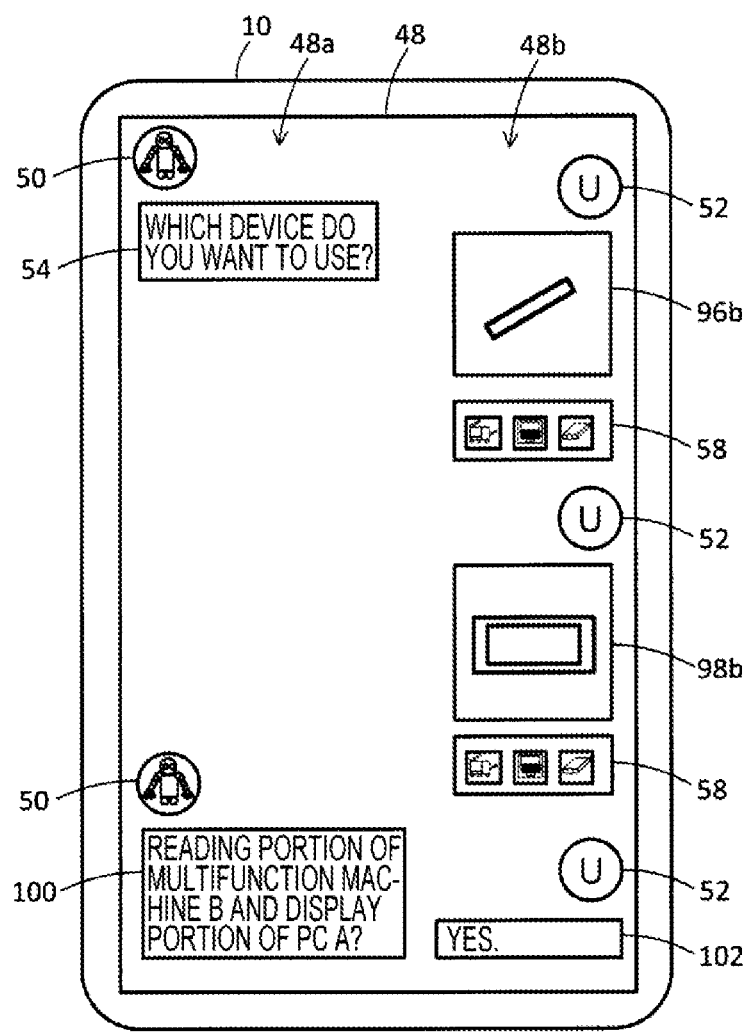
FIG. 21 is a view illustrating a screen.

FIG. 21 illustrates the screen 48. As in FIG. 8, the screen 48 displays the image 50 associated with the automatic response AI and the image 52 associated with the user, and further, displays information indicating a conversation between the user and the automatic response AI. Further, the screen 48 displays the stock area 58.

As in FIG. 8, the message content that "Which device do you want to use?" is displayed in the display area 48a as the message content 54 of the automatic response AI.

When the user designates portions of devices in response to the message content 54, the specifying unit 28 (the specifying unit 28 implemented by the automatic response AI) identifies the portions of the devices as portions to be linked. For example, as illustrated in FIG. 21, when the user designates the portion image 96b associated with a portion of the multifunction machine B and transmits the portion image 96b as a message content of the user to the automatic response AI, the specifying unit 28 identifies the portion associated with the portion image 96b as a portion to be linked. In the example illustrated in FIG. 21, the operation by the user to display the portion image 96b in the display area 48b corresponds to an act for the user to make a message content as in the example illustrated in FIG. 8. In addition, the user may input a character string indicating the portion of the device as a message content of the user to the terminal device 10 by operating the UI unit 20. In this case, the specifying unit 28 identifies the portion indicated by the character string as a portion to be linked. In addition, the information of the portion to be linked may be input by voice as a message content of the user to the terminal device 10.

For example, the user selects the portion image 96b included in the device image 96 displayed in the stock area 58, moves the portion image 96b from the stock area 58 to the position where a message content of the user is displayed, by the dragging operation, and performs the dropping operation at the position where a message content is displayed. With the operations, the controller 26 transmits the portion image 96b as a message content of the user to the automatic response AI.

In the example illustrated in FIG. 21, in addition to the portion image 96b, the user takes the portion image 98b out from the stock area 58, and moves the portion image 98b to the position where a message content of the user is displayed. With the operation, the portion image 98b is transmitted as a message content of the user to the automatic response AI.

When the user transmits the information of the plural portions as a message content of the user to the automatic response AI on the screen 48, that is, when the user makes a message indicating the information of the plural portions as information of portions to be linked, the specifying unit 28 identifies the plural portions as portions to be linked. In the example described above, the multifunction machine B associated with the device image 96 including the portion image 96b and the PC A associated with the device image 98 including the portion image 98b are identified as devices to be linked, and the "scanning function" corresponding to the portion image 96b and the "screen displaying function" corresponding to the portion image 98b are identified as functions to be linked.

When the devices to be linked (for example, the PC A and the multifunction machine B) are identified, the specifying unit 28 specifies linkage functions associated with the combination of the PC A and the multifunction machine B in the linkage function management table illustrated in FIG. 7. Further, the specifying unit 28 specifies functions associated with the portions in the device images transmitted as a message content of the user to the automatic response AI, by referring to the device function management table illustrated in FIG. 18. Then, the specifying unit 28 raises the priority of the linkage function which uses the functions associated with the portions, and lowers the priority of the linkage function which does not use the functions, among the linkage functions executable by using the PC A and the multifunction machine B. The controller 26 of the terminal device 10 displays the information on the linkage functions according to the priorities as a message content of the automatic response AI on the screen 48.

For example, when the multifunction machine B and the PC A are identified as devices to be linked, and the portions of the devices are identified as portions to be linked, the controller 26 display the information of the portions of the devices identified as devices to be linked as a message content 100 of the automatic response AI on the screen 48. When the user approves the message content 100 (for example, when the user makes a message content 102 answering "Yes"), the screen 48 displays the information on the linkage functions executable by using the plural portions designated by the user.

Figure 22:
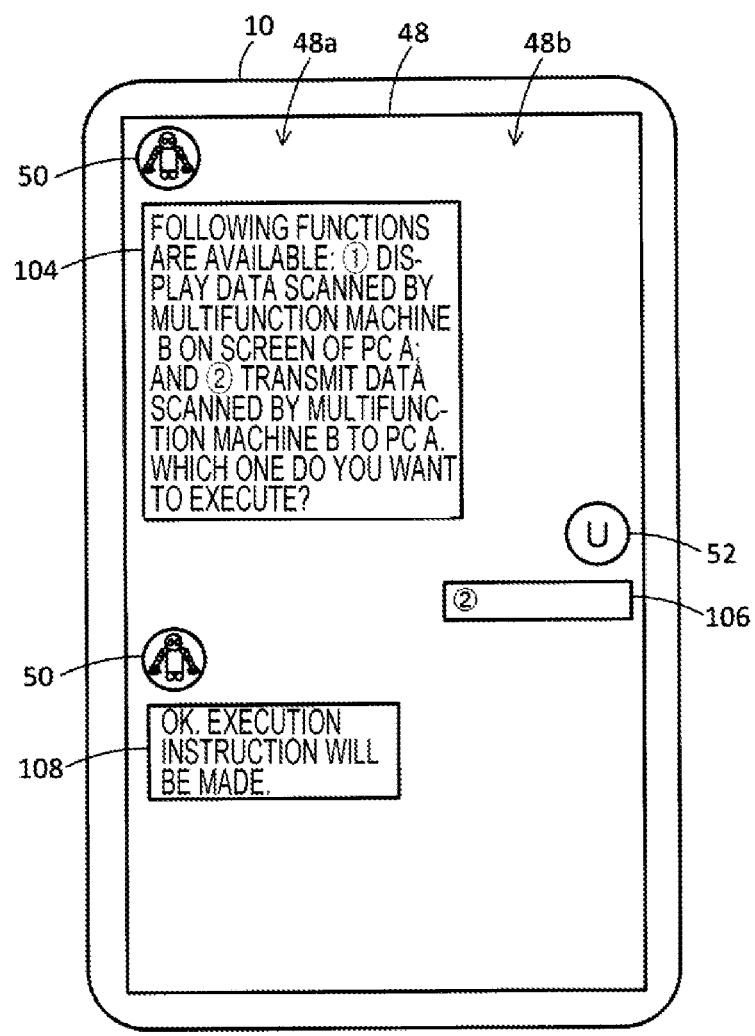
FIG. 22 is a view illustrating a screen.

FIG. 22 illustrates the screen 48 which is continuous to FIG. 21. When the linkage functions are specified as described above, the controller 26 display the information on the linkage functions in the display area 48a as a message content 104 of the automatic response AI. Since the "scanning function" and the "screen displaying function" are designated in this order by the user, information on a "scanning transmitting displaying function" which is a linkage function executable by using the "scanning function" and the "screen displaying function" is displayed in preference to (for example, at a higher rank) information on the other linkage functions. For example, the information on the "scanning transmitting displaying function" is displayed in preference to information on a "scanning transmitting saving function" which is a linkage function executable by using the "scanning function" and "data saving function." In addition, the "scanning transmitting displaying function" is a function of transmitting data generated by scanning by the multifunction machine B to the PC A and display the data on the screen of the PC A. The "scanning transmitting saving function" is a function of transmitting data generated by scanning by the multifunction machine B to the PC A and save the data in the PC A.

When the user designates a linkage function by a message content 106 and gives an instruction to execute the linkage function in response to the message content 104 of the automatic response AI, the controller 26 receives the execution instruction and transmits the execution instruction information to the devices to be linked. Further, the controller 26 displays information indicating that the execution instruction has been received, in the display area 48a as a message content 108 of the automatic response AI. For example, when an instruction to execute the "scanning transmitting displaying function" is given, data generated by scanning by the multifunction machine B is transmitted to the PC A and displayed on the screen of the PC A.

In addition, a screen for controlling the devices to be linked (for example, the multifunction machine B and the PC A) (a remote control screen) may be displayed on the display unit of the UI unit 20.

According to Modification 4, when devices to be linked have plural functions, the functions are individually designated, and information on a linkage function executable by using the designated functions is preferentially notified. Thus, a linkage function which is predicted to be used by the user is preferentially notified.

In addition, the linkage function may be a function using a combination of portions of the same device or portions of different devices, a function using a combination of an entire device and a portion of a device, or a function using a combination of entire devices.

In addition, by combining modifications 3 and 4, the display of information on a linkage function may be switched according to an order of transmitting information of a device or a portion of a device as a message content of the user to the automatic response AI.

In addition, when information of one portion is transmitted as a message content of the user to the automatic response AI, information on a solo function executable by using the one portion is displayed on the display unit of the UI unit 20.

Hereinafter, another example of the process using portion images will be described.

FIG. 23 illustrates another example of the device function management table according to Modification 4. In the device function management table, for example, a device ID, information indicating a device name (for example, a type of a device), information indicating a name of a portion of a device (for example, a type of the portion), a portion ID which is portion identification information for identifying the portion, information indicating a function assigned to the portion (a function that the portion has), and a portion image ID for identifying a portion image associated with the portion are associated with each other. The portion image represents the external appearance of a portion of a device obtained by capturing with the camera. In addition, a portion image schematically representing a portion of a device may be associated with the portion. For example, different functions are assigned to respective portions of a device.

As a specific example, the screen displaying function is assigned to the display portion of the PC A, and information indicating the screen displaying function is associated with the portion image ID of the portion image associated with the display portion. The screen displaying function is a function of displaying information by the PC A. The data saving function is assigned to the main body portion of the PC A, and information indicating the data saving function is associated with the portion image ID of the portion image associated with the main body portion. The data saving function is a function of saving data in the PC A.

In addition, the printing function is assigned to the main body portion of the multifunction machine B, and information indicating the printing function is associated with the portion image ID of the portion image associated with the main body. The scanning function is assigned to the reading unit of the multifunction machine B (for example, the portion associated with the document cover, the document glass, or the automatic document feeder of the multifunction machine B), and information indicating the scanning function is associated with the portion image ID of the portion image associated with the reading portion. The stapling function is assigned to the post-processing device of the multifunction machine B, and information indicating the stapling function is associated with the portion image ID of the portion image associated with the post-processing device. The stapling function is a function of binding output papers with a staple.

The functions assigned to the portions of the devices are specified (identified) by using the markerless AR technique. For example, when a portion of a device is captured by a camera (for example, the camera 22 of the terminal device 10), the specifying unit 28 specifies (identifies) a function associated with the external appearance image data in the device function management table illustrated in FIG. 23. Accordingly, the function assigned to the captured portion is specified (identified). For example, when the main body portion of the multifunction machine B is captured by the camera 22, the specifying unit 28 specifies the printing function associated with the external appearance image data representing the main body portion of the multifunction machine B in the device function management table. Accordingly, the printing function assigned to the main body portion of the multifunction machine B is specified.

In addition, the functions assigned to the portions of the devices may be specified (identified) by using the marker AR technique. For example, each portion of a device is provided with a marker such as a two-dimensional barcode obtained by encoding portion identification information for identifying the portion (for example, the portion ID). When the marker provided in the portion is captured by a camera and the marker AR technique is applied, the portion identification information (for example, the portion ID) of the portion is acquired. When the portion identification information is acquired, the specifying unit 28 specifies (identifies) a function associated with the portion identification information (for example, the portion ID) in the device function management table illustrated in FIG. 23.

FIG. 24 illustrates an example of a linkage function management table according to Modification 4. The linkage function management table is information indicating a linkage function using functions that plural portions have. In the linkage function management table, for example, information indicating a combination of portions of devices, information indicating a combination of portion IDs, and information indicating a linkage function executable by using functions that the plural portions included in the combination have are associated with each other. In addition, in the linkage function management table, information indicating a combination of a portion of a device and an entire device and information indicating a linkage function using a function that the portion of the device has and a function that the entire device has may be associated with each other.

As a specific example, the "printing function" is assigned as a linkage function to a combination of the display unit of the PC A and the main body portion of the multifunction machine B. The "printing function" which is a linkage function is a function of transmitting data saved in the PC A to the multifunction machine B and print the data by the multifunction machine B.

Further, the "printing function" is assigned as a linkage function to a combination of the main body portion of the multifunction machine B and the main body portion of the projector C. The "printing function" which is a linkage function is a function of transmitting data projected by the projector C to the multifunction machine B and print the data by the multifunction machine B.

Further, a "scanning projecting function" is assigned as a linkage function to a combination of the reading unit of the multifunction machine B and the main body portion of the projector C. The "scanning projecting function" which is a linkage function is, for example, a function of transmitting data generated by scanning by the multifunction machine B to the projector C and project the data by the projector C.

In addition, the linkage function may be a function executable by using functions that plural portions included in the same device have, or a function executable by using functions that portions of plural different devices have. In addition, the linkage function may be a function executable by using functions that three or more portions have.

For example, when the user transmits plural portion images as a message content of the user to the automatic response AI, the specifying unit 28 specifies (identifies) a linkage function associated with a combination of the portions associated with the respective plural portion images, in the linkage function management table illustrated in FIG. 24. For example, when a portion image associated with the main body portion of the multifunction machine B and a portion image associated with the main body portion of the projector C are transmitted to the automatic response AI, the specifying unit 28 specifies, for example, the "printing function" which is the linkage function associated with the combination of the main body portion of the multifunction machine B and the main body portion of the projector C in the linkage function management table illustrated in FIG. 24. As illustrated in FIG. 22, the information on the linkage function is displayed in the display area 48a as a message content of the automatic response AI.

In addition, by combining modifications 3 and 4, the display of information on a linkage function may be switched according to an order of transmitting a device image or a portion image as a message content of the user to the automatic response AI.

(Modification 5)

Hereinafter, Modification 5 will be described. In Modification 5, information on a linkage function is first input by the user as a message content of the user to the terminal device 10, and then, information on devices to be linked is input as a message content of the user to the terminal device 10. Hereinafter, Modification 5 will be described in detail.

Figure 25:
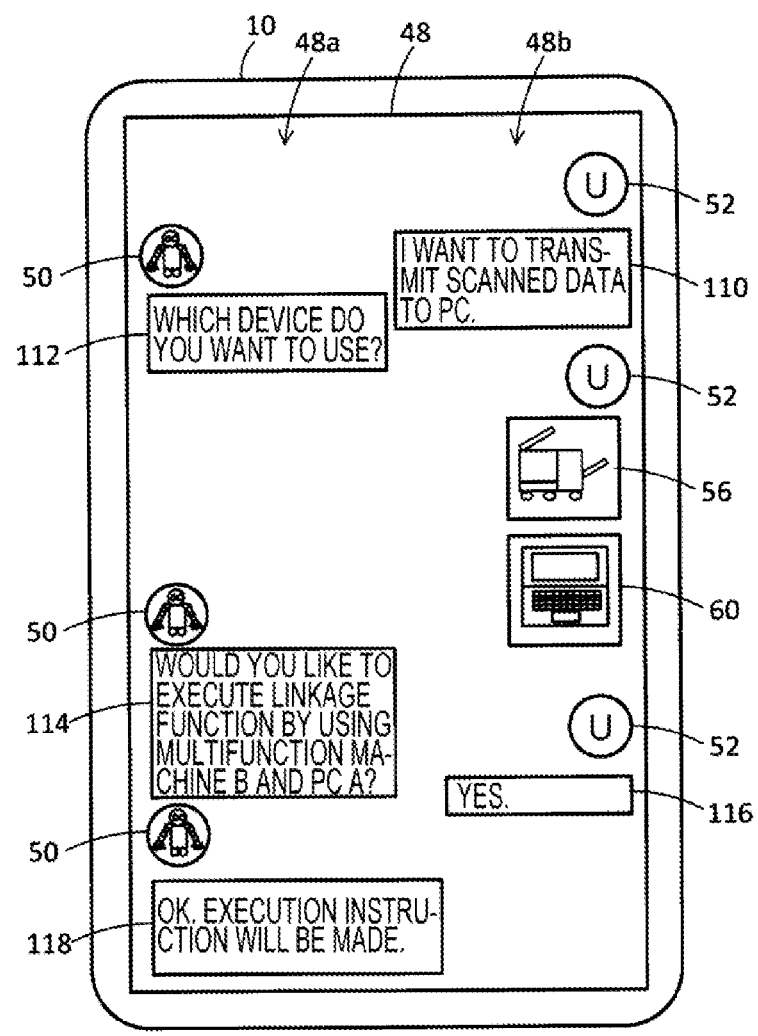
FIG. 25 is a view illustrating a screen.

FIG. 25 illustrates the screen 48. As in FIG. 8, the screen 48 displays the image 50 associated with the automatic response AI, the image 52 associated with the user, and information indicating a conversation between the user and the automatic response AI.

First, the user inputs a message content 110 indicating a request for executing a linkage function. In the example illustrated in FIG. 25, the user requests a linkage function of transmitting scanned data to a PC. The automatic response AI determines that the user is requesting execution of a linkage function, by analyzing the message content 110, and make a message content 112 for requesting the user to inform devices to be used for the linkage function. The controller 26 displays the message content 112 in the display area 48a. In response to the message content 112, the user inputs information on devices to be used for the linkage function to the terminal device 10. The user may input the information on the devices to the terminal device 10 by placing device images as the information on the devices at the position where a message content of the user is displayed, or may input the information on the devices to the terminal device 10 by voice. In the example illustrated in FIG. 25, the device images 56 and 60 are displayed at the position where a message content of the user is displayed. Accordingly, the controller 26 transmits the device images 56 and 60 as a message content of the user to the automatic response AI, and the specifying unit 28 identifies the multifunction machine B associated with the device image 56 and the PC A associated with the device image 60 as devices to be linked. The automatic response AI makes a message content 114 indicating the identified devices, and the controller 26 display the message content 114 in the display area 48a. When the user makes a message content 116 indicating an instruction to execute the linkage function in response to the message content 114, the controller 26 causes the multifunction machine B and the PC A to execute the linkage function requested by the user. Further, the controller 26 display the information indicating that the instruction to execute the linkage function has been made, in the display area 48a as a message content 118 of the automatic response AI.

As described above, according to Modification 5, even when the user first transmits information on a linkage function to the automatic response AI, the linkage function may be executed by the simple operation through a conversation with the automatic response AI.

(Modification 6)

Hereinafter, Modification 6 will be described. In Modification 6, a notification of a linkage function is controlled according to information obtained by the automatic response AI by a learning function of the automatic response AI. The automatic response AI acquires, for example, information on the user (for example, information indicating an operation history of the terminal device 10, information indicating an operation history of a device, and information indicating a behavior history), and information on the devices 12 and 14 (for example, information indicating a use history and information indicating a state of each device), by the learning function. The automatic response AI may acquire the information from the terminal device 10, devices such as the devices 12 and 14, the server 16, another device (for example, a cloud system), or an operation assistant stored in another device (for example, AI stored in another device).

The controller 26 controls a notification of a linkage function according to the information acquired by the automatic response AI. For example, when the automatic response AI acquires information indicating a history of use of a device by the user or information indicating the user's schedule (plan) (schedule information), the controller 26 refers to the use history or the schedule, and preferentially displays information on a linkage function which is highly likely to be used by the user, as a message content of the automatic response AI on the display unit of the UI unit 20. For example, when the user transmits plural device images as a message content of the user to the automatic response AI, plural linkage functions executable by using the devices associated with the plural device images are specified. The controller 26 analyzes the use history or the schedule, and preferentially displays information on a linkage function which is highly likely to be used by the user among the plural linkage functions, on the display unit of the UI unit 20. For example, the controller 26 compares timings and schedules in which the plural devices are designated as devices to be linked in the past, and preferentially displays information on a linkage function which is highly likely to be used at the present time, on the display unit of the UI unit 20.

As a specific example, it is assumed that the user transmitted first and second device images as a message content of the user to the automatic response AI in the morning of a day, in the past, when the user went out in the afternoon, and a linkage function Z is executed. In the circumstance where the use history described above exists and when the user transmits the first and second device images as a message content of the user to the automatic response AI at a timing during the morning of a day when the user plans to go out in the afternoon, the controller 26 determines that the linkage function Z is highly likely to be used, and preferentially displays the information on the linkage function Z on the display unit of the UI unit 20.

As another specific example, it is assumed that first and second device images are transmitted as a message content of the user to the automatic response AI in the certain time period in the past, and the video recording function is executed as a linkage function so that a program of a channel X is recorded. In the circumstance where the use history described above exists, when the first and second device images are transmitted as a message content of the user to the automatic response AI at a timing included in the certain time period in the past, the controller 26 determines that the video recording function described above is highly likely to be used, and preferentially displays the information on the recording function (for example, information of the function of recording the channel X) on the display unit of the UI unit 20.

In addition, when the devices associated with the device images transmitted to the automatic response AI are being used or broken down, the controller 26 may display the information on the linkage function executable by using the devices, in a state where the priority of the information is lowered, on the display unit of the UI unit 20. When the devices are not being broken down and are not being used, the controller 26 preferentially displays the information on the linkage function executable by using the devices on the display unit of the UI unit 20. Accordingly, the information on an immediately usable linkage function is preferentially provided to the user.

(Modification 7)

Hereinafter, Modification 7 will be described. In Modification 7, the automatic response AI recommends a device to be linked. For example, when the user transmits a device image as a message content of the user to the automatic response AI, the specifying unit 28 identifies the device associated with the device image, and specifies a device capable of executing a linkage function in combination with the identified device by referring to the linkage function management table. The controller 26 displays the information on the device specified by the specifying unit 28 as a message content of the automatic response AI on the display unit of the UI unit 20. For example, when the user transmits the device image 56 associated with the multifunction machine B as a message content of the user to the automatic response AI, the specifying unit 28 specifies a device capable of executing a linkage function in combination with the multifunction machine B (for example, a PC or a projector), by referring to the linkage function management table. The information on the specified device (for example, a PC or a projector) is displayed as a message content of the automatic response AI on the display unit of the UI unit 20. Accordingly, the device to be linked is provided to the user.

In addition, the specifying unit 28 may specify a device which is actually used in combination with the device associated with the device image described above (for example, the multifunction machine B), based on a use history of a linkage function (a history of use by the user or another user), and the controller 26 may display the information on the specified device as a message content of the automatic response AI on the display unit of the UI unit 20. For example, the specifying unit 28 may specify a device which is used in combination with the device associated with the device image described above (for example, the multifunction machine B) with a frequency (for example, the number of times of use) equal to or more than a predetermined threshold. Accordingly, a device having a relatively high use frequency is provided to the user.

In addition, the controller 26 may preferentially display information on a device used with a relatively higher frequency in combination with the device associated with the device image described above (for example, the multifunction machine B), on the display unit of the UI unit 20.

(Modification 8)

Hereinafter, Modification 8 will be described. In Modification 8, plural automatic response AIs may be linked to each other. For example, the automatic response AI stored in the terminal device 10 may share information (for example, information of a use history of a linkage function and information of a use history of a device) with an automatic response AI stored in another terminal device. In this case, the specifying unit 28 may specify a linkage function or recommend a device to be linked as in Modification 7, by using the shared information which is acquired by the automatic response AI. For example, the specifying unit 28 may specify a device capable of executing a linkage function in combination with a device transmitted by the user to the operation assistant, by using the information of the use history included in the shared information.

In addition, an automatic response AI may be set for each user. In this case, plural automatic response AIs may be stored in the same terminal device 10. Each automatic response AI may manage information on the user associated with the own automatic response AI (for example, information of an operation history of the terminal device 10, information of a use history of a linkage function, and information of a use history of a device), and share the information with the other automatic response AIs. In this case, each automatic response AI may recommend a device to be linked or recommend a linkage function by using the shared information.

(Modification 9)

Hereinafter, Modification 9 will be described. In Modification 9, a conversation between the user and the automatic response AI is conducted by voice. For example, when the user utters names of devices to be linked (for example, the multifunction machine B and the PC A) by voice, the voice is input to the terminal device 10, and the specifying unit 28 (the specifying unit 28 implemented by the automatic response AI) receives the input of the voice and specifies a linkage function. The information on the linkage function may be displayed as a message content of the automatic response AI on the display unit of the UI unit 20 or may be issued as voice information. When a voice input is used, the image associated with the automatic response AI may not be displayed on the display unit of the UI unit 20. In addition, when the image associated with the automatic response AI is displayed, the information on the devices may be input by voice as a message content of the user to the terminal device 10.

Second Exemplary Embodiment

Hereinafter, a device system according to a second exemplary embodiment will be described. In the first exemplary embodiment described above, when information of devices is transmitted as a message content of the user to the automatic response AI, information on a linkage function is notified as a message content of the automatic response AI. Meanwhile, in the second exemplary embodiment, when information of functions is transmitted as a message content of the user to the automatic response AI, information on a linkage function is notified as a message content of the automatic response AI. The information of a function is identification information for identifying the function and is, for example, a function image associated with the function or character information or voice information indicating the identification information. For example, when the user transmits a function image associated with a function to the automatic response AI, when the user provides the automatic response AI with a character string indicating identification information of a function by inputting the character string to the terminal device 10, or when the user provides the automatic response AI with identification information of a function by voice, the specifying unit 28 identifies the function.

The function image may be, for example, an image associated with software (for example, an application) or an image associated with a device by which a process is executed (a device existing in a real space). The function image is, for example, an image such as an icon and may be said as a virtual image which is distinguishable from an image representing the actual external appearance of a hardware device (for example, a photo) or an image representing a device itself. For example, when function images associated with pieces of software are transmitted as a message content of the user to the automatic response AI, information indicating a linkage function executable by using the pieces of software associated with the function images is notified as a message content of the automatic response AI. Hereinafter, the second exemplary embodiment will be described in detail.

FIG. 26 illustrates an example of a linkage function management table according to the second exemplary embodiment. The linkage function management table is information indicating a linkage function executable by using plural functions. In the linkage function management table, for example, a function ID (for example, an ID for identifying software), information indicating a function name (for example, a software name), and information indicating a linkage function executable by using plural functions are associated with each other. A linkage function executable by using plural functions is specified by referring to the linkage function management table.

For example, software α as a function is software for transmitting data, and software β as a function is software for setting a password for data. For example, a linkage function of setting a password for data and then transmitting the data is implemented by combining the software α and the software β. Executable linkage functions are also set for other pieces of software.

In addition, a linkage function executable by using three or more functions (for example, pieces of software) may be set. In this case, the combination of the three or more functions and the linkage function are associated with each other, and the association is registered in the linkage function management table.

Hereinafter, the second exemplary embodiment will be described in detail by using specific examples.

Figure 27:
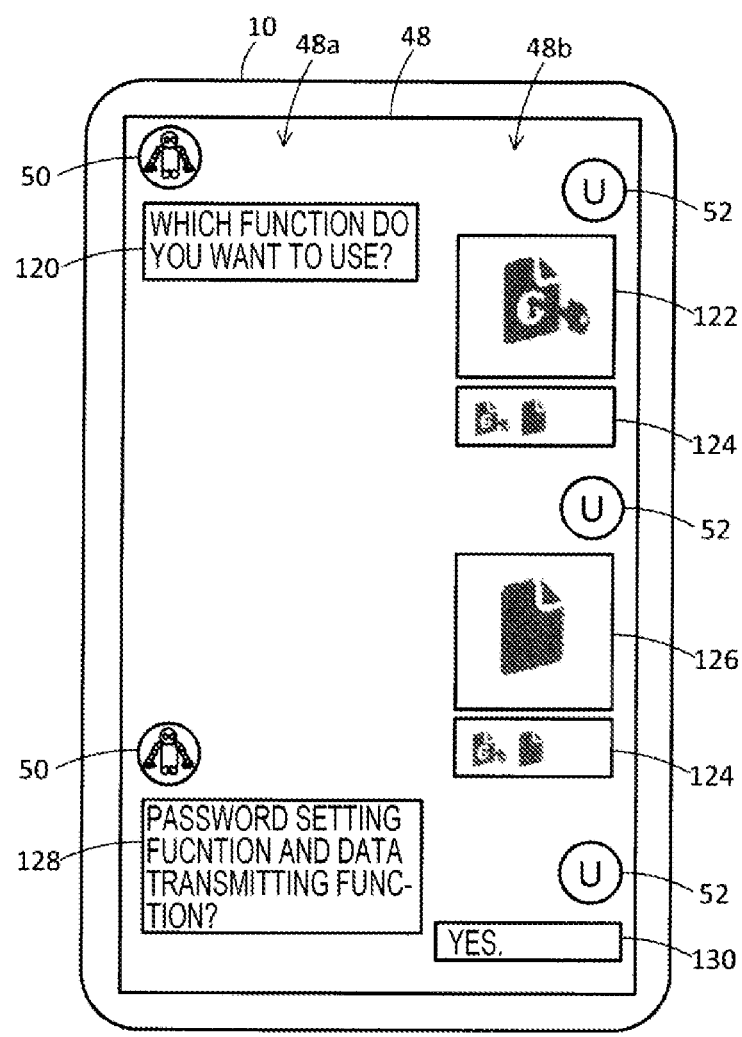
FIG. 27 is a view illustrating a screen.

FIG. 27 illustrates the screen 48. As in FIG. 8, the screen 48 displays the image 50 associated with the automatic response AI, the image 52 associated with the user, and information indicating a conversation between the user and the automatic response AI.

For example, a message content 120 that "Which function do you want to use?" is displayed in the display area 48*a* as a message content of the automatic response AI.

When the user designates functions in response to the message content 120, the specifying unit 28 (the specifying unit 28 implemented by the automatic response AI) identifies the functions as functions to be linked. For example, as illustrated in FIG. 27, when the user designates a function image 122 associated with a function and places the function image 122 at the position where a message content of the user is displayed, the controller 26 transmits the function image 122 as a message content of the user to the automatic response AI. In response to this operation, the specifying unit 28 identifies the function associated with the function image 122 as a function to be linked. In the example illustrated in FIG. 27, the operation by the user to display the function image 122 in the display area 48*b* corresponds to an act for the user to make a message content. In addition, the user may input a character string indicating a function as a message content of the user to the terminal device 10 by operating the UI unit 20. In this case, the specifying unit 28 identifies the function indicated by the character string as a function to be linked. In addition, information of a function to be linked may be input by voice as a message content of the user to the terminal device 10.

The function image 122 is an image associated with a password setting function (for example, an image associated with password setting software). When the user selects the function image 122 and makes an instruction to activate the password setting function, for example, the password setting software is activated, and the password setting process is performed on, for example, data.

For example, the controller 26 displays a stock area 124 in the display area 48*b* for the user, and displays function images in the stock area 124, as in the first exemplary embodiment. For example, the controller 26 displays function images associated with software installed in the terminal device 10 in the stock area 124. In addition, when there exists another function image that may not be displayed in the stock area 124, the other function image is displayed in the stock area 124 in the manner that the user performs an operation to scroll the function images displayed in the stock area 124.

As in the first exemplary embodiment, the user may select a function image associated with a function to be linked (the function image 122 in the example illustrated in FIG. 27) from the stock area 124, move the function image to the outside of the stock area 124, and transmit the function image 122 as a message content of the user to the automatic response AI. For example, the user moves the function image 122 from the stock area 124 to the position where a message content of the user is displayed, by performing the dragging operation, and performs the dropping operation at the position where a message content is displayed. With the operations, the controller 26 transmits the function image 122 as a message content of the user to the automatic response AI.

In the example illustrated in FIG. 27, in addition to the function image 122, the user selects a function image 126 from the stock area 124 and moves the function image 126 to the position where a message content of the user is displayed. With the operation, the function image 126 is transmitted as a message content of the user to the automatic response AI. The function image 126 is an image associated with a data transmitting function (for example, an image associated with data transmitting software). When the user selects the function image 126 and makes an instruction to activate the data transmitting function, for example, the data transmitting software is activated, and data or the like to be transmitted is transmitted to a transmission destination.

When the user transmits the information of the plural functions to the automatic response AI on the screen 48, that is, when the user makes a message indicating the information of the plural functions as information of functions to be linked, the specifying unit 28 specifies a linkage function associated with the plural functions in the linkage function management table illustrated in FIG. 26. The controller 26 displays the information on the linkage functions in the display area 48*a* as a message content of the automatic response AI.

In the example described above, the function images 122 and 126 are transmitted as functions to be linked to the automatic response AI. In this case, the specifying unit 28 identifies the function associated with the function image 122 and the function associated with the function image 126 as functions to be linked. In addition, the function image 122 may be first transmitted to the automatic response AI, and then, the function image 126 may be transmitted to the automatic response AI, or the function image 126 may be first transmitted to the automatic response AI, and then, the function image 122 may be transmitted to the automatic response AI.

As described above, when the function images 122 and 126 are transmitted to the automatic response AI, and the password setting function and the data transmitting function are identified as functions to be linked, the controller 26 displays the information of the functions identified as functions to be linked, in the display area 48*a* as a message content 128 of the automatic response AI. When the user approves the message content 128 (for example, when the user makes a message content 130 answering "Yes"), information on linkage functions executable by using the password setting function and the data transmitting function is displayed in the display area 48*a*.

The specifying unit 28 specifies the linkage function associated with the combination of the password setting function and the data transmitting function (for example, the "function of setting password for data and transmitting the data") in the linkage function management table illustrated in FIG. 26, at a timing when the function images 122 and 126 are transmitted as information of functions to be linked to the automatic response AI, or at a timing when the user approves the message content 128. Accordingly, the linkage functions executable by using the password setting function and the data transmitting function are specified. The information on the linkage functions specified as described above is displayed in the display area 48*a* as a message content of the automatic response AI. In addition, the process of specifying the functions or the linkage functions may be performed by the server 16.

Figure 28:
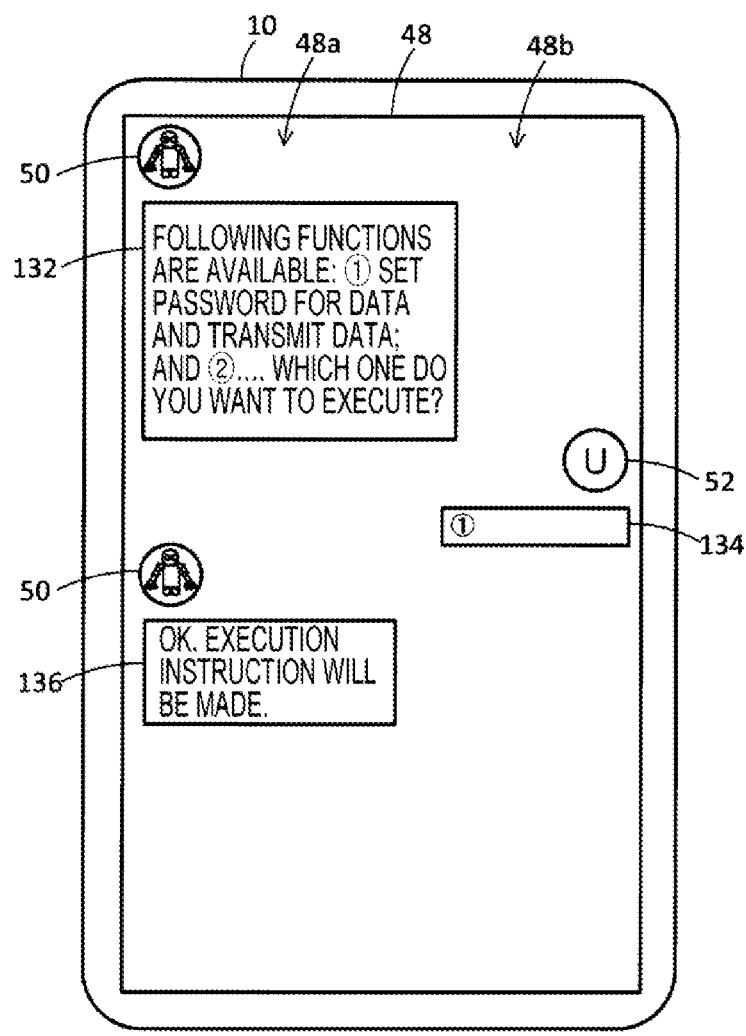
FIG. 28 is a view illustrating a screen.

FIG. 28 illustrates the screen 48 which is continuous to FIG. 27. When the linkage functions are specified as described above, the controller 26 of the terminal device 10 displays the information on the linkage functions as a message content 132 of the automatic response AI on the screen 48.

When the user designates a linkage function and gives an instruction to execute the linkage function by a message content 134 in response to the message content 132, the controller 26 receives the execution instruction and executes the linkage function. In addition, the controller 26 displays information indicating that the execution instruction has been received, as a message content 136 of the automatic response AI on the screen 48. As another example, the screen 48 may display a button image for instructing execution of a linkage function, and the user may press the button image to make the instruction to execute the linkage function. When the password setting function and the data transmitting function are selected as functions to be linked, the controller 26 activates the password setting software to set a password for data to be processed, and further, activates the data transmitting software to transmit the data to a reception destination.

In addition, the function images displayed in the stock area 124 in FIG. 27 or the information on the functions associated with the function images may be edited by the user. For example, when the user designates a function image displayed in the stock area 124 and gives an instruction to edit the function image, the controller 26 displays an editing screen on the display unit of the UI unit 20. For example, the controller 26 displays on the display unit of the UI unit 20 the editing screen when the user presses the function image for a long time (for example, the length of time during which the function image is pressed becomes equal to or longer than a threshold), when the user presses a button image for displaying the editing screen, or when the user inputs an editing instruction to the terminal device 10 by voice. On the editing screen, the function image may be edited, and for example, when a function is assigned to each portion of the function image, the image of the portion may be cut out from the function image. In addition, the information on the function associated with the function image may also be edited.

As another example, a function to be linked may be preset as a basic linkage function. The information of the basic linkage function may be stored in advance in the memory 24 of the terminal device 10. The user may designate the basic linkage function by using the UI unit 20. When the basic linkage function is set, the user transmits a function image associated with a function to be linked other than the basic linkage function, as a message content to the automatic response AI. Accordingly, the function to be linked is specified (identified), and a linkage function executable by using the basic function to be linked and the specified function is specified (identified).

As described above, according to the second exemplary embodiment, information on a linkage function is provided when information on functions to be linked is transmitted as a conversation content to the automatic response AI, on the screen 48 for making a conversation with the automatic response AI. Thus, the information on a linkage function is provided by the simple method using a conversation with the automatic response AI.

In addition, when three or more function images are transmitted as a conversation content to the automatic response AI, information on a linkage function executable by using the three or more function is provided.

In addition, when information of plural functions is transmitted as a message content of the user to the automatic response AI within a predetermined time limit, the specifying unit 28 may specify a linkage function executable by using the plural functions, and when information of one function is transmitted as a message content of the user to the automatic response AI within the time limit, the specifying unit 28 may specify the function as a solo function. In this case, the information on the linkage function or the solo function specified by the specifying unit 28 is displayed in the display area 48a as a message content of the automatic response AI. A starting time point of the time limit may be, for example, a time point when the automatic response AI requests the user to inform functions to be linked as in the message content 120, or a time point when the user transmits a first function image to the automatic response AI after the message content 120 occurs.

For example, in the example illustrated in FIG. 27, in a case where the user transmits only the function image 122 as a message content of the user to the automatic response AI within the time limit from the time point when the automatic response AI requests the user to inform functions to be linked as in the message content 120, the specifying unit 28 identifies the function (the solo function) associated with the function image 122. The controller 26 displays the information on the solo function in the display area 48a as a message content of the automatic response AI.

Meanwhile, in a case where the user transmits the function images 122 and 126 as a message content of the user to the automatic response AI within the time limit from the time point when the automatic response AI requests the user to inform functions to be linked in the message content 120, the specifying unit 28 specifies linkage functions associated with the combination of the password setting function and the data transmitting function in the linkage function management table illustrated in FIG. 26. The controller 26 displays the information on the linkage functions in the display area 48a.

The process described above may be identically performed in a case where the starting time point of the time limit is the time point when the user transmits a first function image (for example, the function image 122) to the automatic response AI.

By providing the time limit as described above, a switching between providing a linkage function and providing a solo function is possible.

In addition, when a linkage function associated with the combination of the plural functions designated by the user is not registered in the linkage function management table, the specifying unit 28 determines that the usable linkage function is not registered. In this case, the controller 26 displays a message indicating that the usable linkage function is not registered, in the display area 48a as a message content of the automatic response AI. Even in this case, the linkage function may become usable according to, for example, an updating status of a function. In this case, the specifying unit 28 specifies the linkage function that becomes usable.

In addition, Modifications 1 to 9 of the first exemplary embodiment may be also applied to the second exemplary embodiment.

Figure 29:
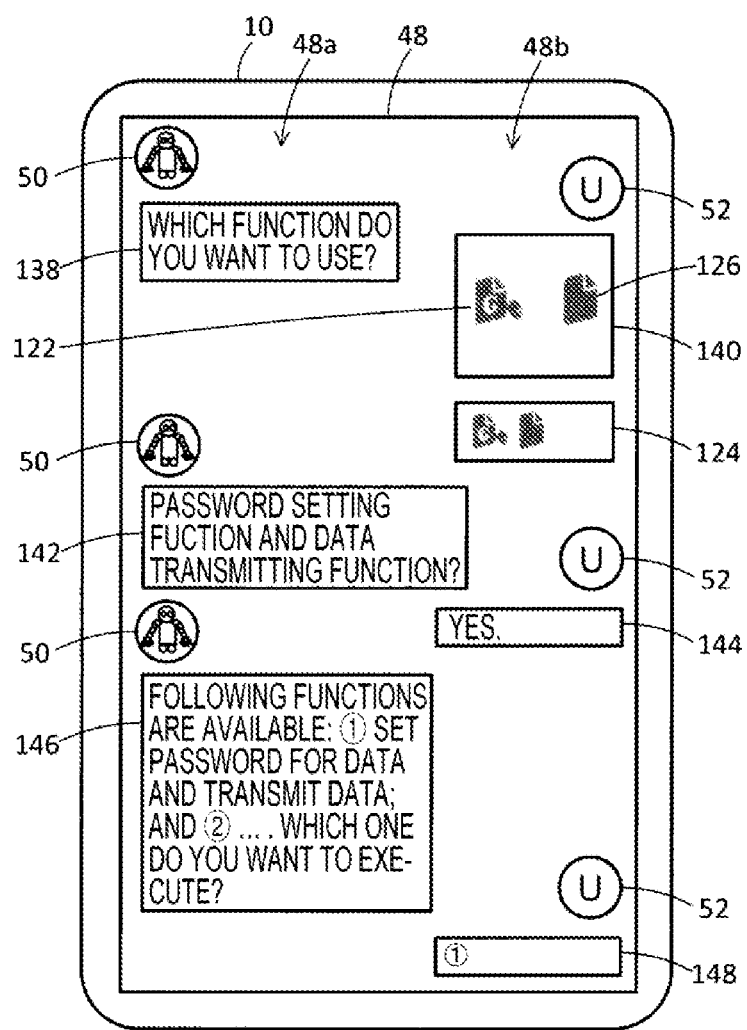
FIG. 29 is a view illustrating a screen.

FIG. 29 illustrates a process in a case where Modification 1 is applied to the second exemplary embodiment. As Modification 1 is applied, when information of plural functions to be linked is transmitted as a message content of the user to the automatic response AI, a linkage function executable by using the plural functions is notified. Hereinafter, the process in a case where Modification 1 is applied to the second exemplary embodiment will be described with reference to FIG. 29.

As in FIG. 27, the message content that "Which function do you want to use?" is displayed in the display area 48a as a message content 138 of the automatic response AI.

When the user designates an image 140 representing plural functions and transmits the image 140 as a message content of the user to the automatic response AI in response to the message content 138 above, the specifying unit 28 identifies the plural functions represented in the image 140 as functions to be linked. For example, when the image 140 represents the function image 122 associated with the password setting function and the function image 126 associated with the data transmitting function, the specifying unit 28 identifies the password setting function as a function to be linked based on the function image 122, and identifies the data transmitting function as a function to be linked based on the function image 126.

The user may select the function images 122 and 126 from the stock area 124 and superimpose the function images 122 and 126 on the image 140, by operating the screen 48. Accordingly, the function images 122 and 126 are represented in the image 140, and the image 140 is transmitted as a message content of the user to the automatic response AI.

As described above, when the password setting function and the data transmitting function are identified as described above, the controller 26 displays the information of the functions identified as functions to be linked, in the display area 48a as a message content 142 of the automatic response AI. When the user approves the message content 142 (for example, when the user makes a message content 144 answering "Yes"), information on the linkage functions executable by using the password setting function and the data transmitting function is displayed as a message content 146 of the automatic response AI on the screen 48. When the user designates a linkage function by a message content 148 and gives an instruction to execute the linkage function in response to the message content 146, the controller 26 activates the password setting software and the data transmitting software. Accordingly, the linkage function is executed by the password setting software and the data transmitting software.

In addition, when three or more function images are represented in the image 140, information on a linkage function executable by using the three or more functions is notified. In addition, when one function image is represented in the image 140, information on a function (a solo function) associated with the function is notified.

In addition, when a function image associated with a function to be linked is selected from the stock area 124, the information on a linkage function or a solo function may be notified under the control using the time limit described above. For example, when plural function images are taken out from the stock area 124 and superimposed on the image 140 within the time limit, the specifying unit 28 specifies a linkage function executable by using the functions associated with the respective plural function images. In this case, the information on the linkage function is displayed in the display area 48a as a message content of the automatic response AI. Meanwhile, when one function image is taken out from the stock area 124 and superimposed on the image 140 within the time limit, the specifying unit 28 specifies a function (a solo function) associated with the function image. In this case, the information on the solo function is displayed in the display area 48a as a message content of the automatic response AI.

For example, in the example illustrated in FIG. 29, when the user selects the function image 122 associated with the password setting function from the stock area 124 and superimposes the function image 122 on the image 140 without superimposing another function image on the image 140 within the time limit, the specifying unit 28 specifies the password setting function associated with the function image 122 as a solo function. The controller 26 displays the information on the solo function in the display area 48a as a message content of the automatic response AI.

Meanwhile, when the user selects the function images 122 and 126 from the stock area 124 and superimposes the function images 122 and 126 on the image 140 within the time limit, the specifying unit 28 specifies linkage functions associated with the combination of the password setting function and the data transmitting function in the linkage function management table illustrated in FIG. 26. The controller 26 displays the information on the linkage functions in the display area 48a as a message content of the automatic response AI.

In addition, as Modification 2 is applied, when plural function images are transmitted as a message content of the user to the automatic response AI, a composite image where the plural function images are superimposed on each other (see FIG. 14A), or a composite image where the plural function images are adjacent and connected to each other (see FIG. 14B) may be generated. The composite image may be displayed in the stock area 124. In addition, the composite image may be registered as a shortcut image in the terminal device 10.

In addition, as Modification 3 is applied, a linkage function to be notified may be changed according to an order of transmitting information of a function to the automatic response AI. In this case, in the linkage function management table according to the second exemplary embodiment as well, an access order and a priority of a function image are set as in the linkage function management table illustrated in FIG. 15.

In addition, as Modification 4 is applied, different functions may be assigned to respective portions in a function image. In this case, when portion images associated with functions are transmitted as a message content of the user to the automatic response AI, information on a linkage function executable by using the functions associated with the portion images is displayed. In addition, a combination of Modifications 3 and 4 may be applied to the second exemplary embodiment.

In addition, as Modification 5 is applied, information on a linkage function may be first input as a message content of the user by the user to the terminal device 10, and then, information on functions to be linked may be input as a message content of the user to the terminal device 10.

In addition, as Modification 6 is applied, the notification of a linkage function may be controlled according to information obtained by the automatic response AI. For example, the automatic response AI may acquire information indicating a use history of a function, information indicating an execution status of software for implementing a function, information on the user (information indicating an operation history or a behavior history), and information indicating the user's schedule, by the learning function, and may control the notification of a linkage function by using the pieces of information.

In addition, as Modification 7 is applied, a function to be linked may be recommended. For example, when the user transmits a function image as a message content of the user to the automatic response AI, the specifying unit 28 identifies the function associated with the function image and specifies a function capable of executing a linkage function in combination with the identified function by referring to the linkage function management table. In addition, the specifying unit 28 may recommend a function based on a use history of a linkage function, or may recommend a function having a relatively high use frequency.

In addition, as Modification 8 is applied, the automatic response AI may recommend a function to be used for a linkage function based on the information shared with another automatic response AI.

In addition, as Modification 9 is applied, information on functions to be linked may be input to the terminal device 10 by voice input.

Third Exemplary Embodiment

Hereinafter, a device system according to a third exemplary embodiment will be described. The third exemplary embodiment corresponds to a combination of the first and second exemplary embodiments. That is, when information of a device and a function (for example, a device image and a function image) is transmitted as a message content of the user to the automatic response AI, a linkage function executable by using the device and the function is notified. Hereinafter, the third exemplary embodiment will be described in detail.

FIG. 30 illustrates an example of a linkage function management table according to the third exemplary embodiment. The linkage function management table is information indicating a linkage function executable by using a device and a function (for example, software). In the linkage function management table, for example, a combination of IDs (a combination of a device ID and a function ID), information indicating a device name and a function name, and a linkage function executable by using a device and a function are associated with each other. A linkage function executable by using a device and a function is specified by referring to the linkage function management table. For example, a linkage function of transmitting data by using the PC A is implemented by combining the PC A which is a device A and the data transmitting function which is a function a. Similarly, executable linkage functions are also set for other devices and other functions. In addition, a linkage function executable by using a total of three or more devices and functions may be set. In this case, the combination of the total three or more devices and functions and a linkage function are associated with each other, and the association is registered in the linkage function management table.

Hereinafter, the third exemplary embodiment will be described by using specific examples.

Figure 31:
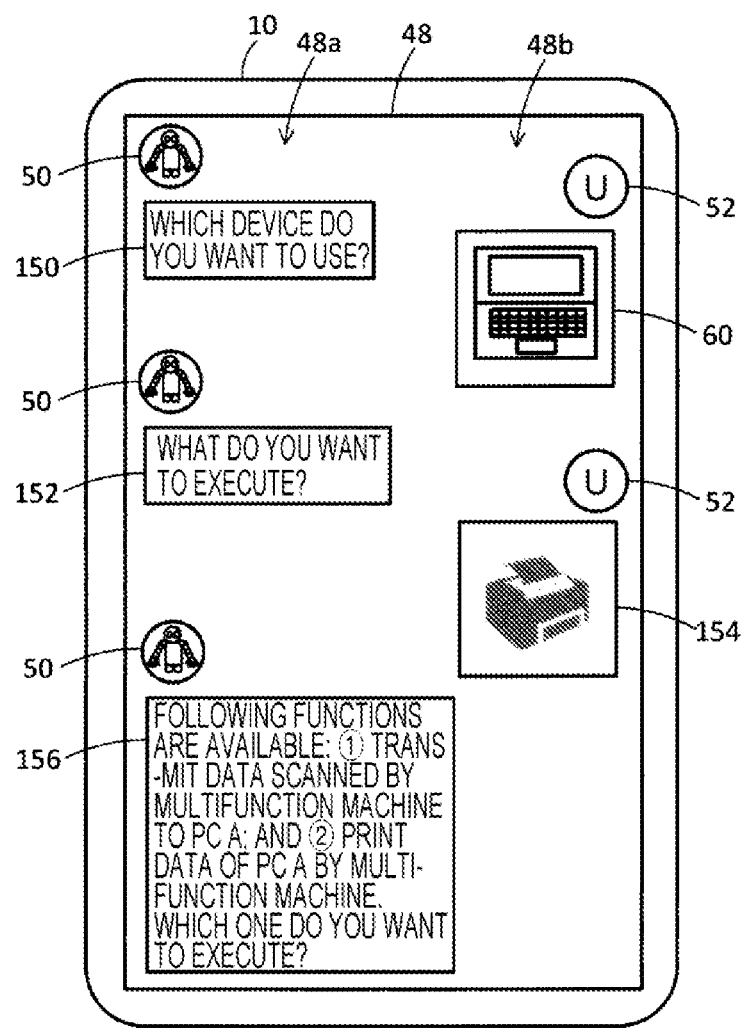
FIG. 31 is a view illustrating a screen.

FIG. 31 illustrates the screen 48. As in FIG. 8, the screen 48 displays the image 50 associated with the automatic response AI, the image 52 associated with the user, and information indicating a conversation between the user and the automatic response AI.

For example, a message content 150 that "Which function do you want to use?" is displayed in the display area 48a as a message content of the automatic response AI.

When the user designates a device in response to the message content 150, the specifying unit 28 (the specifying unit 28 implemented by the automatic response AI) identifies the device as a function to be linked. For example, as illustrated in FIG. 31, when the user designates the device image 60 associated with the PC A which is a device, and places the device image 60 at the position where a message content of the user is displayed, the controller 26 transmits the device image 60 as a message content of the user to the automatic response AI. In response to this operation, the specifying unit 28 identifies the PC A associated with the device image 60 as a device to be linked. In the example illustrated in FIG. 31, the operation by the user to display the device image 60 in the display area 48*b* corresponds to an act for the user to make a message content. In addition, the user may input a character string indicating a device as a message content of the user to the terminal device 10 by operating the UI unit 20. In this case, the specifying unit 28 identifies the device indicated by the character string as a device to be linked. In addition, information of a device to be linked may be input by voice as a message content of the user to the terminal device 10.

In addition, as in the first exemplary embodiment, the controller 26 may display the stock area 58 the display area 48*b* for the user, and display device images in the stock area 58. In this case, the user may select a device image in the stock area 58 and move the device image to the position where a message content of the user is displayed. In this case, the controller 26 transmits the device image as a message content of the user to the automatic response AI.

In the example illustrated in FIG. 31, in addition to the device image 60, the user designates a function after a message content 152 of the automatic response AI. In this case, the specifying unit 28 identifies the function as a function to be linked. For example, when the user designates a function image 154 associated with a function and places the function image 154 at the position where a message content of the user is displayed, the controller 26 transmits the function image 154 as a message content of the user to the automatic response AI. In response to this operation, the specifying unit 28 identifies the function associated with the function image 154 as a function to be linked. In the example illustrated in FIG. 31, the operation by the user to display the function image 154 in the display area 48*b* corresponds to an act for the user to make a message content. In addition, the user may input a character string indicating a function as a message content of the user to the terminal device 10 by operating the UI unit 20. In this case, the specifying unit 28 identifies the function indicated by the character string as a function to be linked. In addition, information of a function to be linked may be input by voice as a message content of the user to the terminal device 10.

The function image 154 is an image associated with an image forming function (for example, an image associated with image forming software or an image associated with a function of a multifunction machine). When the user selects the function image 154 and makes an instruction to activate the image forming function, for example, the image forming software is activated, and a printing instruction or a scanning instruction is assigned to the multifunction machine.

When the user transmits the information of the device and the function to the automatic response AI on the screen 48, that is, when the user makes a message indicating the information of the device and the function as information of objects to be linked, the specifying unit 28 specifies linkage functions associated with the combination of the device and the function in the linkage function management table illustrated in FIG. 30. The controller 26 displays the information on the linkage functions in the display area 48*a* as a message content of the automatic response AI.

In the example described above, the device image 60 and the function image 154 are transmitted as objects to be linked to the automatic response AI. In this case, the specifying unit 28 (the specifying unit 28 implemented by the automatic response AI) identifies the PC A associated with the device image 60 and the image forming function associated with the function image 154 as objects to be linked. In addition, the device image 60 may be first transmitted to the automatic response AI, and then, the function image 154 may be transmitted to the automatic response AI, or the function image 154 may be first transmitted to the automatic response AI, and then, the device image 60 may be transmitted to the automatic response AI.

As described above, when the device image 60 and the function image 154 are transmitted to the automatic response AI, and the device and the function to be linked are identified, the controller 26 may display the information of the device and the function identified as objects to be linked, in the display area 48*a* as a message content of the automatic response AI. When the user approves the message content (for example, when the user makes a message content answering "Yes"), the information on the linkage functions executable by using the PC A and the image forming function may be displayed in the display area 48*a*.

The specifying unit 28 specifies the linkage functions associated with the combination of the PC A associated with the device image 60 and the image forming function associated with the function image 154 (for example, the "scanning transmitting function" and the "printing function"). Accordingly, the linkage functions executable by using the PC A and the image forming function are specified. The information on the linkage functions specified as described above is displayed in the display area 48*a* as a message content of the automatic response AI. In addition, the process of specifying the functions or the linkage functions may be performed by the server 16.

The controller 26 displays the information on the linkage functions in the display area 48*a* as a message content 156 of the automatic response AI.

When the user designates a linkage function and gives an instruction to execute the linkage function by a message content in response to the message content 156, the controller 26 receives the execution instruction and executes the linkage function. For example, when an instruction to execute the scanning transmitting function is given, a multifunction machine is designated by the user, and data generated by scanning by the multifunction machine is transmitted from the multifunction machine to the PC A, by using, for example, the image forming software.

As another example, for example, when a device image associated with the multifunction machine B and a function image associated with the data transmitting function are transmitted as a message content of the user to the automatic response AI, the specifying unit 28 identifies the multifunction machine B and the data transmitting function as objects to be linked. In this case, the specifying unit 28 specifies linkage functions executable by using the multifunction machine B and the data transmitting software, by referring to the linkage function management table illustrated in FIG. 30. The information indicating the linkage functions is displayed in the display area 48*a* as a message content of the automatic response AI.

As yet another example, a device to be linked may be set as a basic linkage device in advance, or a function to be linked may be set as a basic linkage function in advance. The information of the basic linkage device or the basic linkage function may be stored in advance in the memory 24 of the terminal device 10. The user may designate the basic linkage device or the basic linkage function by using the UI unit 20. When the basic linkage device or the basic linkage function is set, the user transmits information of a device or a function to be linked other than the basic linkage device or the basic linkage function as a message content of the user to the automatic response AI. Accordingly, the device or function to be linked is specified (identified).

As described above, according to the third exemplary embodiment, information on a linkage function is provided when information of a device and a function to be linked is transmitted as a conversation content to the automatic response AI, on the screen 48 for making a conversation with the automatic response AI. Thus, the information on a linkage function is provided by the simple method using a conversation with the automatic response AI.

When a total of three or more device images and function images are transmitted as a message content of the user to the automatic response AI, information indicating a linkage function executable by using the three or more devices and functions may be displayed as a message content of the automatic response AI.

In addition, when information of a device and a function is transmitted as a message content of the user to the automatic response AI within a predetermined time limit, the specifying unit 28 may specify a linkage function executable by using the device and the function, and when information of one device or one function is transmitted as a message content of the user to the automatic response AI within the time limit, the specifying unit 28 may specify the function that the one device has or the one function as a solo function. In this case, information on the linkage function or the solo function specified by the specifying unit 28 is displayed on the display unit of the UI unit 20. A starting time point of the time limit may be, for example, a time point when the automatic response AI requests the user to inform objects to be linked as in the message content 150, or a time point when the user transmits a first device image or a first function image to the automatic response AI after the message content 150 occurs.

For example, in the example illustrated in FIG. 31, in a case where the user transmits only the device image 60 as a message content of the user to the automatic response AI within the time limit from the time point when the automatic response AI requests the user to inform objects to be linked as in the message content 150, the specifying unit 28 identifies a function (a solo function) that the device associated with the device image 60 has. The controller 26 displays the information on the solo function in the display area 48*a* as a message content of the automatic response AI.

Meanwhile, in a case where the user transmits the device image 60 and the function image 154 as a message content of the user to the automatic response AI within the time limit from the time point when the automatic response AI requests the user to inform objects to be linked as in the message content 150, the specifying unit 28 specifies linkage functions associated with the combination of the PC A and the image forming function in the linkage function management table illustrated in FIG. 30. The controller 26 displays the information on the linkage functions in the display area 48*a*.

The process described above may be identically performed in a case where the starting time point of the time limit is the time point when the user transmits a first image (for example, the device image 60) to the automatic response AI.

By providing the time limit as described above, a switching between providing a linkage function and providing a solo function is possible.

In addition, when a linkage function associated with the combination of the device and the function designated by the user is not registered in the linkage function management table, the specifying unit 28 determines that the usable linkage function is not registered. In this case, the controller 26 displays a message indicating that the usable linkage function is not registered, in the display area 48*a* as a message content of the automatic response AI. Even in this case, the linkage function may become usable according to, for example, an updating status of a device or a function. In this case, the specifying unit 28 specifies the linkage function that becomes usable.

In addition, Modifications 1 to 9 of the first exemplary embodiment may also be applied to the third exemplary embodiment.

Figure 32:
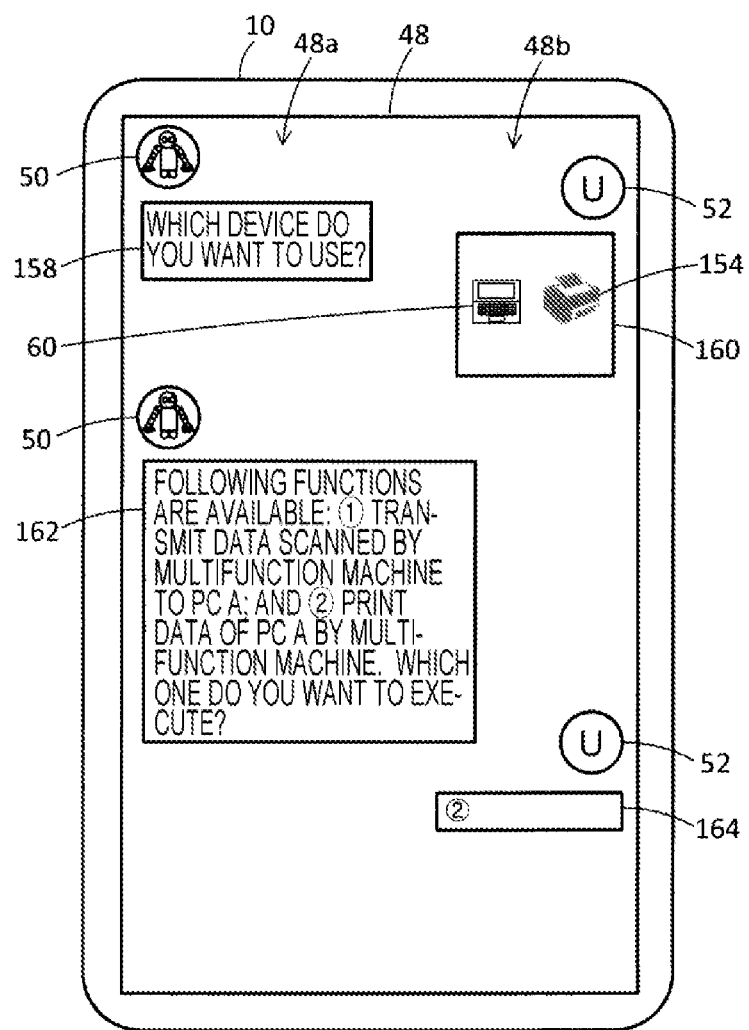
FIG. 32 is a view illustrating a screen.

FIG. 32 illustrates a process in a case where Modification 1 is applied to the third exemplary embodiment. As Modification 1 is applied, when information of a device and a function which are objects to be linked is transmitted as a message content of the user to the automatic response AI, a linkage function executable by using the device and the function is notified. Hereinafter, the process in a case where Modification 1 is applied to the third exemplary embodiment will be described with reference to FIG. 32.

As in FIG. 31, the message content that "Which function do you want to use?" is displayed in the display area 48*a* as a message content 158 of the automatic response AI.

When the user designates an image 160 representing a device and a function and transmits the image 160 as a message content of the user to the automatic response AI in response to the message content 158 above, the specifying unit 28 identifies the device and the function which are represented in the image 160 as objects to be linked. For example, when the image 160 represents the device image 60 and the function image 154, the specifying unit 28 identifies the PC A as a device to be linked based on the device image 60, and identifies the image forming function as a function to be linked based on the function image 154.

The user may select the device image 60 from the stock area 58 and superimpose the device image 60 on the image 160, by operating the screen 48. Similarly, the user may select the function image 154 from the stock area 124 and superimpose the function image 154 on the image 160, by operating the screen 48. Accordingly, the device image 60 and the function image 154 are represented in the image 160, and the image 160 is transmitted as a message content of the user to the automatic response AI.

As described above, when the PC A and the image forming function are identified as objects to be linked, the controller 26 may display the information of the device and the function which are identified as objects to be linked, in the display area 48*a* as a message content of the automatic response AI. When the user approves the message content (for example, when the user makes a message content answering "Yes"), information on linkage functions executable by using the PC A and the image forming function may be displayed in the display area 48*a* as a message content 162 of the automatic response AI. When the user designates a linkage function and gives an instruction to execute the linkage function by a message content 164 in response to the message content 162, the controller 26 executes the designated linkage function.

In addition, when the image 160 represents a total of three or more device images and function images, information on a linkage function executable by using the total three or more devices and functions is notified. In addition, when the image 160 represents one device image or one function image, information on a function (a solo function) that a function associated with the one device image has or a function (a solo function) associated with the one function image is notified.

In addition, when a device image or a function image is selected from the stock area, the information on a linkage function or a solo function may be notified under the control using the time limit described above. For example, when a device image and a function image are taken out from the stock area and superimposed on the image 160 within the time limit, the specifying unit 28 specifies a linkage function executable by using the device associated with the device image and the function associated with the function image. In this case, the information on the linkage function is displayed in the display area 48a as a message content of the automatic response AI. Meanwhile, when one device image or one function image is taken out from the stock area and superimposed on the image 160 within the time limit, the specifying unit 28 specifies a function (a solo function) that the device associated with the device image has or a function (a solo function) associated with the function image. In this case, the information on the solo function is displayed in the display area 48a as a message content of the automatic response AI.

In addition, as Modification 2 is applied, when a device image and a function image are transmitted as a message content of the user to the automatic response AI, a composite image where the device image and the function image are superimposed on each other (see FIG. 14A), or a composite image where the device image and the function image are adjacent and connected to each other (see FIG. 14B) may be generated. The composite image may be displayed in the stock area. In addition, the composite image may be registered as a shortcut image in the terminal device 10.

In addition, as Modification 3 is applied, a linkage function to be notified may be changed according to an order of transmitting information of a device and a function to the automatic response AI. In this case, in the linkage function management table according to the third exemplary embodiment as well, access orders and priorities of a device image and a function image are set as in the linkage function management table illustrated in FIG. 15.

In addition, as Modification 4 is applied, different functions may be assigned to respective portions in a device image, or different functions may be assigned to respective portions in a function image. In this case, when portion images associated with portions of a device are transmitted as a message content of the user to the automatic response AI, information on a linkage function executable by using the portions is displayed. Similarly, when portion images associated with functions are transmitted as a message content of the user to the automatic response AI, information on a linkage function executable by using the functions associated with the portion images is displayed. In addition, a combination of Modifications 3 and 4 may be applied to the third exemplary embodiment.

In addition, as Modification 5 is applied, information on a linkage function may be first input as a message content of the user by the user to the terminal device 10, and then, information on a device and a function to be linked may be input as a message content of the user to the terminal device 10.

In addition, as Modification 6 is applied, the notification of a linkage function may be controlled according to information obtained by the automatic response AI. For example, the automatic response AI may acquire information indicating a use history of a device and a function, information indicating an execution status of a device, information indicating an execution status of software for implementing a function, information on the user (information indicating an operation history or a behavior history), and information indicating the user's schedule, by the learning function, and may control the notification of a linkage function by using the pieces of information.

In addition, as Modification 7 is applied, a function to be linked may be recommended. For example, when the user transmits a device image as a message content of the user to the automatic response AI, the specifying unit 28 identifies the device associated with the device image, and specifies a function capable of executing a linkage function in combination with the device, by referring to the linkage function management table. The function is recommended to the user. Similarly, a device to be linked may be recommended. For example, when the user transmits a function image as a message content of the user to the automatic response AI, the specifying unit 28 identifies the function associated with the function image, and specifies a device capable of executing a linkage function in combination with the function, by referring to the linkage function management table. The device is recommended to the user. In addition, the specifying unit 28 may recommend a device or a function based on a use history of a linkage function, or may recommend a device or a function having a relatively high use frequency.

In addition, as Modification 8 is applied, the automatic response AI may recommend a function to be used for a linkage function based on the information shared with another automatic response AI.

In addition, as Modification 9 is applied, information on a device and a function to be linked may be input to the terminal device 10 by voice input.

Fourth Exemplary Embodiment

Hereinafter, a device system according to a fourth exemplary embodiment will be described. In the fourth exemplary embodiment, when information of files (data) is transmitted as a message content of the user to the automatic response AI, information on a linkage function is notified as a message content of the automatic response AI. The information of a file is identification information for identifying the file and is, for example, a file image associated with a file or character information or voice information indicating the identification information. For example, when the user transmits a file image associated with a file to the automatic response AI, when the user provides the automatic response AI with a character string indicating identification information of a file by inputting the character string to the terminal device 10, or when the user provides the automatic response AI with identification information of a file by voice, the specifying unit 28 identifies the file. Hereinafter, the fourth exemplary embodiment will be described in detail.

The linkage function management information according to the fourth exemplary embodiment is information for managing a linkage function that is executed by linking plural functions to each other. The linkage function is a function implemented by linking plural pieces of software to each other. In addition, the linkage function may be a function implemented by linking a function that a hardware device has and a function implemented by software to each other.

The linkage function according to the fourth exemplary embodiment will be described in more detail. The linkage function is a function executed on plural files (data) when the user selects the plural files. For example, each file is associated with software (application) for executing a process on the file. The linkage function is implemented by linking applications associated with respective plural files selected by the user to each other.

The files are, for example, a document file, an image file, a video file, a spreadsheet file, a presentation file, a graphic (drawing) file, and an audio file.

The document file is a file having a document format and is configured with character strings or other pieces of information. The document file may contain images, tables, or figures as other pieces of information. The document format is, for example, a text format or a document format. The document file corresponds to, for example, data having a text format (for example, data appended with a character string ".txt" as an extension) or data having a document format (for example, data appended with a character string ".doc" or ".docx" as an extension).

The image file is a file having an image format. The image file may be image data having a raster format or image data having a vector format. The image format is, for example, a JPEG format, a BMP (bitmap) format, a PDF format, a GIF format, a TIFF format, or a PICT format. The image file corresponds to, for example, data having a JPEG format (data appended with a character string ".jpeg" as an extension), data having a BMP format (data appended with a character string ".bmp" as an extension), data having a PDF format (data appended with a character string ".pdf" as an extension), data having a GIF format (data appended with a character string ".gif" as an extension), data having a TIFF format (data appended with a character string ".tiff" as an extension), data having a PNG format (data appended with a character string ".png" as an extension), or data having a PICT format (data appended with a character string ".pict" as an extension). In addition, image data having a format other than the formats described above may be used as the image file according to the fourth exemplary embodiment.

The video file is a file having a video format. The video format is, for example, an AVI format, an MP4 format, an MOV format, an MPEG2-TS format, an MPEG2-PS format, a WMV format, or an FLV format. The video file corresponds to, for example, data having an AVI format (data appended with a character string ".avi" as an extension), data having an MP4 format (data appended with a character string ".mp4" as an extension), data having an MOV format (data appended with a character string ".mov" as an extension), data having an MPEG2-TS format (data appended with a character string ".m2ts" as an extension), data having an MPEG2-PS format (data appended with a character string ".mpeg" as an extension), data having a WMV format (data appended with a character string ".wmv" as an extension), or data having an FLV format (data appended with a character string ".flv"). In addition, video data having a format other than the formats described above may be used as the video file according to the fourth exemplary embodiment.

The spreadsheet file is a file having a table format and is configured with tables, graphs, or other pieces of information. The spreadsheet file may contain character strings, images, or figures as other pieces of information. For example, the spreadsheet file is data appended with a character string ".csv," ".xls" or ".xlsx" as an extension.

The presentation file is a file having a presentation sheet format. For example, the presentation file corresponds to data appended with a character string ".ppt" or ".pptx" as an extension. The presentation file is configured with, for example, character strings, images (still images or video), figures, and voice.

The graphic file is a file having a graphic (drawing) format. The graphic file is created by, for example, graphic generating software (for example, two-dimensional CAD or three-dimensional CAD). For example, the graphic file corresponds to data having a DXF format (data appended with a character string ".dxf" as an extension) or data having a DWG format (data appended with a character string ".dwg" as an extension). In addition, data appended with a character string ".vsd" or ".vsdx" as an extension may be treated as the graphic file.

The audio file is a file having an audio format. The audio format is, for example, an uncompressed audio format (for example, a WAV format, an AIFF format, or a BWF format), an irreversible compressed audio format (for example, an mp3 format, an AAC format, or a WMA format), or a reversible compressed audio format (for example, a TAK format or an FLAC format). For example, the audio file corresponds to data having an uncompressed audio format (data appended with, for example, a character string ".wav" as an extension), data having an irreversible compressed audio format (data appended with, for example, a character string ".mp3" as extension), or data having an uncompressed audio format (data appended with, for example, a character string ".tak" as an extension).

In the fourth exemplary embodiment, a linkage function is set for each file format (attribute), and the linkage function management information is, for example, information indicating an association between information indicating a combination of plural file formats and information indicating a linkage function (linkage function information). The linkage function information is, for example, a linkage function ID or a linkage function name. The file format is, for example, the above-described document format, image format, video format, table format, sheet format, graphic format, or audio format. A linkage function associated with the combination of the plural file formats is specified (identified) by referring to the linkage function management information.

The linkage function may be a function implemented by linking plural different functions (for example, different pieces of software) to each other or a function implemented by linking identical functions (for example, identical pieces of software) to each other. The linkage function may be a function which is unusable before the linkage. A function which is unusable before linkage may become usable by linking identical functions to each other, or become usable by combining different functions to each other. For example, when a document creating function (document creating software) and an image displaying function (image displaying software (for example, an image viewer)) are linked to each other, a function of inserting (attaching) an image into a document or a function of superimposing a document (a character string or a text) on an image is implemented as a linkage function. That is, when the document creating function and the image displaying function are linked to each other, an image inserting function or a text superimposing function is implemented.

The concept of the linkage function may include a coalescing function executable as a new function by combining plural functions with each other. For example, an expanded displaying function may be implemented as the coalescing function by combining plural displaying functions. In addition, a capturing area expanding function may be implemented as the coalescing function by combining plural capturing functions. In addition, a translated call function (a function of translating a phone conversation) may be implemented as the coalescing function by combining a call function and a translation function. As described above, the concept of the linkage function may include a function which may be implemented by linking identical types of functions to each other, or a function which may be implemented by linking different types of functions to each other.

A linkage function managed by the linkage function management information may be a function executable by pieces of software installed in the terminal device 10, a function executable by pieces of software installed in an external device (for example, the server or another terminal device), or a function executable by software installed in the terminal device 10 and software installed in an external device.

In addition, as another example of the linkage function management information, information indicating a combination of plural functions (plural pieces of software), and information indicating a linkage function executable by linking the plural functions to each other (linkage function information) may be associated with each other.

When file images associated with plural files, respectively, are transmitted as a message content of the user to the automatic response AI, the specifying unit 28 specifies a linkage function associated with a combination of the formats of the plural files (file formats) in the linkage function management information. Accordingly, the executable linkage function is specified.

Hereinafter, the linkage function management information according to the fourth exemplary embodiment will be described in detail with reference to FIG. 33. FIG. 33 illustrates an example of a linkage function management table according to the fourth exemplary embodiment. In the linkage function management table, for example, information indicating a combination of plural file formats and information indicating a linkage function (linkage function information) are associated with each other. For example, when the user transmits information of plural files as a message content of the user to the automatic response AI, the specifying unit 28 specifies a linkage function associated with the combination of the file formats of the plural files in the linkage function management table. The information on the linkage function is displayed on the display unit of the UI unit 20. In addition, while FIG. 33 illustrates a combination of two file formats, an association between a combination of three or more file formats and a linkage function may be registered in the linkage function management table.

Hereinafter, each linkage function illustrated in FIG. 33 will be described.

In FIG. 33, the "document format" is a text format (with an extension of ".txt") or a document format (with an extension of ".doc" or ".docx"). The "table format" is a format with an extension expressed as, for example, ".csv" or ".xls." The "image format" is a format with an extension expressed as, for example, ".jpeg" or ".pdf." The "video format" is a format with an extension expressed as, for example, ".avi" or ".mpeg." The "sheet format" is a format with an extension expressed as, for example, ".ppt." While FIG. 33 does not illustrate the graphic format or the audio format, an association between a combination of file formats including the graphic format and the audio format and a linkage function may be registered in the linkage function management table. In addition, an association between a combination of file formats other than the file formats illustrated in FIG. 33 and a linkage function may be set and registered in the linkage function management table.

Hereinafter, each linkage function illustrated in FIG. 33 will be described. When the user transmits information of a document file A and a spreadsheet file B as a message content of the user to the automatic response AI, a "function of inserting a table into a document" and a "function of inserting a document into a table" which are associated with the combination of the document format and the table format are specified as linkage functions. The "function of inserting a table into a document" is a function of inserting the table represented by the spreadsheet file B into the document represented by the document file A. The "function of inserting a document into a table" is a function of inserting the document represented by the document file A into the table represented by the spreadsheet file B.

When the user transmits information of the document file A and an image file C as a message content of the user to the automatic response AI, a "function of inserting an image into a document" and a "function of superimposing a document on an image" which are associated with the combination of the document format and the image format are specified as linkage functions. The "function of inserting an image into a document" is a function of inserting the image represented by the image file C into the document represented by the document file A. The "function of superimposing a document on an image" is a function of superimposing the document represented by the document file A on the image represented by the image file C.

When the user transmits information of the document file A and a video file D as a message content of the user to the automatic response AI, a "function of inserting a video into a document" and a "function of inserting a still image into a document" which are associated with the combination of the document format and the video format are specified as linkage functions. The "function of inserting a video into a document" is a function of inserting the video represented by the video file D into the document represented by the document file A. The "function of inserting a still image into a document" is a function of inserting one or more frames (still images) included in the video file D into the document represented by the document file A. For example, when the document file A is a document file which is not compatible with a video, that is, a file into which a video cannot be inserted and when the "function of inserting a still image into a document" is executed, one or more frames (still images) included in the video file D are inserted into the document represented by the document file A.

Plural files having the same file format may be selected by the user. For example, when the user transmits information of document files A1 and A2 as a message content of the user to the automatic response AI, a "function of integrating documents" which is associated with the combination of the document formats is specified as a linkage function. The "function of integrating documents" is a function of integrating the documents represented by the document files A1 and A2 with each other (for example, combining the two documents with each other), and generates a new document file A3 while saving or removing the document files A1 and A2.

When the user transmits information of spreadsheet files B1 and B2 as a message content of the user to the automatic response AI, a "function of integrating tables" which is associated with the combination of the table formats is specified as a linkage function. The "function of integrating tables" is a function of integrating the tables represented by the spreadsheet files B1 and B2 with each other (for example, combining the two tables with each other), and generates a new spreadsheet file B3 while saving or removing the spreadsheet files B1 and B2.

When the user transmits information of video files D1 and D2 as a message content of the user to the automatic response AI, a "function of integrating videos" which is associated with the combination of the video formats is specified as a linkage function. The "function of integrating videos" is a function of integrating the videos represented by the video files D1 and D2 with each other (for example, combining the two videos with each other), and generates a new video file D3 while saving or removing the video files D1 and D2.

In addition, when the user transmits information of a presentation file E and the document file A as a message content of the user to the automatic response AI, a "function of inserting a document into a presentation sheet" which is associated with the combination of the sheet format and the document format is specified as a linkage function. The "function of inserting a document into a presentation sheet" is a function of inserting the document represented by the document file A into the sheet represented by the presentation file E.

Hereinafter, the fourth exemplary embodiment will be described in detail by using specific examples.

Figure 34:
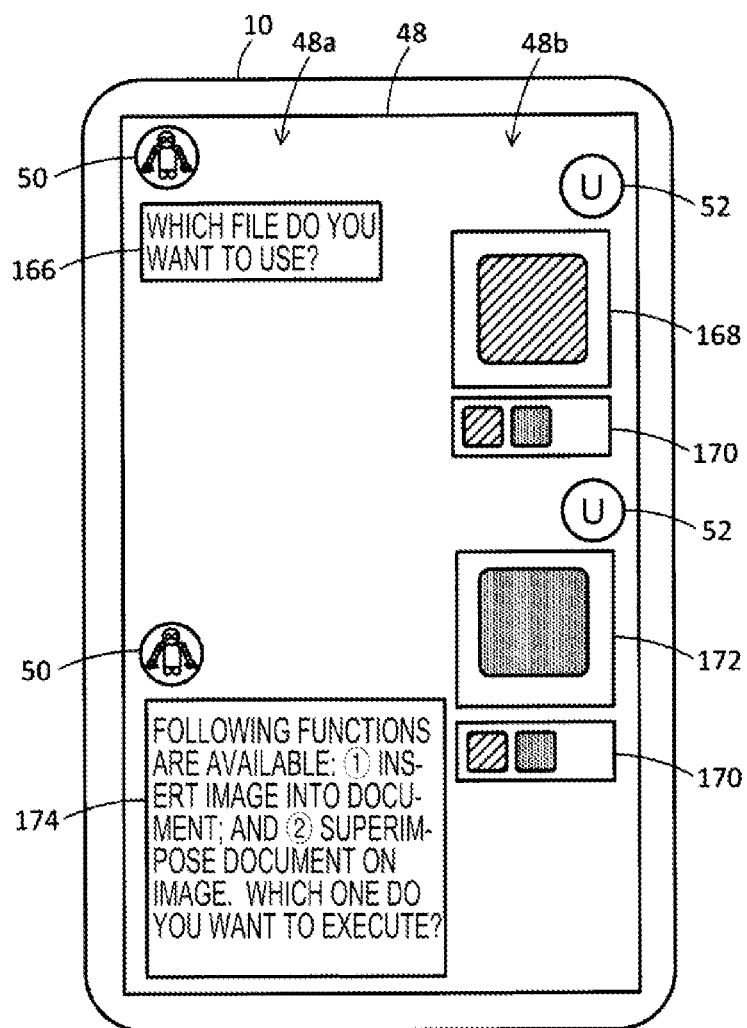
FIG. 34 is a view illustrating a screen.

FIG. 34 illustrates the screen 48. As in FIG. 8, the screen 48 displays the image 50 associated with the automatic response AI, the image 52 associated with the user, and information indicating a conversation between the user and the automatic response AI.

For example, a message content 166 that "Which file do you want to use?" is displayed in the display area 48a as a message content of the automatic response AI.

When the user designates a file in response to the message content 166, the specifying unit 28 (the specifying unit 28 implemented by the automatic response AI) identifies the file as a file to be linked. For example, as illustrated in FIG. 34, when the user designates a file image 168 associated with the document file A and places the file image 168 at the position where a message content of the user is displayed, the controller 26 transmits the file image 168 as a message content of the user to the automatic response AI. In response to this operation, the specifying unit 28 identifies the document file A associated with the file image 168 as a file to be linked. In the example illustrated in FIG. 34, the operation by the user to display the file image 168 in the display area 48b corresponds to an act for the user to make a message content. In addition, the user may input a character string indicating a file name as a message content of the user to the terminal device 10 by operating the UI unit 20. In this case, the specifying unit 28 identifies the file having the file name indicated by the character string as a file to be linked. In addition, information of a file to be linked may be input by voice as a message content of the user to the terminal device 10.

For example, as in the first exemplary embodiment, the controller 26 displays a stock area 170 in the display area 48b for the user, and displays file images in the stock area 170. For example, the controller 26 displays file images associated with files stored in the terminal device 10, in the stock area 170. In addition, when there exists another file image that may not be displayed in the stock area 170, the other file image is displayed in the stock area 170 in the manner that the user performs an operation to scroll the file images displayed in the stock area 170.

As in the first exemplary embodiment, the user may select a file image associated with a file to be linked (the file image 168 in the example illustrated in FIG. 34) from the stock area 170, move the file image to the outside of the stock area 170, and transmit the file image 168 as a message content of the user to the automatic response AI. For example, the user moves the file image 168 from the stock area 170 to the position where a message content of the user is displayed, by performing the dragging operation, and performs the dropping operation at the position where the message content is displayed. With the operations, the controller 26 transmits the file image 168 as a message content of the user to the automatic response AI.

In the example illustrated in FIG. 34, in addition to the file image 168, the user selects a file image 172 associated with the image file C from the stock area 170 and moves the file image 172 to the position where a message content of the user is displayed. With the operation, the file image 172 is transmitted as a message content of the user to the automatic response AI.

When the user transmits information of the plural files to the automatic response AI on the screen 48, that is, when the user makes a message indicating information of the plural files as information of files to be linked, the specifying unit 28 specifies a linkage function associated with the plural files in the linkage function management table illustrated in FIG. 33. The controller 26 displays the information on the linkage functions in the display area 48a as a message content of the automatic response AI.

In the example described above, the file images 168 and 172 are transmitted as functions to be linked to the automatic response AI. In this case, the specifying unit 28 (the specifying unit 28 implemented by the automatic response AI) identifies the document file A associated with the file image 168 and the image file C associated with the file image 172 as files to be linked. In addition, the file image 168 may be first transmitted to the automatic response AI, and then, the file image 172 may be transmitted to the automatic response AI, or the file image 172 may be first transmitted to the automatic response AI, and then, the file image 168 may be transmitted to the automatic response AI.

When the file images 168 and 172 are transmitted to the automatic response AI, and the document file A and the image file C are identified as files to be linked as described above, the controller 26 displays the information of the files identified as files to be linked, in the display area 48a as a message content of the automatic response AI. When the user approves the message content (for example, when the user makes a message content answering "Yes"), information on linkage functions executable by using the document file A and the image file C is displayed in the display area 48a.

The specifying unit 28 identifies the file format of the document file A based on the extension of the document file A (the extension appended to the document file A as, for example, attribute information of the document file A). Similarly, the specifying unit 28 identifies the file format of the image file C based on the extension of the image file C (the extension appended to the image file C as, for example, attribute information of the image file C). In addition, the extension may be included in a file name. When the extension of the document file A corresponds to an extension representing the document format such as ".txt" or ".docx," the specifying unit 28 identifies that the file format of the document file A is the document format. When the extension of the image file C corresponds to an extension representing the image format such as ".jpeg," the specifying unit 28 identifies that the file format of the image file C is the image format. Then, the specifying unit 28 specifies the linkage functions associated with the combination of the document format and the image format (the "function of inserting an image into a document" and the "function of superimposing a document on an image") in the linkage function management table illustrated in FIG. 33. The information on the linkage functions specified as described above is displayed in the display area 48a as a message content of the automatic response AI. In addition, the process of specifying the files or the linkage functions may be performed by the server 16.

The controller 26 displays the information on the linkage functions in the display area 48*a* as a message content 174 of the automatic response AI.

When the user designates a linkage function and gives an instruction to execute the linkage function by a message content in response to the message content 174, the controller 26 (the controller 26 implemented by the automatic response AI) receives the execution instruction and executes the linkage function. For example, when the user gives an instruction to execute the "function of inserting an image into a document," the controller 26 inserts the image represented by the image file C into the document represented by the document file A.

More specifically, the controller 26 activates a document application and an image application. The document application is software (program) having a function of creating, editing, and displaying a file having the document format. The image application is software (program) having a function of creating, editing, and displaying a file having the image format. In addition, the document application may be associated in advance with the document file A, and the image application may be associated in advance with the image file C. The controller 26 copies the image of the image file C by using the function that the image application has, and pastes the image into the document represented by the document file A by using the function that the document application has. Accordingly, the document into which the image has been inserted is generated. In addition, the controller 26 may extract a portion image representing a specific portion from the image represented by the image file C by using the function of the image application, and paste the portion image into the document. In the document, the area where the image is pasted may be a predetermined area, an area designated by the user, or an area presumed to describe a character string related to the image. For example, the controller 26 presumes or searches for a character string expressing a feature portion represented in the image, and presumes that, in the document, an area describing a character string having the same or similar meaning to the searched character string is an area describing the character string related to the image. In addition, the area may be presumed by another method.

Similarly, when the user gives an instruction to execute the "function of superimposing a document on an image," all or some parts of the document represented by the document file A are copied by the function that the document application has, and the copied document is superimposed on the image represented by the image file C. The portion to be copied from the document may be determined in advance or designated by the user. In addition, the portion of the image where the document is to be superimposed may be determined in advance, or designated by the user.

The controller 26 may generate a new file by executing a linkage function. In this case, the plural files themselves selected as objects to be linked are not edited. For example, when the document file A and the image file C are selected as files to be linked, and an instruction to execute the "function of inserting an image into a document" is given, the controller 26 generates a new document file AC by pasting the image represented by the image file C into the document represented by the document file A. In this case, the controller 26 may generate a new file image (for example, an icon) associated with the document file AC and display the file image on the screen 48. In this case, the document file A and the image file C themselves are not edited.

Similarly, when an instruction to execute the "function of superimposing a document on an image" is given, the controller 26 generates a new image file CA by superimposing all or some parts of the document represented by the document file A on the image represented by the image file C. In this case as well, the document file A and the image file C themselves are not edited.

As another example, the controller 26 may execute the linkage function to thereby edit (including, for example, process) the files themselves selected as objects to be linked, without generating a new file. Referring to the example described above, the controller 26 pastes the image represented by the image file C into the document represented by the document file A, and saves the document file in which the pasting of the image has been reflected, as the document file A. In this case, the document file A is updated.

As yet another example, a file to be linked may be preset as a basic file to be linked. The information of the basic file to be linked may be stored in advance in the memory 24 of the terminal device 10. The user may designate the basic file to be linked by using the UI unit 20. When the basic file to be linked is set, the user transmits information of a file to be linked, other than the basic file to be linked, as a message content of the user to the automatic response AI. Accordingly, the file to be linked is specified (identified).

As described above, according to the fourth exemplary embodiment, information on a linkage function is provided when information of files to be linked is transmitted as a conversation content to the automatic response AI, on the screen 48 for making a conversation with the automatic response AI. Thus, the information on a linkage function is provided by the simple method using a conversation with the automatic response AI.

In addition, when three or more file images are transmitted as a message content of the user to the automatic response AI, information on a linkage function associated with the combination of the three or more file formats may be displayed.

In the fourth exemplary embodiment, the display of information on a linkage function, or a linkage function to be executed may be changed according to a master-servant relationship of files. For example, a file of which represented contents themselves are editable corresponds to a master file, and a file of which contents themselves are not editable corresponds to a servant file. For example, when a document itself represented in a document file is editable, the document file corresponds to the master file. In addition, when an image itself represented in an image file is not editable (that is, when contents may be superimposed on an image, but the image itself is not editable), the image file corresponds to the servant file. This relationship is similarly applied to other files. In addition, a document file also corresponds to the servant file when the document of the document file is not editable, and an image file also corresponds to the master file when the image of the image file is editable.

The specifying unit 28 may determine whether a file corresponds to the master file or the servant file, based on a file format (that is, an extension). For example, the specifying unit 28 may determine that a file having the document format, a file having the table format, a file having the sheet format, and a file having the graphic format correspond to master files, and a file having the image format, a file having the video format, and a file having the audio format correspond to servant files. In addition, whether a file corresponds to the master file or the servant file may not be determined by collectively determining the file formats, and may be determined by individually determining files selected as objects to be linked. For example, even a file having the image format may correspond to the master file when the image of the file is editable.

For example, when the file image 168 associated with the document file A and the file image 172 associated with the image file C are transmitted as a message content of the user to the automatic response AI, the specifying unit 28 determines whether the document file A corresponds to the master file or the servant file, based on the extension associated with the document file A, and determines whether the image file C corresponds to the master file or the servant file, based on the extension associated with the image file C. It is assumed that the extension of the document file A is, for example, ".docx," and the extension of the image file C is, for example, ".jpeg." In this case, since the document file A has the document format and is editable, the specifying unit 28 determines that the document file A corresponds to the master file. Further, since the image file C has the image format and is not editable, the specifying unit 28 determines that the image file C corresponds to the servant file. In addition, the specifying unit 28 may determine whether the document file A and the image file C are editable, by individually determining the document file A and the image file C, rather than the determination based on the extensions.

Since the document file A corresponds to the master file and the image file C corresponds to the servant file, the image represented in the image file C corresponds to a content to be pasted, and the document represented in the document file A corresponds to a content of a place where the image is to be pasted. In this case, the specifying unit 28 specifies the "function of inserting an image into a document" as a linkage function. The controller 26 displays the information on the "function of inserting an image into a document" in the display area 48a as a message content of the automatic response AI. When the specifying unit 28 specifies plural linkage functions, the controller 26 displays the information on the plural linkage functions in the display area 48a as a message content of the automatic response AI.

In addition, the controller 26 may display, in the display area 48a, information on a linkage function that is specified based on the master-servant relationship of files from among the plural linkage functions registered in the linkage function management table illustrated in FIG. 33, as a message content of the automatic response AI in preference to the information on the other linkage functions. Referring to the example where the document file A and the image file C are transmitted, the "function of inserting an image into a document" and the "function of superimposing a document on an image" are registered as linkage functions associated with the combination of the document format and the image format in the linkage function management table (see FIG. 33). In this case, the specifying unit 28 specifies the "function of inserting an image into a document" which is specified based on the master-servant relationship of files as a linkage function having a "first priority," and specifies the "function of superimposing a document on an image" as a linkage function having a "second priority." The controller 26 displays the information on the "function of inserting an image into a document" in the display area 48a as a message content of the automatic response AI in preference to (for example, at a higher rank) the information of the "function of superimposing a document on an image," according to the priorities.

In addition, when plural linkage functions are specified based on the master-servant relationship of files, the controller 26 may determine priorities of the respective linkage functions based on a history of use of each linkage function by the user, and display the information on the linkage functions as a message content of the automatic response AI on the screen 48 according to the priorities of the linkage functions. For example, the controller 26 more preferentially displays information on a linkage function in the display area 48a (for example, at a higher rank) as the use frequency of the linkage information is larger.

In addition, when plural linkage functions are specified based on the master-servant relationship of files, the controller 26 may determine priorities of the respective linkage functions based on a relationship of plural files selected as objects to be linked (that is, a relationship of plural file formats), and display the information on the linkage functions according to the priorities of the linkage functions in the display area 48a as a message content of the automatic response AI. For example, the controller 26 determines a degree of the likelihood that each linkage function included in the plural linkage functions specified by the specifying unit 28 is to be used, based on plural file formats. The controller 26 more preferentially displays information on a linkage function in the display area 48a (for example, at a higher rank) as the use probability of the linkage function is larger. For example, in the combination of the document format and the image format, it is predicted that the use likelihood of the "function of inserting an image into a document" is higher than that of the "function of superimposing a document on an image." In this case, the controller 26 displays the information on the "function of inserting an image into a document" in the display area 48a in preference to the "function of superimposing a document on an image".

In addition, when information of plural files is transmitted as a message content of the user to the automatic response AI within a predetermined time limit, the specifying unit 28 may specify a linkage function executable by using the plural files, and when information of one file is transmitted as a message content of the user to the automatic response AI within the time limit, the specifying unit 28 may specify a solo function executable by using the one file. In this case, information on the linkage function or the solo function specified by the specifying unit 28 is displayed on the display unit of the UI unit 20. A starting time point of the time limit may be a time point when the automatic response AI requests the user to inform objects to be linked as in the message content 166, or a time point when the user transmits a first file image to the automatic response AI after the message content 166 occurs.

For example, in the example illustrated in FIG. 34, when the user transmits only the file image 168 as a message content of the user to the automatic response AI within the time limit from the time point when the automatic response AI requests the user to inform objects to be linked as in the message content 166, the specifying unit 28 identifies a function (a solo function) executable by using the file associated with the file image 168. The controller 26 displays the information on the solo function in the display area 48a as a message content of the automatic response AI.

Meanwhile, when the user transmits the file images 168 and 172 as a message content of the user to the automatic response AI within the time limit from the time point when the automatic response AI requests the user to inform objects to be linked as in the message content 166, the specifying unit 28 specifies linkage functions associated with the combination of the document file (the file having the document format) and the image file (the file having the image format) in the linkage function management table illustrated in FIG. 33. The controller 26 displays the information on the linkage functions in the display area 48a.

The process described above may be identically performed when the starting time of the time limit is the time point when the user transmits a first file image (for example, the file image 168) to the automatic response AI.

By providing the time limit as described above, a switching between providing a linkage function and providing a solo function is possible.

In addition, when a linkage function associated with the combination of the plural file formats designated by the user is not registered in the linkage function management table, the specifying unit 28 determines that the usable linkage function is not registered. In this case, the controller 26 displays a message indicating that the usable linkage function is not registered, in the display area 48a as a message content of the automatic response AI. Even in this case, the linkage function may become usable according to, for example, an updating status of a device or software. In this case, the specifying unit 28 specifies the linkage function that becomes usable.

In addition, Modifications 1 to 9 of the first exemplary embodiment may be applied to the fourth exemplary embodiment.

Figure 35:
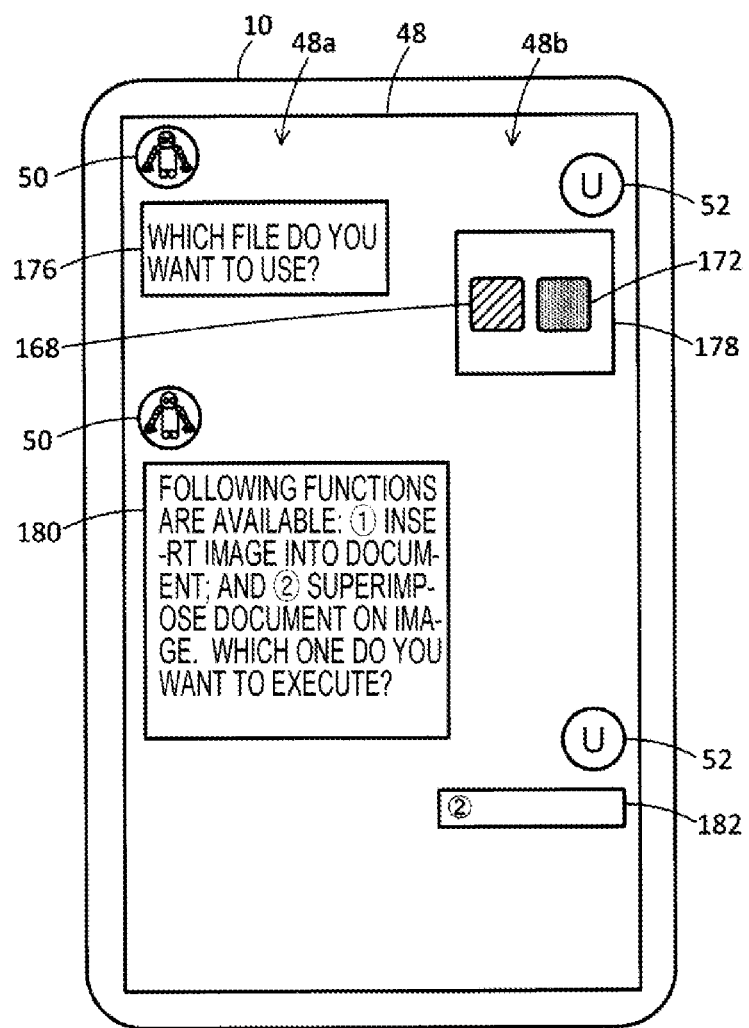
FIG. 35 is a view illustrating a screen.

FIG. 35 illustrates a process in a case where Modification 1 is applied to the fourth exemplary embodiment. As Modification 1 is applied, when information of plural files which are objects to be linked is transmitted as a message content of the user to the automatic response AI, a linkage function executable by using the plural files is notified. Hereinafter, the process in the case where Modification 1 is applied to the fourth exemplary embodiment will be described with reference to FIG. 35.

As in FIG. 34, the message content that "Which file do you want to use?" is displayed in the display area 48a as a message content 176 of the automatic response AI.

When the user designates and transmits an image 178 representing plural files as a message content of the user to the automatic response AI in response to the message content 176, the specifying unit 28 identifies the plural files represented in the image 178 as files to be linked. For example, when the image 178 represents the file images 168 and 172, the specifying unit 28 identifies the document file A as a file to be linked, based on the file image 168, and identifies the image file C as a file to be liked, based on the file image 172.

The user may select the file images 168 and 172 from the stock area 170 and superimpose the file images 168 and 172 on the image 178, by operating the screen 48. Accordingly, the file images 168 and 172 are represented in the image 178, and the image 178 is transmitted as a message content of the user to the automatic response AI.

As described above, when the document file A and the image file C are identified as objects to be linked, the controller 26 may display the information of the files identified as objects to be linked, as a message content of the automatic response AI on the screen 48. When the user approves the message content (for example, when the user notifies a message content answering "Yes"), information on linkage functions executable by using the document file A and the image file C may be displayed in the display area 48a as a message content 180 of the automatic response AI. When the user designates a linkage function and gives an instruction to execute the linkage function by a message content 182 in response to the message content 180, the controller 26 executes the designated linkage function.

In addition, when the image 178 represents three or more file images, information on a linkage function executable by using the three or more files is notified. In addition, when the image 178 represents one file image, information on a function (a solo function) executable by using a file associated with the one file image is notified.

In addition, when a file image is selected from the stock area, the information on a linkage function or a solo function may be notified under the control using the time limit described above. For example, when plural file images are taken out from the stock area and superimposed on the image 178 within the time limit, the specifying unit 28 specifies a linkage function executable by using the plural files. In this case, the information on the linkage function is displayed in the display area 48a as a message content of the automatic response AI. Meanwhile, when one file image is taken out from the stock area and superimposed on the image 178 within the time limit, the specifying unit 28 specifies a function (a solo function) executable by using the file associated with the file image. In this case, the information on the solo function is displayed in the display area 48a as a message content of the automatic response AI.

In addition, as Modification 2 is applied, when plural file images are transmitted as a message content of the user to the automatic response AI, a composite image may be generated which represents a state where the plural file images are superimposed on each other (see FIG. 14A), or a state where the plural file images are adjacent and connected to each other (see FIG. 14B). The composite image may be displayed in the stock area 170. In addition, the composite image may be registered as a shortcut image in the terminal device 10.

In addition, as Modification 3 is applied, a linkage function to be notified may be changed according to an order of transmitting information of plural files to the automatic response AI. In this case, in the linkage function management table according to the fourth exemplary embodiment as well, access orders and priorities of plural file images are set as in the linkage function management table illustrated in FIG. 15.

In addition, as Modification 4 is applied, different functions may be assigned to respective portions of a file image. In this case, when portion images are transmitted as a message content of the user to the automatic response AI, information on a linkage function executable by using the functions associated with the portions is displayed. In addition, a combination of Modifications 3 and 4 may be applied to the fourth exemplary embodiment.

In addition, as Modification 5 is applied, information on a linkage function may be first input as a message content of the user by the user to the terminal device 10, and then, information on files to be linked may be input as a message content of the user to the terminal device 10.

In addition, as Modification 6 is applied, the notification of a linkage function may be controlled according to information obtained by the automatic response AI. For example, the automatic response AI may acquire information indicating a use history of a file, information indicating an execution status of a device, information indicating an execution status of software for implementing a function, information on the user (information indicating an operation history or a behavior history), and information indicating a user's schedule, by using the learning function, and control a notification of a linkage function by using the pieces of information.

In addition, as Modification 7 is applied, a function to be linked may be recommended. For example, when the user transmits a file image as a message content of the user to the automatic response AI, the specifying unit 28 identifies the file associated with the file image and specifies a function capable of executing the linkage function in combination with the format of the identified file by referring to the linkage function management table. In addition, the specifying unit 28 may recommend a file based on a use history of a linkage function or recommend a file having a relatively high use frequency.

In addition, as Modification 8 is applied, the automatic response AI may recommend a function to be used for a linkage function based on the information shared with another automatic response AI.

In addition, as Modification 9 is applied, information of files to be linked may be input to the terminal device 10 by voice input.

In addition, in the fourth exemplary embodiment, when information indicating names of plural files (file names) is transmitted as a message content of the user to the automatic response AI, the specifying unit 28 may specify a linkage function according to the plural file names. To this end, a combination of the file names and a linkage function are associated with each other in the linkage function management table, and the specifying unit 28 specifies a linkage function associated with the combination of the plural file names by referring to the linkage function management table.

In addition, the specifying unit 28 may specify a file to which a content is to be added, based on a name of a file transmitted to the automatic response AI. For example, when a name of a file (file name) transmitted to the automatic response AI includes a character string suggesting a file for collecting data (that is, a file assumed or predicted to incorporate a content of other data), such as "ledger," "collection," "management," "statistics," "graph," "table," or "list," the specifying unit 28 identifies the file as a to which a content is to be added. In addition, the specifying unit 28 identifies a file having a file name including no character string for the collection or a file having a file name including a character string suggesting a file for providing a content (material), as a file containing a content (material) to be added. For example, a file having a file name including a character string such as "receipt," "slip," "personal data," and "device data" does not correspond to a file for the collection and is determined to correspond to a file for providing a content (material).

For example, when the document files A1 and A2 which are files to be linked are transmitted as a message content of the user to the automatic response AI, in a case where the document file A1 has a file name including the character string for the collection, and the document file A2 has a file name including the character string for providing a material without including the character string for the collection, the specifying unit 28 specifies a linkage function of performing, for example, input, copying, and a statistical process from the document file A2 for providing a material to the document A1 for the collection, as a preferential linkage function. The controller 26 displays the preferential linkage function on the screen 48 in preference to other linkage functions.

In addition, the combination of objects to be linked is not limited to the combinations in the first to fourth exemplary embodiments. For example, when a combination of at least two of a device, a function (including a function executed by a device and a function executed by software), a file, or software is selected as a combination of objects to be linked, a notification of a linkage function executable by using the combination may be controlled. For example, when a device image and a file image are transmitted as a message content of the user to the automatic response AI, the specifying unit 28 may specify a linkage function executable by using the device associated with the device image and the file associated with the file image, and the controller 26 may display information on a linkage function as a message content of the automatic response AI on the screen 48 or output as voice information, as a notification of the information on the linkage function. As a specific example, when a device image associated with the multifunction machine B and a file image associated with a document file are transmitted as a message content of the user to the automatic response AI, the specifying unit 28 specifies a linkage function executable by using the multifunction machine B and the document file (for example, a function of printing the document file by the multifunction machine B or a function of faxing the document file by the multifunction machine B). The controller 26 controls a notification of the information on the linkage function. Similarly, when a function image associated with software and a file image are transmitted as a message content of the user to the automatic response AI, the specifying unit 28 may specify a linkage function executable by using the function associated with the function image and the file associated with the file image, and the controller 26 may control a notification of the information on the linkage function. As a specific example, when a function image associated with a document application and a file image associated with a document file are transmitted as a message content of the user to the automatic response AI, the specifying unit 28 specifies a linkage function executable by using the document application and the document file (for example, a function of editing or outputting the document file by the document application). In addition, when a device image, a function image, and a file image are transmitted as a message content of the user to the automatic response AI, the specifying unit 28 may specify a linkage function executable by using the device associated with the device image, the function associated with the function image (for example, software), and the file associated with the file image, and the controller 26 may control a notification of the information on the linkage function. As a specific example, when a device image associated with the multifunction machine B, a function image associated with a document application, and a file image associated with a document file are transmitted as a message content of the user to the automatic response AI, the specifying unit 28 specifies a linkage function executable by using the multifunction machine B, the document application, and the document file (for example, a function of editing the document file by the document application, output the document file to the multifunction machine B, and print or fax the document file by the multifunction machine B). In the specific examples described above, the combinations are merely examples. A linkage function executable by any combination of a device, a function, a file, and software other than the combinations described above may be set. In addition, information of a device, a function, a file, and software may be transmitted to the automatic response AI by voice.

The first to fourth exemplary embodiments and Modifications 1 to 9 described above may also be applied when an automatic execution process by robotics process automation (RPA) is set. For example, when pieces of information on a device, a function, or a file are transmitted by a setting person to the automatic response AI, a combination of the transmitted pieces of information and a linkage function associated with the combination are saved as setting contents, and a process is executed according to the setting contents. As for the RPA (Robotics Process Automation), for example, a routine process such as data input or a job executable by a combination of plural pieces of application software, a process such as data collection or analysis, or a process of learning and making a determination based on data may be performed.

Fifth Exemplary Embodiment

Hereinafter, a device system according to a fifth exemplary embodiment will be described. In the fifth exemplary embodiment, when the user gives an instruction to use a device (a use request) to the automatic replay AI (for example, when the user transmits information of a device to the automatic response AI), display of the conversation partner who is making a reply is switched to display of the device, on an interface for making a conversation with the automatic response AI (for example, the screen 48). Hereinafter, the fifth exemplary embodiment will be described in detail.

Figure 36:
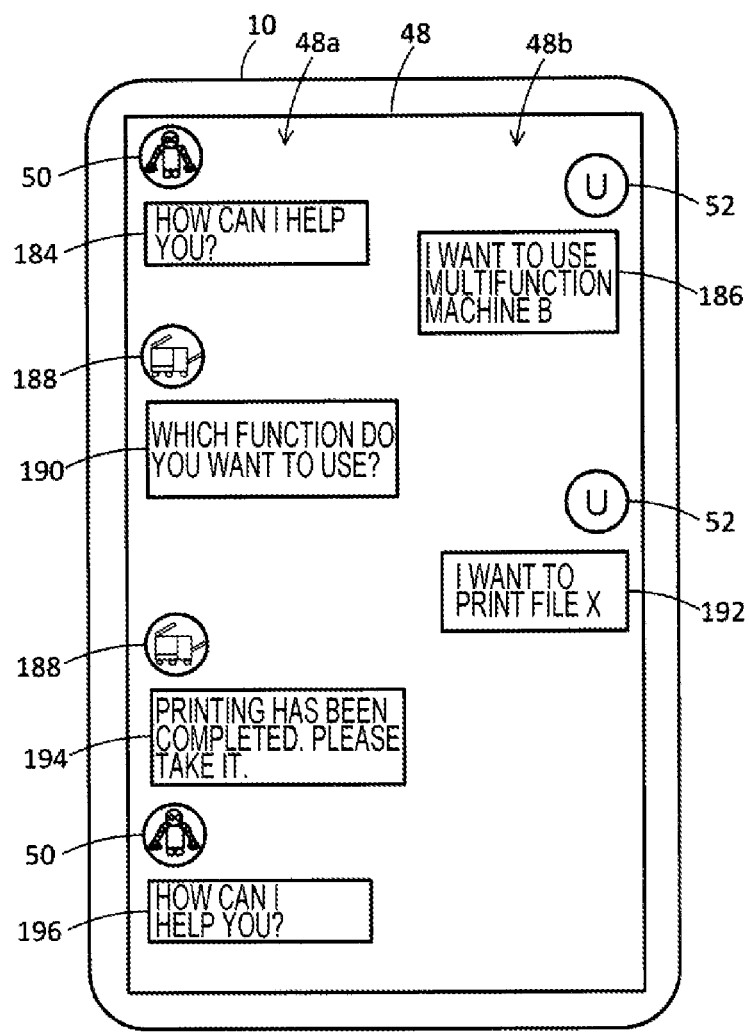
FIG. 36 is a view illustrating a screen.

FIG. 36 illustrates the screen 48. As in FIG. 8, the screen 48 displays the image 50 associated with the automatic response AI, the image 52 associated with the user, and information indicating a conversation between the user and the automatic response AI.

For example, a message content 184 that "How can I help you?" is displayed in the display area 48a as a message content of the automatic response AI. Since the message content 184 is a message content made by the automatic response AI, the controller 26 displays the image 50 associated with the automatic response AI in the display area 48a, and displays the message content 184 in the display area 48a as a message content associated with the image 50 of the automatic response AI. In addition, the automatic response AI does not depend on a device, and may be a general-purpose automatic response AI.

When the user designates a device in response to the message content 184, the specifying unit 28 (the specifying unit 28 implemented by the automatic response AI) identifies the device. For example, it is assumed that the user makes a message content 186 of "I want to use multifunction machine B" as a message content indicating an instruction to use a device (a use request). The controller 26 displays the message content 186 including the information of the multifunction machine B in the display area 48b as a message content of the user, and transmits the message content 186 to the automatic response AI. Accordingly, the information of the multifunction machine B is transmitted to the automatic response AI. The message content 186 is displayed in the display area 48b as a message content associated with the image 52 of the user. The user may input a character string indicating the device as a message content of the user to the terminal device 10, or designate a device image (for example, an external appearance image or an icon) associated with the device as a message content of the user as in the first exemplary embodiment described above, by operating the UI unit 20. When designating a device image, as illustrated in FIG. 8, the user may select the device image associated with the device to be used from the stock area 58, and move the device image to the position where a message content of the user is displayed, so as to designate the device image as a message content of the user.

The specifying unit 28 specifies the function that the device designated by the user has by referring to the device function management table illustrated in FIG. 6. In the example described above, since the multifunction machine B is designated, the specifying unit 28 identifies the function that the multifunction machine B has.

When the user designates the device and the device is identified, the controller 26 switches the display of the conversation partner (for example, the image associated with the conversation partner or the character string indicating the conversation partner), from the display of the general-purpose automatic response AI (for example, the image associated with the general-purpose automatic response AI or the character string indicating the general-purpose automatic response AI) to display of the device designated by the user (for example, an image associated with the device or a character string indicating the device).

In addition, even though the display of the conversation partner is switched from the display of the general-purpose automatic response AI to the display of the device, the conversation partner itself of the user is the general-purpose automatic response AI. That is, a message content of the conversation partner is created by the general-purpose automatic response AI equipped in the terminal device 10.

In the example described above, since the multifunction machine B is designated as a device to be used, the controller 26 displays a device image 188 associated with the multifunction machine B in the display area 48a as an image associated with a conversation partner in place of the image 50 associated with the automatic response AI. The device image 188 may be an image generated by capturing the multifunction machine B (for example, an external appearance image of the multifunction machine B) or an image emulating the multifunction machine B (for example, an icon). In addition, the controller 26 may display a character string indicating the multifunction machine B in the display area 48a as the information indicating the conversation partner in place of or along with the device image 188.

In addition, the controller 26 may display a device image representing a state of the device in the display area 48a as an image associated with a conversation partner in place of the image 50 associated with the automatic response AI. In the example described above, the controller 26 displays the device image 188 representing the state of the multifunction machine B in the display area 48a as an image associated with a conversation partner. The controller 26 acquires the information indicating the state of the device to be used from the device, and controls the display of the device image representing the state. For example, when the device is performing a process, the controller 26 displays a device image representing the state where the device is performing a process, as an image associated with a conversation partner. When the device is not performing a process, the controller 26 displays a device image representing the state where the device is not performing a process, as an image associated with a conversation partner. When the device is in a sleep state, the controller 26 displays a device image representing the sleep state as an image associated with a conversation partner. When the device is powered off, the controller 26 displays a device image representing the powered-off state as an image associated with a conversation partner. Accordingly, the user may visually confirm the state of the device. For example, when the multifunction machine B is performing printing, the controller 26 displays the device image 188 representing the state where the multifunction machine B is performing printing, in the display area 48a as an image associated with a conversation partner. The image representing the state of the device may be created in advance and stored in the memory 24, or may be created by the controller 26. In addition, the controller 26 may display a character string indicating the state of the device in the display area 48*a* in place of or along with the device image.

Further, the controller 26 displays a message content 190 that "Which function do you want to use?" in the display area 48*a* as a message content of the multifunction machine B. The message content 190 itself is created by the general-purpose automatic response AI. In order to act as if the multifunction machine B makes the message content 190, the controller 26 displays the message content 190 in the display area 48*a* as a message content associated with the device image 188 of the multifunction machine B. The controller 26 may display a list of functions that the multifunction machine B specified by the specifying unit 28 has in the display area 48*a* as a message content of the multifunction machine B. Since the multifunction machine B is a device having, for example, image forming functions such as the printing function and the copying function, the controller 26 may display a character string or an image representing a list of the image forming functions in the display area 48*a* as a message content of the multifunction machine B.

In response to the message content 190, the user inputs a process content that the user wants to execute by using the multifunction machine B, as a message content of the user to the terminal device 10. In the example illustrated in FIG. 36, a message content 192 that "I want to print file X" which indicates the process content is input as a message content of the user to the terminal device 10.

The controller 26 specifies the process content requested by the user by analyzing the message content 192 of the user, and causes the multifunction machine B to execute the process content. For example, the controller 26 transmits a printing job including the data of the file X to the multifunction machine B. Upon receiving the printing job, the multifunction machine B prints the file X according to the printing job. In addition, the controller 26 may cause the UI unit 20 to display a screen for setting printing conditions (for example, conditions such as the number of copies, color printing, and black and white printing). The printing job includes the conditions set on the screen, and the multifunction machine B performs the printing according to the conditions.

When the printing of the file X is completed, the controller 26 display a message content 194 indicating that the printing has been completed, in the display area 48*a* as a message content of the multifunction machine B. At this time as well, the controller 26 displays the device image 188 associated with the multifunction machine B in the display area 48*a*, and displays the message content 194 in the display area 48*a* as a message content associated with the device image 188 of the multifunction machine B. In addition, the message content 194 itself is created by the general-purpose automatic response AI.

When the process by the multifunction machine B is completed, the controller 26 displays the image 50 associated with the general-purpose automatic response AI in the display area 48*a* as an image associated with a conversation partner in place of the device image 188 associated with the multifunction machine B. Further, the controller 26 displays a message content 196 that "How can I help you?" which indicates a common question in the display area 48*a* as a message content of the automatic response AI.

As described above, according to the fifth exemplary embodiment, when an instruction to use a device (a use request) is given to the automatic response AI (for example, when information of a device is transmitted to the automatic response AI), the display of the conversation partner who is making a reply is switched to the display of the device, on the screen 48 for making a conversation with the automatic response AI. Accordingly, the user may visually confirm whether the user may give the instruction to the device. For example, when the user transmits information of a device to the automatic response AI in order to give the instruction to the device, an image associated with the device is displayed as an image associated with a conversation partner. Accordingly, the user may visually confirm whether the instruction has been actually given to the device.

(Modification 10)

Hereinafter, Modification 10 will be described. In Modification 10, when an instruction to use a device is assigned as a message content of the user to the automatic response AI, the display of the conversation partner is switched from the display of the general-purpose automatic response AI to display of the device, and the automatic response AI (for example, a program) which is the conversation partner of the user is switched from the general-purpose automatic response AI to an automatic response AI equipped in the device.

In the example described above, when the multifunction machine B is equipped with an automatic response AI (when a program of an automatic response AI is installed in the multifunction machine B), the controller 26 switches the automatic response AI which is the conversation partner of the user from the general-purpose automatic response AI equipped in the terminal device 10 (the program of the automatic response AI installed in the terminal device 10) to the automatic response AI equipped in the multifunction machine B.

In this case, the controller 26 transmits information indicating a message content of the user to the multifunction machine B via the communication path N. The automatic response AI equipped in the multifunction machine B receives the information indicating the message content of the user that has been transmitted from the terminal device 10, analyzes the message content of the user, and creates a response such as a reply to the message content. The automatic response AI of the multifunction machine B transmits information indicating a message content including the response to the terminal device 10. For example, as illustrated in FIG. 36, message contents 190 and 194 are created by the automatic response AI equipped in the multifunction machine B, and the information indicating the message contents 190 and 194 is transmitted from the multifunction machine B to the terminal device 10. The controller 26 displays the message contents transmitted from the multifunction machine B (for example, the message contents 190 and 194) in the display area 48*a* as message contents of the multifunction machine B in association with the device image 188 of the multifunction machine B.

As illustrated in FIG. 36, when the process by the multifunction machine B is completed, the controller 26 switches the image associated with the conversation partner from the device image 188 associated with the multifunction machine B to the image 50 associated with the general-purpose automatic response AI, and further, switches the automatic response AI which is the conversation partner of the user from the automatic response AI equipped in the multifunction machine B to the general-purpose automatic response AI equipped in the terminal device 10.

According to Modification 10, when a device is equipped with an automatic response AI, a conversation between the automatic response AI and the user is conducted, and thus, the processing load of the automatic response AI equipped in the terminal device 10 is reduced. In addition, in a case where the automatic response AI equipped in the device has a high control ability or a high information collection ability, as compared with the general-purpose automatic response AI, when the automatic response AI equipped in the device which serves as the conversation partner of the user makes a conversation with the user, more useful information may be provided to the user.

(Modification 11)

Hereinafter, Modification 11 will be described with reference to FIG. 37. In Modification 11, when an instruction to use a portion of a device (a use request) is given to the automatic response AI (for example, when information of a portion of a device is transmitted to the automatic response AI), the display of the conversation partner which is making a reply is switched to display of the portion. Hereinafter, Modification 11 will be described in detail.

Figure 37:
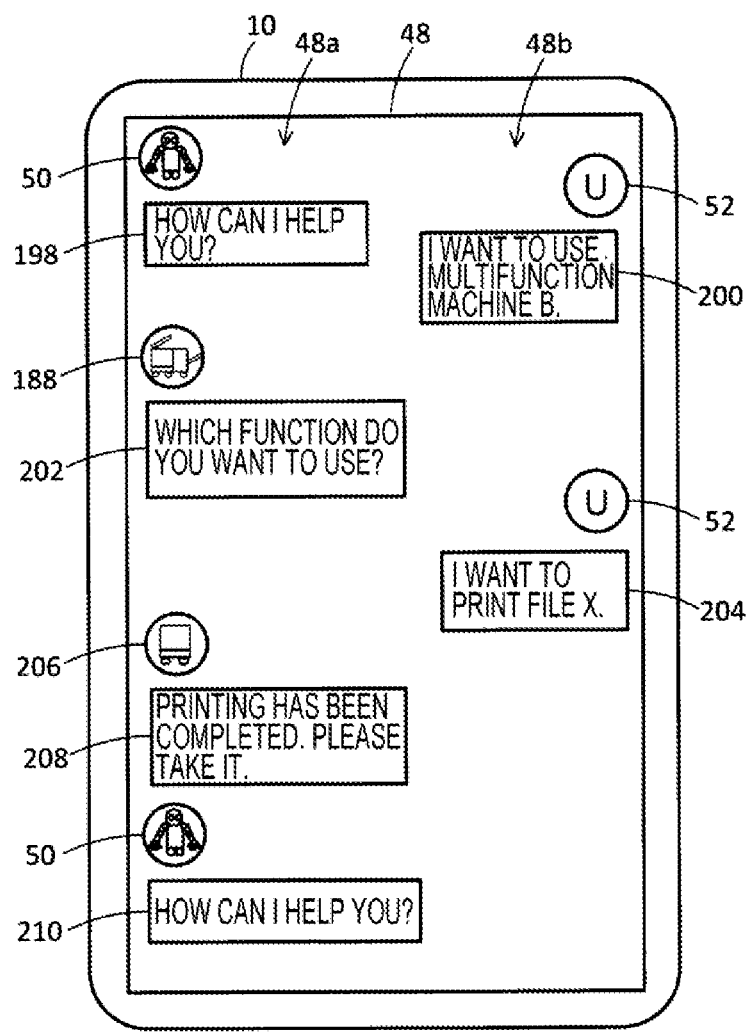
FIG. 37 is a view illustrating a screen.

FIG. 37 illustrates the screen 48. As in FIG. 8, the screen 48 displays the image 50 associated with the automatic response AI, the image 52 associated with the user, and information indicating a conversation between the user and the automatic response AI.

As in the example illustrated in FIG. 36, a message content 198 that "How can I help you?" is displayed in the display area 48a as a message content of the automatic response AI, and in response to the message content 198, a message content 200 that "I want to use multifunction machine B" which indicates an instruction to use a device is displayed as a message content of the user in the display area 48b. Since the message content 200 including the information of the multifunction machine B is transmitted to the automatic response AI, the image associated with the conversation partner is switched from the image 50 associated with the general-purpose automatic response AI to the device image 188 associated with the multifunction machine B, as in the fifth exemplary embodiment described above. Further, a message content 202 that "Which function do you want to use?" is displayed in the display area 48a as a message content of the multifunction machine B, and a message content 204 that "I want to print file X" is displayed as a message content of the user in the display area 48b.

The specifying unit 28 specifies a process content requested by the user by analyzing the message content 204 of the user, and causes the multifunction machine B to execute the process content. As in the fifth exemplary embodiment described above, the controller 26 transmits the printing job including the data of the file X to the multifunction machine B, and causes the multifunction machine B to execute the printing job.

Further, the controller 26 switches the display of the conversation partner to display of a portion of the device for executing the process. Since the printing function is assigned to the "main body portion" of the multifunction machine B, the controller 26 switches the display of the conversation partner to display of the "main body portion" of the multifunction machine B. For example, the controller 26 displays a portion image 206 associated with the "main body portion" of the multifunction machine B in the display area 48a as an image associated with a conversation partner in place of the device image 188 associated with the multifunction machine B. In addition, when the message content 204 indicating the process content is transmitted to the automatic response AI, it is regarded that an instruction to use the portion of the device for executing the process (a use request) has been given to the automatic response AI. That is, it is regarded that the information of the portion of the device has been transmitted to the automatic response AI. In the example described above, since the message content 204 includes the process content that "I want to print," it is regarded that the information of the "main body portion" of the multifunction machine B to which the printing function is assigned has been transmitted to the automatic response AI.

In addition, the controller 26 may display a portion image representing a state of a portion of a device in the display area 48a as an image associated with a conversation partner in place of the image 50 associated with the automatic response AI. In the example described above, the controller 26 displays the portion image 206 representing the state of the "main body portion" of the multifunction machine B in the display area 48a as an image associated with a conversation partner. The controller 26 acquires the information indicating the state of each portion of the device to be used from the device, and controls the display of the portion image representing the state. For example, when the portion of the device is performing a process, the controller 26 displays a portion image representing the state where the portion is performing a process, as an image associated with a conversation partner. When the portion of the device is not performing a process, the controller 26 displays a portion image representing the state where the portion is not performing a process, as an image associated with a conversation partner. When the portion of the device is in the sleep state, the controller 26 displays a portion image representing the sleep state as an image associated with a conversation partner. When the device is powered off, the controller 26 displays a portion image representing the powered-off state as an image associated with a conversation partner. Accordingly, the user may visually confirm the state of the portion of the device. For example, when the "main body portion" of the multifunction machine B is performing printing, the controller 26 displays the portion image 206 representing the state where the "main body portion" of the multifunction machine B is performing the printing, in the display area 48a as an image associated with a conversation partner. The image representing the state of the portion of the device may be created in advance and stored in the memory 24, or may be created by the controller 26. In addition, the controller 26 may display a character string indicating the state of the portion of the device in the display area 48a in place of or along with the portion image.

When the printing of the file X is completed, the controller 26 displays a message content 208 indicating that the printing has been completed, in the display area 48a as a message content of the "main body portion" of the multifunction machine B. At this time as well, the controller 26 displays the portion image 206 associated with the "main body portion" of the multifunction machine B in the display area 48a, and displays the message content 208 in the display area 48a as a message content associated with the portion image 206 of the "main body portion" of the multifunction machine B.

When the process by the multifunction machine B is completed, the controller 26 displays the image 50 associated with the general-purpose automatic response AI in the display area 48a as an image associated with a conversation partner in place of the portion image 206 associated with the "main body portion" of the multifunction machine B. Further, the controller 26 displays a message content 210 that "How can I help you?" which indicates a common question in the display area 48a as a message content of the automatic response AI.

As another example, when information of a portion of a device (for example, a portion image associated with a portion or a character string indicating a portion) is transmitted as the message content 200 of the user to the automatic response AI, the controller 26 may switch the display of the conversation partner from the display of the automatic response AI to display of the portion. For example, when a message content that "I want to use the main body portion (or printing portion) of multifunction machine B" is transmitted as the message content 200 of the user to the automatic response AI, the controller 26 may switch the image associated with the conversation partner from the image 50 associated with the automatic response AI to the portion image 206 associated with the "main body portion" of the multifunction machine B.

As described above, according to Modification 11, when an instruction to use a portion of a device (a use request) is given to the automatic response AI (for example, when information of a portion of a device is transmitted to the automatic response AI), the display of the conversation partner is switched to the display of the portion of the device, on the screen 48 for making a conversation with the automatic response AI. Accordingly, the user may visually confirm whether the user may give the instruction to the portion of the device.

In addition, when the portion of the device is displayed as a conversation partner, the conversation partner of the user may be the general-purpose automatic response AI equipped in the terminal device 10 or may be switched from the general-purpose automatic response AI to the automatic response AI equipped in the device or portion.

(Modification 12)

Hereinafter, Modification 12 will be described with reference to FIG. 38. In Modification 12, when the user gives an instruction to use plural devices (a use request) to the automatic response AI (for example, when information of plural devices is transmitted as information of objects to be linked to the automatic response AI), the display of the conversation partner who is making a reply is switched from the display of the general-purpose automatic response AI to display of the plural devices. Hereinafter, Modification 12 will be described in detail.

Figure 38:
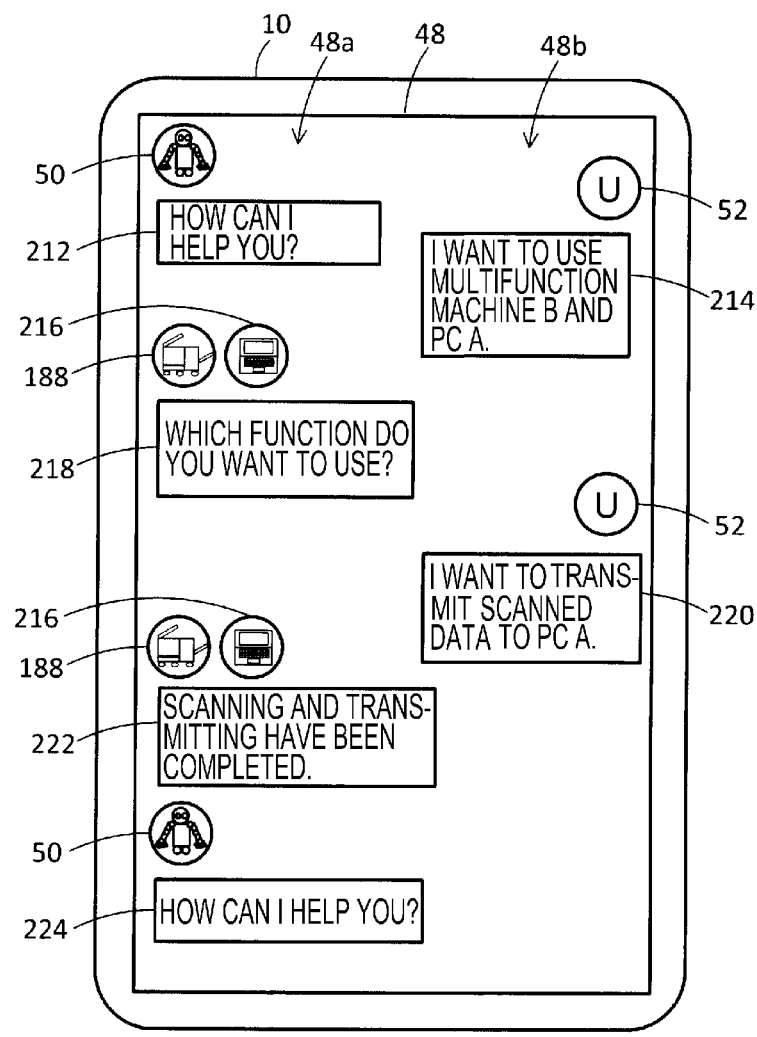
FIG. 38 is a view illustrating a screen.

FIG. 38 illustrates the screen 48. As in FIG. 8, the screen 48 displays the image 50 associated with the automatic response AI, the image 52 associated with the user, and information indicating a conversation between the user and the automatic response AI.

As in the example illustrated in FIG. 36, a message content 212 that "How can I help you?" is displayed in the display area 48a as a message content of the automatic response AI.

When the user designates plural devices as devices to be linked in response to the message content 212, the specifying unit 28 (the specifying unit 28 implemented by the automatic response AI) identifies the plural devices as devices to be linked. For example, it is assumed that the user makes a message content 214 of "I want to use multifunction machine B and PC A" as a message content indicating an instruction to use plural devices (a use request). The controller 26 displays the message content 214 including the information of the multifunction machine B and the PC A in the display area 48b as a message content of the user, and transmits the message content 214 to the automatic response AI. Accordingly, the information of the multifunction machine B and the PC A is transmitted as information of devices to be linked to the automatic response AI. The user may input character strings indicating the plural devices as a message content of the user to the terminal device 10, or designate device images (for example, external appearance images or icons) associated with the devices as a message content of the user as in the first exemplary embodiment described above, by operating the UI unit 20. When designating device images, as illustrated in FIG. 8, the user may select the plural device images from the stock area 58 and move the plural device images to the position where a message content of the user is displayed, so as to designate the plural device images as a message content of the user.

The specifying unit 28 specifies linkage functions executable by using the plural devices designated by the user, by referring to, for example, the linkage function management table illustrated in FIG. 7. In the example described above, since the multifunction machine B and the PC A are designated, the "scanning transmitting function" and the "printing function" are specified as the linkage functions executable by using the multifunction machine B and the PC A (see FIG. 7).

When the user designates the plural devices, and the plural devices are identified, the controller 26 switches the display of the conversation partner from the display of the general-purpose automatic response AI to display of the plural devices designated by the user.

In the example described above, since the multifunction machine B and the PC A are designated as devices to be linked, the controller 26 displays the device image 188 associated with the multifunction machine B and the device image 216 associated with the PC A in the display area 48a as images associated with conversation partners in place of the image 50 associated with the automatic response AI. The device image 216 may be an image generated by capturing the PC A (for example, an external appearance image of the PC A) or an image emulating the PC A (for example, an icon). In addition, the controller 26 may display character strings indicating the multifunction machine B and the PC A in the display area 48a as information indicating the conversation partners in place of or along with the device images 188 and 216.

Further, the controller 26 displays a message content 218 that "Which function do you want to use?" in the display area 48a as a message content of the multifunction machine B and the PC A. The message content 218 itself is created by the general-purpose automatic response AI. In order to act as if the multifunction machine B and the PC A make the message content 218, the controller 26 displays the message content 218 in the display area 48a as a message content associated with the device image 188 of the multifunction machine B and the device image 216 of the PC A. The controller 26 may display a list of linkage functions specified by the specifying unit 28 in the display area 48a as a message content of the multifunction machine B and the PC A. Since the linkage functions executable by using the multifunction machine B and the PC A are the "scanning transmitting function" and the "printing function" (see FIG. 7), the controller 26 may display character strings or images indicating the "scanning transmitting function" and the "printing function" in the display area 48a as a message content of the multifunction machine B and the PC A.

In response to the message content 218 described above, the user inputs a linkage function that the user wants to execute, as a message content of the user to the terminal device 10. In the example illustrated in FIG. 38, a message content 220 that "I want to transmit scanned data to PC A" which indicates the scanning transmitting function is input as a message content of the user to the terminal device 10.

The controller 26 specifies the linkage function requested by the user by analyzing the message content 220 of the user, and causes the multifunction machine B and the PC A to execute the linkage function. The process for executing the linkage function is the same as described in the first exemplary embodiment described above.

When the scanning transmitting is completed, the controller 26 displays a message content 222 indicating that the scanning transmitting has been completed, in the display area 48*a* as a message content of the multifunction machine B and the PC A. At this time as well, the controller 26 displays the device image 188 associated with the multifunction machine B and the device image 216 associated with the PC A in the display area 48*a*, and displays the message content 222 in the display area 48*a* as a message content associated with the device image 188 of the multifunction machine B and the device image 216 of the PC A. In addition, the message content 222 itself is created by the general-purpose automatic response AI.

When the process by the multifunction machine B and the PC A is completed, the controller 26 displays the image 50 associated with the general-purpose automatic response AI in the display area 48*a* as an image associated with a conversation partner in place of the device image 188 associated with the multifunction machine B and the device image 216 associated with the PC A. Further, the controller 26 displays a message content 224 that "How can I help you?" which indicates a common question, in the display area 48*a* as a message content of the automatic response AI.

As described above, according to Modification 12, when an instruction to use (a use request of) plural devices to be linked is given to the automatic response AI (for example, when information of plural devices to be linked is transmitted to the automatic response AI), the display of the conversation partner is switched to the display of the plural devices, on the screen 48 for making a conversation with the automatic response AI. Accordingly, the user may visually confirm whether the user may give the instruction the plural devices. For example, when the user transmits information of plural devices to the automatic response AI in order to give the instruction to the plural devices, the images associated with the respective devices are displayed as images associated with conversation partners. Accordingly, the user may visually confirm whether the instruction has been actually given to the plural devices.

In addition, when the plural devices are displayed as conversation partners, the conversation partner of the user may be the general-purpose automatic response AI equipped in the terminal device 10 or may be switched from the general-purpose automatic response AI to the automatic response AIs equipped in the plural devices. For example, when the multifunction machine B is equipped with an automatic response AI, the automatic response AI equipped in the multifunction machine B may function as a conversation partner. When the PC A is equipped with an automatic response AI, the automatic response AI equipped in the PC A may function as a conversation partner. When both the multifunction machine B and the PC A are equipped with automatic response AIs, the automatic response AI equipped in any one of the multifunction machine B and the PC A may function as a conversation partner.

In the example illustrated in FIG. 38, information of two devices is transmitted to the automatic response AI. However, information of three or more devices (for example, three or more device images or character strings indicating three or more devices) may be transmitted to the automatic response AI. In this case, the three or more device images are displayed in the display area 48*a* as images associated with conversation partners in place of the image 50 associated with the automatic response AI.

In addition, Modifications 11 and 12 may be combined with each other. That is, when plural portions are designated as portions to be linked, and information of the plural portions is transmitted to the automatic response AI, the controller 26 may switch the display of the conversation partner to display of the plural portions. In addition, the plural portions may be designated from the same device or plural devices.

(Modification 13)

Hereinafter, Modification 13 will be described with reference to FIGS. 39A to 39E and FIGS. 40A to 40E. FIGS. 39A to 39E and FIGS. 40A to 40E illustrate images associated with conversation partners of the user. Here, it is assumed that information of plural devices to be linked (for example, the multifunction machine B and the PC A) is transmitted as a conversation content of the user to the automatic response AI.

Figure 39A:
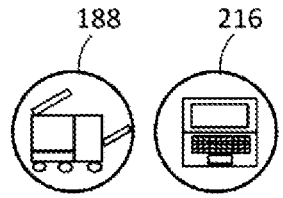
FIGS. 39A to 39E are views illustrating images associated with a conversation partner.

FIG. 39A illustrates images in a basic form. As in Modification 12 described above, when the information of the multifunction machine B and the PC A is transmitted as a message content of the user to the automatic response AI, the device image 188 associated with the multifunction machine B and the device image 216 associated with the PC A are displayed in the display area 48*a* as images associated with conversation partners.

Figure 39B:
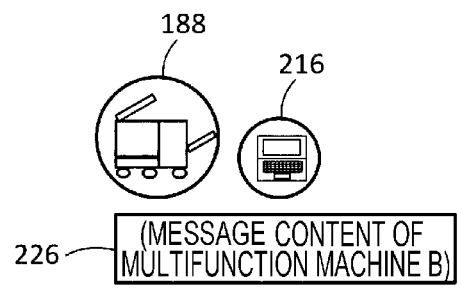

When the device images 188 and 216 are displayed as images associated with conversation partners as illustrated in FIG. 39A, and in this state, a message content 226 is displayed in the display area 48*a* as a message content of the multifunction machine B as illustrated in FIG. 39B, the controller 26 displays the device image 188 associated with the multifunction machine B in the display area 48*a* to be larger than the device image 216 associated with the PC A. For example, when the PC A is not performing a process included in a linkage function, and the multifunction machine B is performing a process included in the linkage function, the information on the process is displayed in the display area 48*a* as a message content of the multifunction machine B. In this case, the device image 188 is displayed larger than the device image 216. Accordingly, the user may visually confirm the device which is performing a process included in a linkage function. When both of the multifunction machine B and the PC A are performing a process included in a linkage function, the device images 188 and 216 are displayed in the same size as illustrated in FIG. 39A.

Figure 39C:
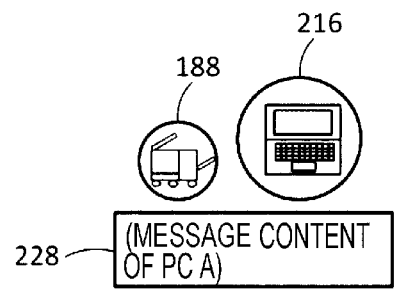

Meanwhile, as illustrated in FIG. 39C, when a message content 228 is displayed in the display area 48*a* as a message content of the PC A, the controller 26 displays the device image 216 in the display area 48*a* to be larger than the device image 188. For example, when the PC A is performing a process included in a linkage function, and the multifunction machine B is not performing a process included in the linkage function, the information on the process is displayed in the display area 48*a* as a message content of the PC A.

Figure 39D:
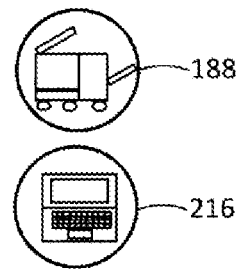

In the example illustrated in FIGS. 38 and 39A, the device images 188 and 216 are displayed to be arranged laterally side by side. However, as illustrated in FIG. 39D, the device images 188 and 216 may be displayed to be arranged vertically side by side. In addition, the device images 188 and 216 may be arranged and displayed in other forms.

Figure 39E:
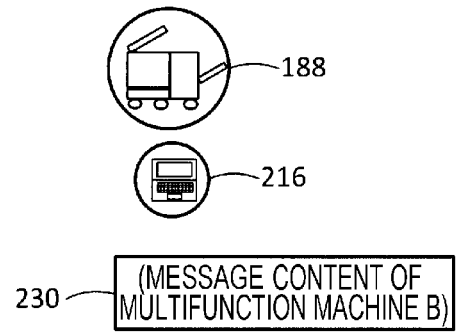

In addition, as illustrated in FIG. 39E, when a message content 230 is displayed in the display area 48*a* as a message content of the multifunction machine B, the device image 188 associated with the multifunction machine B may be displayed larger than the device image 216 associated with the PC A. When a message content is displayed in the display area 48*a* as a message content of the PC A, the device image 216 is displayed larger than the device image 188.

In addition, the order of displaying a device image may be changed according to an order of messages of the user. For example, when the user makes messages in order of the "multifunction machine B" and the "PC A", the device images 188 and 216 may be displayed in an order of the device image 188 associated with the multifunction machine B and the device image 216 associated with the PC A. For example, a first designated device (for example, the multifunction machine B) may be displayed at the left or upper side, and a second designated device (for example, the PC A) may be displayed at the right or lower side. In addition, the displaying order may not follow the designating order, and may be determined by an order of identifying or registering a device. In addition, a device image of a device which is making a message (a device associated with a message content) may be displayed at a predetermined position (for example, at the left or upper side). Accordingly, the user may visually confirm a device which is making a message (for example, a device which is performing a process).

Figure 40A:
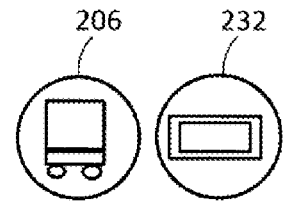
FIGS. 40A to 40E are views illustrating images associated with a conversation partner.

FIGS. 40A to 40E illustrate another example of the display. For example, in a case where Modifications 11 and 12 are combined with each other, when information of plural portions to be linked is transmitted as a message content of the user to the automatic response AI, the controller 26 switches the display of the conversation partner to display of the plural portions. FIG. 40A illustrates an example of the display. For example, when the "main body portion" of the multifunction machine B and the "display unit" of the PC A are designated as portions to be linked, and information of the portions is transmitted as a message content of the user to the automatic response AI, the portion image 206 associated with the "main body" of the multifunction machine B and the portion image 232 associated with the "display portion" of the PC A are displayed in the display area 48*a* as images associated with conversation partners. In addition, when the plural portions are displayed as conversation partners, any one of the display examples illustrated FIGS. 39A to 39E may be applied.

Figure 40B:

In addition, when a device is performing a process, the controller 26 may display a portion image associated with the portion of the device which is performing a process, in the display area 48*a* as an image associated with a conversation partner. For example, when the "main body portion" of the multifunction machine B is performing printing, the controller 26 displays the portion image 206 associated with the "main body portion" in the display area 48*a* as an image associated with a conversation partner as illustrated in FIG. 40B. Similarly, when the "reading unit" of the multifunction machine B is performing scanning, the controller 26 displays the portion image associated with the "reading portion" in the display area 48*a* as an image associated with a conversation partner. Accordingly, the user may visually confirm the portion which is performing a process. In addition, the controller 26 may display a portion image associated with a portion which is performing a process (for example, the printing job) instructed by the user on the screen 48 (for example, the "main body portion" of the multifunction machine B), in the display area 48*a* as an image associated with a conversation partner. Accordingly, the user may visually confirm the portion which is performing the process instructed by the user.

Figure 40C:
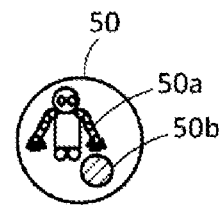
Figure 40D:
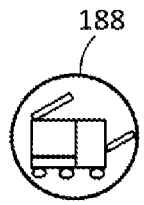
Figure 40E:
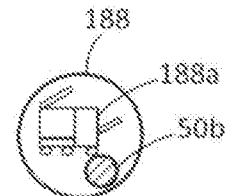

In addition, as illustrated in FIG. 40C, an image 50*a* representing the automatic response AI itself and a background image 50*b* representing the background of the automatic response AI may be displayed in the image 50 associated with the general-purpose automatic response AI. When information of a device (for example, the multifunction machine B) is transmitted to the automatic response AI, the entire image 50 may be replaced with the device image 188 as illustrated in FIG. 40D. As another example, as illustrated in FIG. 40E, the image 50 may be replaced with the device image 188 representing an image 188*a* representing the multifunction machine B itself and the background image 50*b*. That is, the background image 50*b* may be displayed as it is.

Sixth Exemplary Embodiment

Hereinafter, a device system according to a sixth exemplary embodiment will be described. In the sixth exemplary embodiment, when the user transmits an instruction to use a function (a use request) to the automatic response AI (for example, when the user transmits information of a function to the automatic response AI), the display of the conversation partner who is making a reply is switched to display of the function, on an interface for making a conversation with the automatic response AI (for example, the screen 48). Hereinafter, the sixth exemplary embodiment will be described in detail.

Figure 41:
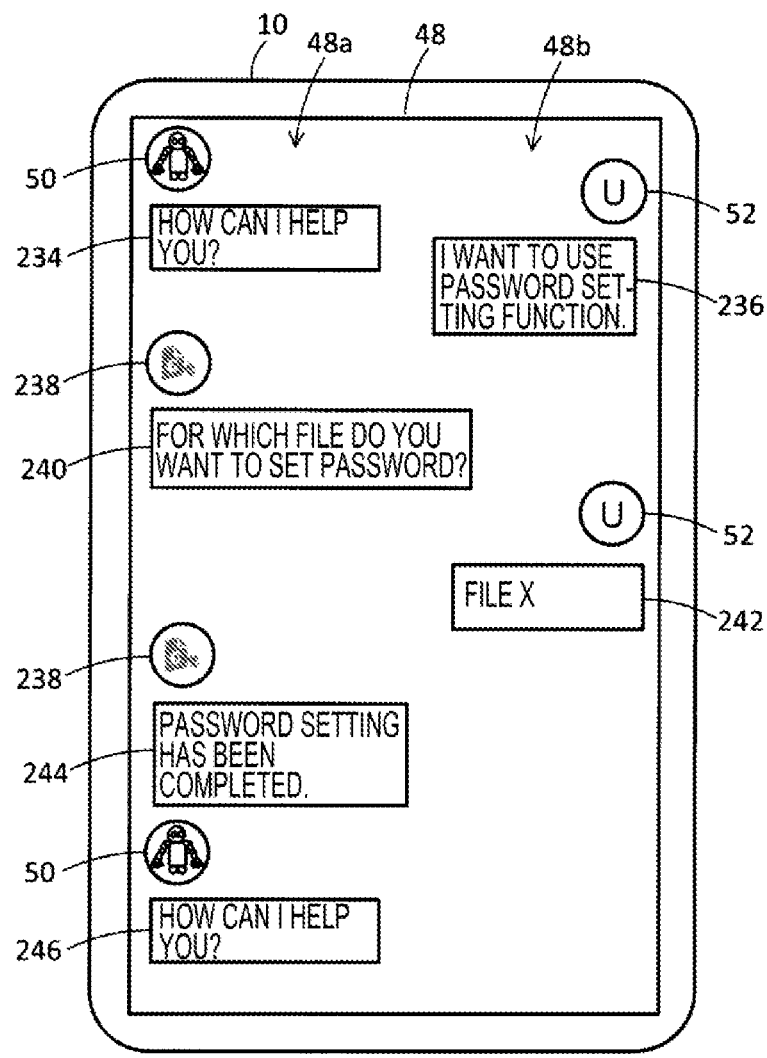
FIG. 41 is a view illustrating a screen.

FIG. 41 illustrates the screen 48. As in FIG. 8, the screen 48 displays the image 50 associated with the automatic response AI, the image 52 associated with the user, and information indicating a conversation between the user and the automatic response AI.

For example, a message content 234 that "How can I help you?" is displayed as a message content of the automatic response AI on the screen 48. Since the message content 234 is a message content made by the automatic response AI, the controller 26 displays the image 50 associated with the automatic response AI in the display area 48*a*, and displays the message content 234 in the display area 48*a* as a message content associated with the image 50 of the automatic response AI. In addition, the automatic response AI does not depend on a device, and may be a general-purpose automatic response AI.

When the user designates a function in response to the message content 234, the specifying unit 28 (the specifying unit 28 implemented by the automatic response AI) identifies the function. For example, it is assumed that the user makes a message content 236 of "I want to use password setting function" as a message content indicating an instruction to use the function (a use request). The controller 26 displays the message content 236 including the information of the password setting function in the display area 48*b* as a message content of the user, and transmits the message content 236 to the automatic response AI. Accordingly, the information of the password setting function is transmitted to the automatic response AI. The message content 236 is displayed in the display area 48*b* as a message content associated with the image 52 of the user. The user may input a character string indicating the function as a message content of the user to the terminal device 10, or designate a function image (for example, an image such as an icon) associated with the function as a message content of the user as in the second exemplary embodiment described above, by operating the UI unit 20. When designating a function image, as illustrated in FIG. 27, the user may select the function image associated with the function to be used from the stock area 124 and move the function image to the position where a message content of the user is displayed, so as to designate the function image as a message content of the user.

When the user designates the function and the function is identified, the controller 26 switches the display of the conversation partner (for example, the image associated with the conversation partner or the character string indicating the conversation partner) from the display of the general-purpose automatic response AI (for example, the image associated with the general-purpose automatic response AI or the character string indicating the general-purpose automatic response AI) to the display of the function designated by the user (for example, the image associated with the function or the character string indicating the function).

In addition, even though the display of the conversation partner is switched from the display of the general-purpose automatic response AI to the display of the function, the conversation partner itself of the user is the general-purpose automatic response AI. That is, a message content of the conversation partner is created by the general-purpose automatic response AI equipped in the terminal device 10.

In the example described above, since the password setting function is designated as a function to be used, the controller 26 displays a function image 238 associated with the password setting function in the display area 48*a* as an image associated with a conversation partner in place of the image 50 associated with the automatic response AI. The function image 238 is, for example, an icon. In addition, the controller 26 may display a character string indicating the password setting function in the display area 48*a* as information indicating a conversation partner in place of or along with the function image 238.

In addition, the controller 26 may display a function image representing a state of the function (for example, a state of software or a device for implementing the function) in the display area 48*a* as an image associated with a conversation partner in place of the image 50 associated with the automatic response AI. In the example described above, the controller 26 displays the function image 238 representing the state of password setting software in the display area 48*a* as an image associated with a conversation partner. The controller 26 acquires the information indicating the state of the software or the device for implementing the function from the software or device, and controls the display of the function image representing the state. For example, when the software or device for implementing the function is performing a process, the controller 26 displays a function image representing the state where the software or device is performing a process as an image associated with a conversation partner. When the software or device for implementing the function is not performing a process, the controller 26 displays a function image representing the state where the software or device is not performing a process as an image associated with a conversation partner. When the device for implementing the function is in the sleep state, the controller 26 displays a function image representing the sleep state as an image associated with a conversation partner. When the software for implementing the function is in a freeze state, the controller 26 displays a function image representing the freeze state as an image associated with a conversation partner. When the device for implementing the function is powered off, the controller 26 displays a function image representing the powered-off state as an image associated with a conversation partner. Accordingly, the user may visually confirm the state of the function. For example,
when the password setting software is setting a password for another data, the controller 26 displays the function image 238 representing the state where the password setting software is performing the password setting process, in the display area 48*a* as an image associated with a conversation partner. The image representing the state of the device may be created in advance and stored in the memory 24, or may be created by the controller 26. In addition, the controller 26 may display a character string indicating the state of the function in the display area 48*a* in place of or along with the device image.

Further, the controller 26 displays a message content 240 that "For which file do you want to set a password?" in the display area 48*a* as a message content of the password setting function. The message content 240 itself is created by the general-purpose automatic response AI. In order to act as if the password setting function makes the message content 240, the controller 26 displays the message content 240 in the display area 48*a* as a message content associated with the function image 238 of the password setting function.

In response to the message content 240, the user designates a file to be subjected to the password setting. In the example illustrated in FIG. 41, a message content 242 that "File X" is input as a message content of the user to the terminal device 10.

The controller 26 specifies the process content requested by the user by analyzing the message content 242 of the user, and causes the password setting software to execute the process content. For example, the controller 26 activates the password setting software, and sets a password for the file X designated by the user by the password setting software. In addition, the controller 26 may cause the UI unit 20 to display a screen for setting the password.

When the password setting is completed, the controller 26 displays a message content 244 indicating that the password setting has been completed, in the display area 48*a* as a message content of the password setting function. At this time as well, the controller 26 displays the function image 238 associated with the password setting function in the display area 48*a*, and displays the message content 244 in the display area 48*a* as a message content associated with the function image 238 of the password setting function. In addition, the message content 244 itself is created by the general-purpose automatic response AI.

When the process by the password setting function is completed, the controller 26 displays the image 50 associated with the general-purpose automatic response AI in the display area 48*a* as an image associated with a conversation partner in place of the function image 238 associated with the password setting function. Further, the controller 26 displays a message content 246 that "How can I help you?" which indicates a common question, in the display area 48*a* as a message content of the automatic response AI.

As described above, according to the sixth exemplary embodiment, when an instruction to use a function (a use request) is given to the automatic response AI (for example, when information of a function is transmitted to the automatic response AI), the display of the conversation partner who is making a reply is switched to the display of the function, on the screen 48 for making a conversation with the automatic response AI. Accordingly, the user may visually confirm whether the user may give the instruction to the function. For example, when the user transmits the information of the function to the automatic response AI in order to give the instruction to the function, the image associated with the function is displayed as an image associated with a conversation partner. Accordingly, the user may visually confirm whether the instruction has been actually given to the function.

Modification 10 may be applied to the sixth exemplary embodiment. For example, when a program of an automatic response AI is assigned to each function, and the program of each automatic response AI is installed in the terminal device 10, the controller 26 may switch the display of the conversation partner from the display of the general-purpose automatic response AI to the display of the function, and switch the automatic response AI which is the conversation partner of the user from the general-purpose automatic response AI to the automatic response AI assigned to the function.

Modification 11 may be applied to the sixth exemplary embodiment. For example, in a case where a function is further assigned to each portion in a function image, when an image associated with the portion is transmitted as a message content of the user to the automatic response AI, the image associated with the portion may be displayed in the display area 48*a* as an image associated with a conversation partner.

Modification 12 may be applied to the sixth exemplary embodiment. For example, when the user gives an instruction to use plural functions (a use request) to the automatic response AI (for example, when the user transmits information of plural functions as information of objects to be linked to the automatic response AI), the display of the conversation partner who is making a reply is switched from the display of the general-purpose automatic response AI to display of the plural functions. Hereinafter, the process in a case where Modification 12 is applied to the sixth exemplary embodiment will be described with reference to FIG. 42.

Figure 42:
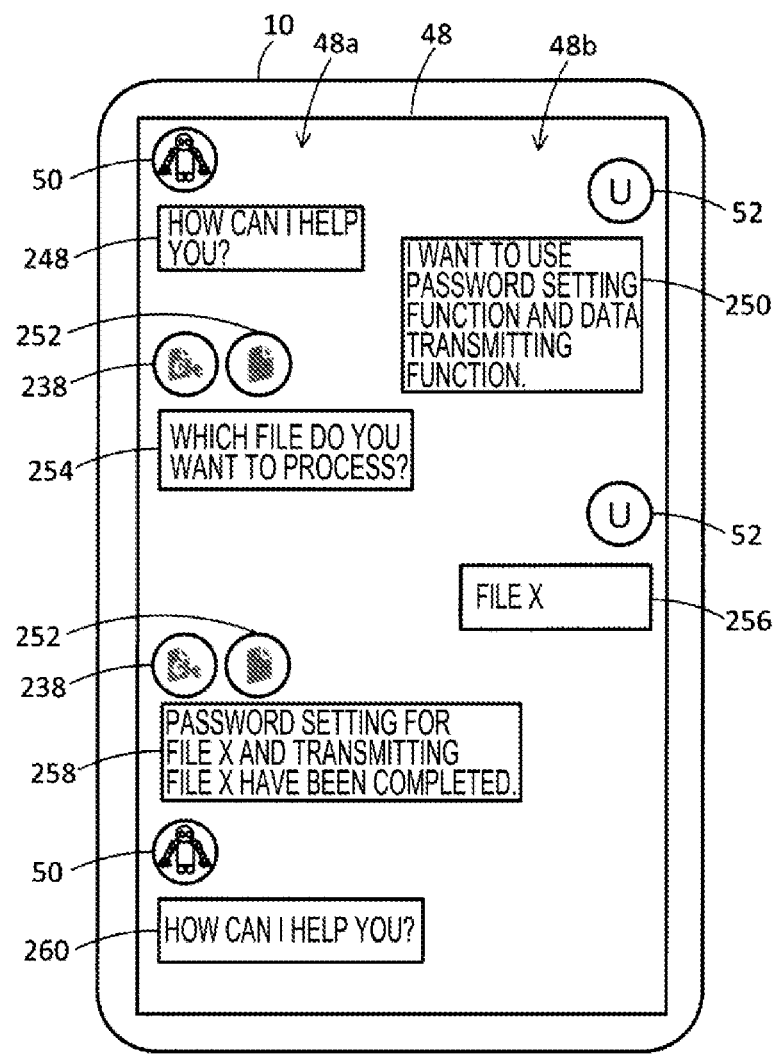
FIG. 42 is a view illustrating a screen.

FIG. 42 illustrates the screen 48. As in FIG. 8, the screen 48 displays the image 50 associated with the automatic response AI, the image 52 associated with the user, and information indicating a conversation between the user and the automatic response AI.

As in the example illustrated in FIG. 41, a message content 248 that "How can I help you?" is displayed in the display area 48*a* as a message content of the automatic response AI.

When the user designates plural functions as functions to be linked in response to the message content 248, the specifying unit 28 (the specifying unit 28 implemented by the automatic response AI) identifies the plural functions as functions to be linked. For example, it is assumed that the user makes a message content 250 of "I want to use password setting function and data transmitting function" as a message content indicating an instruction to use the plural functions (a use request). The controller 26 displays the message content 250 including the information of the password setting function and the data transmitting function in the display area 48*b* as a message content of the user, and transmits the message content 250 as information of objects to be linked to the automatic response AI. Accordingly, the information of the password setting function and the data transmitting function is transmitted as information of functions to be linked to the automatic response AI. The user may input character strings indicating the plural functions as a message content of the user to the terminal device 10, or designate function images (for example, icons) associated with the functions as a message content of the user as in the second exemplary embodiment described above, by operating the UI unit 20. When designating function images, as illustrated in FIG. 27, the user may select the plural function images from the stock area 124 and move the plural function images to the position where a message content of the user is displayed, so as to designate the plural function images as a message content of the user.

The specifying unit 28 specifies a linkage function executable by using the plural functions designated by the user, for example, by referring to the linkage function management table illustrated in FIG. 26. In the example described above, since the password setting function and the data transmitting function are designated, for example, the "function of setting password for data and transmitting the data" is specified as a linkage function.

When the user designates the plural functions and the plural functions are identified, the controller 26 switches the display of the conversation partner from the display of the general-purpose automatic response AI to the display of the plural functions designated by the user.

In the example described above, since the password setting function and the data transmitting function are designated as functions to be linked, the controller 26 display the function image 238 associated with the password setting function and a function image 252 associated with the data transmitting function in the display area 48*a* as images associated with conversation partners in place of the image 50 associated with the automatic response AI. In addition, the controller 26 may display character strings indicating the password setting function and the data transmitting function in the display area 48*a* as information indicating conversation partners in place of or along with the function images 238 and 252.

Further, the controller 26 displays a message content 254 that "Which file do you want to process?" in the display area 48*a* as a message content of the password setting function and the data transmitting function. The message content 254 itself is created by the general-purpose automatic response AI. In order to act as if the password setting function and the data transmitting function make the message content 254, the controller 26 displays the message content 254 in the display area 48*a* as a message content associated with the function image 238 of the password setting function and the function image 252 of the data transmitting function. The controller 26 may display a list of linkage functions specified by the specifying unit 28 in the display area 48*a* as a message content of the password setting function and the data transmitting function.

In response to the message content 254, the user designates a file to be processed. In the example illustrated in FIG. 42, a message content 256 that "File X" is input as a message content of the user to the terminal device 10.

The controller 26 specifies the process content requested by the user by analyzing the message content 256 of the user, and causes the password setting software and the data transmitting software to execute the process content. For example, the controller 26 activates the password setting software and the data transmitting software, sets a password for the file X designated by the user by using the password setting software, and transmits the file X set with the password to a transmission destination (for example, a transmission destination designated by the user or a predetermined transmission destination) by using the data transmitting software. In addition, the controller 26 may cause the UI unit 20 to display a screen for setting a password or a screen for setting a transmission destination.

When the execution of the linkage function is completed, the controller 26 displays a message content 258 indicating that the execution of the linkage function has been completed, in the display area 48*a* as a message content of the password setting function and the data transmitting function.

At this time as well, the controller 26 displays the function image 238 associated with the password setting function and the function image 252 associated with the data transmitting function in the display area 48a, and displays the message content 258 in the display area 48a as a message content associated with the function image 238 of the password setting function and the function image 252 of the data transmitting function. In addition, the message content 258 itself is created by the general-purpose automatic response AI.

When the execution of the linkage function is completed, the controller 26 display the image 50 associated with the general-purpose automatic response AI in the display area 48a as an image associated with a conversation partner in place of the function image 238 associated with the password setting function and the function image 252 associated with the data transmitting function. Further, the controller 26 displays a message content 260 that "How can I help you?" which indicates a common question, in the display area 48a as a message content of the automatic response AI.

As described above, in a case where Modification 12 is applied to the sixth exemplary embodiment, when an instruction to use plural functions to be linked (a use request) is assigned to the automatic response AI (for example, when information of plural functions to be linked is transmitted as a conversation content to the automatic response AI), the display of the conversation partner is switched to the display of the plural functions, on the screen 48 for making a conversation with the automatic response AI. Accordingly, the user may visually confirm whether the user may give the instruction to the plural functions. For example, when the user transmits information of the plural functions to the automatic response AI in order to give the instruction to the plural functions, the images associated with the respective functions are displayed as images associated with conversation partners. Accordingly, the user may visually confirm whether the instruction has been actually given to the plural functions.

In addition, when the plural functions are displayed as conversation partners, the conversation partner of the user may be the general-purpose automatic response AI or may be switched from the general-purpose automatic response AI to the automatic response AIs equipped in the respective functions.

In the example illustrated in FIG. 42, information of two functions is transmitted to the automatic response AI. However, information of three or more functions (for example, three or more function images or character strings indicating three or more functions) may be transmitted to the automatic response AI. In this case, the three or more function images are displayed in the display area 48a as images associated with conversation partners in place of the image 50 associated with the automatic response AI.

In addition, a combination of Modifications 11 and 12 may be applied to the sixth exemplary embodiment. That is, in a case where a function is further assigned to each portion in a function image, when images associated with plural portions are transmitted as a message content of the user to the automatic response AI, the images of the plural portions may be displayed in the display area 48a as images associated with conversation partners.

In addition, Modification 13 may be applied to the sixth exemplary embodiment. That is, in the sixth exemplary embodiment as well, each device image may be displayed according to the display examples illustrated in FIGS. 39A to 39E and FIGS. 40A to 40E.

Seventh Exemplary Embodiment

Hereinafter, a device system according to a seventh exemplary embodiment will be described. In the seventh exemplary embodiment, when the user gives an instruction to use a device and a function (a use request) to the automatic response AI (for example, when the user transmits information of a device and a function to the automatic response AI), the display of the conversation partner who is making a reply is switched to display of the device and the function, on an interface for making a conversation with the automatic response AI (for example, the screen 48). Hereinafter, the seventh exemplary embodiment will be described in detail.

Figure 43:
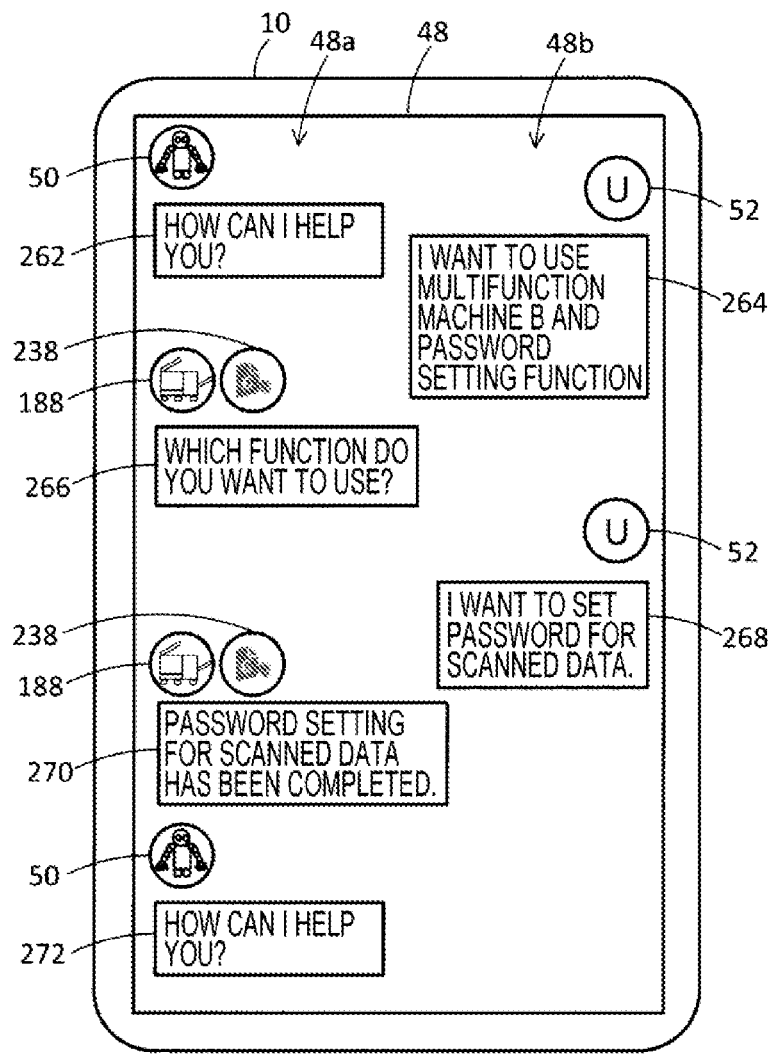
FIG. 43 is a view illustrating a screen.

FIG. 43 illustrates the screen 48. As in FIG. 8, the screen 48 displays the image 50 associated with the automatic response AI, the image 52 associated with the user, and information indicating a conversation between the user and the automatic response AI.

For example, a message content 262 that "How can I help you?" is displayed as a message content of the automatic response AI on the screen 48. Since the message content 262 is a message content made by the automatic response AI, the controller 26 displays the image 50 associated with the automatic response AI in the display area 48a, and displays the message content 262 in the display area 48a as a message content associated with the image 50 of the automatic response AI. In addition, the automatic response AI does not depend on a device, and may be a general-purpose automatic response AI.

When the user designates a device and a function as objects to be linked in response to the message content 262, the specifying unit 28 (the specifying unit 28 implemented by the automatic response AI) identifies the device and the function as objects to be linked. For example, it is assumed that the user makes a message content 264 of "I want to use multifunction machine B and password setting function" as a message content indicating an instruction to use a device and a function (a use request). The controller 26 displays the message content 264 including the information of the multifunction machine B and the password setting function in the display area 48b as a message content of the user, and transmits the message content 264 to the automatic response AI. Accordingly, the information of the multifunction machine B and the password setting function is transmitted as information of objects to be linked to the automatic response AI. The message content 264 is displayed in the display area 48b as a message content associated with the image 52 of the user. The user may input character strings indicating the device and the function as a message content of the user to the terminal device 10, or designate a device image associated with the device and a function image associated with the function as a message content of the user as in the third exemplary embodiment described above, by operating the UI unit 20. When designating a device image, as illustrated in FIG. 8, the user may select the device image associated with the device to be linked from the stock area 58 and move the device image to the position where a message content of the user is displayed, so as to designate the device image as a message content of the user. Similarly, when designating a function image, as illustrated in FIG. 27, the user may select the function image associated with the function to be used from the stock area 124 and move the function image to the position where a message content of the user is displayed, so as to designate the function image as a message content of the user.

The specifying unit 28 specifies a linkage function executable by using the device and the function designated by the user, by referring to, for example, the linkage function management table illustrated in FIG. 30. In the example described above, since the multifunction machine B and the password setting function are designated, for example, a "function of setting password for data generated by scanning by multifunction machine B" is specified as a linkage function.

When the user designates the device and the function as objects to be linked and the device and the function are identified as objects to be linked, the controller 26 switches the display of the conversation partner from the display of the general-purpose automatic response AI to display of the device and the function designated by the user.

In addition, even though the display of the conversation partner is switched from the display of the general-purpose automatic response AI to the display of the device and the function, the conversation partner itself of the user is the general-purpose automatic response AI. That is, a message content of the conversation partner is created by the general-purpose automatic response AI equipped in the terminal device 10.

In the example described above, since the multifunction machine B and the password setting function are designated as objects to be linked, the controller 26 displays the device image 188 associated with the multifunction machine B and the function image 238 associated with the password setting function in the display area 48*a* as images associated with conversation partners in place of the image 50 associated with the automatic response AI. In addition, the controller 26 may display character strings indicating the multifunction machine B and the password setting function in the display area 48*a* as information indicating conversation partners in place of or along with the device image 188 and the function image 238.

Further, the controller 26 display a message content 266 that "Which function do you want to use?" in the display area 48*a* as a message content of the multifunction machine B and the password setting function. The message content 266 itself is created by the general-purpose automatic response AI. In order to act as if the multifunction machine B and the password setting function make the message content 266, the controller 26 displays the message content 266 in the display area 48*a* as a message content associated with the device image 188 of the multifunction machine B and the function image 238 of the password setting function. The controller 26 may display a list of linkage functions specified by the specifying unit 28 in the display area 48*a* as a message content of the multifunction machine B and the password setting function.

In response to the message content 266 described above, the user inputs a linkage function that the user wants to execute, as a message content of the user to the terminal device 10. In the example illustrated in FIG. 43, a message content 268 that "I want to set password for scanned data" which indicates a linkage function is input as a message content of the user to the terminal device 10.

The controller 26 specifies the linkage function requested by the user by analyzing the message content 268 of the user, and causes the multifunction machine B and the password setting function (the password setting software) to execute the linkage function. For example, the controller 26 transmits a scanning job to the multifunction machine B and causes the multifunction machine B to perform the scanning. Data generated by the scanning is transmitted from the multifunction machine B to the terminal device 10. Further, the controller 26 activates the password setting software and sets a password for the data by the password setting software.

When the execution of the linkage function is completed, the controller 26 displays a message content 270 indicating that the execution of the linkage function has been completed, in the display area 48*a* as a message content of the multifunction machine B and the password setting function. At this time as well, the controller 26 displays the device image 188 associated with the multifunction machine B and the function image 238 associated with the password setting function in the display area 48*a*, and displays the message content 270 in the display area 48*a* as a message content associated with the device image 188 of the multifunction machine B and the function image 238 of the password setting function. In addition, the message content 270 itself is created by the general-purpose automatic response AI.

When the execution of the linkage function is completed, the controller 26 displays the image 50 associated with the general-purpose automatic response AI in the display area 48*a* as an image associated with a conversation partner in place of the device image 188 associated with the multifunction machine B and the function image 238 associated with the password setting function. Further, the controller 26 displays a message content 272 that "How can I help you?" which indicates a common question in the display area 48*a* as a message content of the automatic response AI.

As described above, according to the seventh exemplary embodiment, when an instruction to use a device and a function (a use request) is given to the automatic response AI (for example, when information of a device and a function is transmitted to the automatic response AI), the display of the conversation partner is switched to the display of the device and the function, on the screen 48 for making a conversation with the automatic response AI. Accordingly, the user may visually confirm whether the user may give the instruction to the device and the function. For example, when the user transmits information of a device and a function to the automatic response AI in order to give the instruction to the device and the function, the images associated with the device and the function are displayed as images associated with conversation partners. Accordingly, the user may visually confirm whether the instruction has been actually given to the device and the function.

In the example illustrated in FIG. 43, information of the device and the function which total two is transmitted to the automatic response AI. However, information of a total of three or more devices and functions may be transmitted to the automatic response AI. In this case, the total three or more device images and function images are displayed in the display area 48*a* as images associated with conversation partners in place of the image 50 associated with the automatic response AI.

Modification 10 may be applied to the seventh exemplary embodiment. For example, when the program of the automatic response AI is assigned to each of a device and a function, the controller 26 may switch the display of the conversation partner from the display of the general-purpose automatic response AI to the display of the device and the function, and switch the automatic response AI which is the conversation partner of the user from the general-purpose automatic response AI to the automatic response AIs assigned to the device and the function.

Modification 11 may be applied to the seventh exemplary embodiment. For example, when information of a portion of a device is transmitted as a message content of the user to the automatic response AI, an image associated with the portion may be displayed as an image associated with a conversation partner. In addition, in a case where a function is further assigned to each portion in a function image, when an image associated with the portion is transmitted as a message content of the user to the automatic response AI, the image associated with the portion may be displayed in the display area 48*a* as an image associated with a conversation partner.

In addition, Modification 13 may be applied to the seventh exemplary embodiment. That is, in the seventh exemplary embodiment as well, a device image or a function image may be displayed according to the display examples in FIGS. 39A to 39E and FIGS. 40A to 40E.

Eighth Exemplary Embodiment

Hereinafter, a device system according to an eighth exemplary embodiment will be described. In the eighth exemplary embodiment, when the user gives an instruction to use a file (a use request) to the automatic response AI (for example, when information of a file is transmitted to the automatic response AI), the display of the conversation partner who is making a reply is switched to display of the file, on an interface for making a conversation with the automatic response AI (for example, the screen 48). Hereinafter, the eighth exemplary embodiment will be described in detail.

Figure 44:
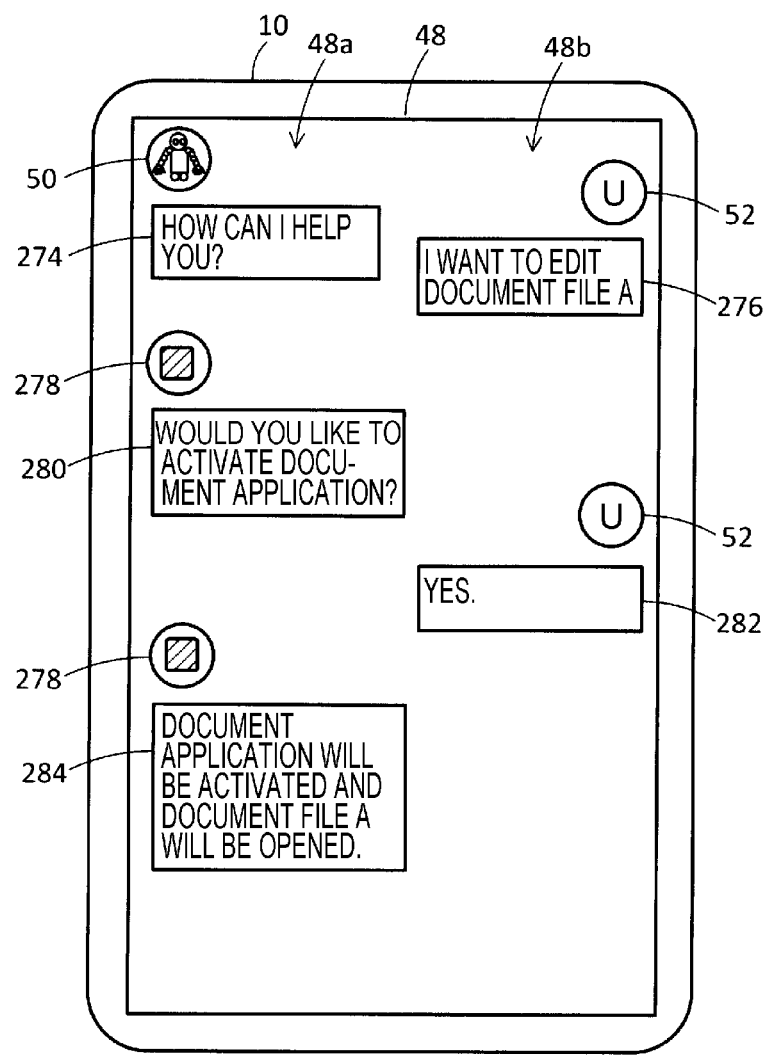
FIG. 44 is a view illustrating a screen.

FIG. 44 illustrates the screen 48. As in FIG. 8, the screen 48 displays the image 50 associated with the automatic response AI, the image 52 associated with the user, and information indicating a conversation between the user and the automatic response AI.

For example, a message content 274 that "How can I help you?" is displayed in the display area 48*a* as a message content of the automatic response AI. Since the message content 274 is a message content made by the automatic response AI, the controller 26 displays the image 50 associated with the automatic response AI in the display area 48*a*, and displays the message content 274 in the display area 48*a* as a message content associated with the image 50 of the automatic response AI. In addition, the automatic response AI does not depend on a device, and may be a general-purpose automatic response AI.

When the user designates a file in response to the message content 274, the specifying unit 28 (the specifying unit 28 implemented by the automatic response AI) identifies the file. For example, it is assumed that the user makes a message content 276 of "I want to edit document file A" which indicates an instruction to use a file (a use request). The controller 26 displays the message content 276 including the information of the document file A in the display area 48*b* as a message content of the user, and transmits the message content 276 to the automatic response AI. Accordingly, the information of the document file A is transmitted to the automatic response AI. The message content 276 is displayed in the display area 48*b* as a message content associated with the image 52 of the user. The user may input a character string indicating the file (for example, a file name) as a message content of the user to the terminal device 10, or designate a file image associated with the file (for example, an image such as an icon) as a message content of the user as in the fourth exemplary embodiment described above, by operating the UI unit 20. When designating a file image, as illustrated in FIG. 34, the user may select the file image associated with the file to be used from the stock area 170 and move the file image to the position where a message content of the user is displayed, so as to designate the file image as a message content of the user.

When the user designates the file and the file is identified, the controller 26 switches the display of the conversation partner from the display of the general-purpose automatic response AI to display of the file designated by the user.

In addition, even though the display of the conversation partner is switched from the display of the general-purpose automatic response AI to the display of the file, the conversation partner itself of the user is the general-purpose automatic response AI. That is, a message content of the conversation partner is created by the general-purpose automatic response AI equipped in the terminal device 10.

In the example described above, since the document file A is designated as a file to be used, the controller 26 displays a file image 278 associated with the document file A in the display area 48*a* as an image associated with a conversation partner in place of the image 50 associated with the automatic response AI. The file image 278 is, for example, an icon. In addition, the controller 26 may display a character string indicating the document file A (for example, a file name) in the display area 48*a* as information indicating a conversation partner in place of or along with the file image 278.

Further, the controller 26 displays a message content 280 that "Would you like to activate document application?" in the display area 48*a* as a message content of the document file A. The message content 280 itself is created by the general-purpose automatic response AI. In order to act as if the document file A makes the message content 280, the controller 26 displays the message content 280 in the display area 48*a* as a message content associated with the file image 278 of the document file A.

When the user instructs to activate the document application as in a message content 282 in response to the message content 280 above, the controller 26 activates the document application according to the instruction. At this time, the controller 26 displays a message content 284 indicating that the document application is to be activated and the document file A is to be opened (the document file A is to be displayed to be editable), in the display area 48*a* as a message content of the document file A. At this time as well, the controller 26 displays the file image 278 associated with the document file A in the display area 48*a*, and displays the message content 284 in the display area 48*a* as a message content associated with the file image 278 of the document file A. In addition, the message content 284 itself is created by the general-purpose automatic response AI.

Thereafter, the user edits the document file A by using the document application. When the editing is completed, the controller 26 displays the image 50 associated with the general-purpose automatic response AI in the display area 48*a* as an image associated with a conversation partner in place of the file image 278 associated with the document file A.

As described above, according to the eighth exemplary embodiment, when an instruction to use a file (a use request) is given to the automatic response AI (for example, when information of a file is transmitted to the automatic response AI), the display of the conversation partner is switched to the display of the file, on the screen 48 for making a conversation with the automatic response AI. Accordingly, the user may visually confirm whether the process on the file may be performed.

In addition, the function image associated with the software (the application) for processing the file may be displayed in the display area 48*a* as an image associated with a conversation partner along with the file image associated with the file. In the example described above, the function image associated with the document application may be displayed in the display area 48a along with the file image 278 associated with the document file A.

Modification 10 may be applied to the eighth exemplary embodiment. For example, when the program of the automatic response AI is assigned to each file, and the program of each automatic response AI is installed in the terminal device 10, the controller 26 may switch the display of the conversation partner from the display of the general-purpose automatic response AI to the display of the file, and switch the automatic response AI which is the conversation partner of the user from the general-purpose automatic response AI to the automatic response AI assigned to the file.

Modification 12 may be applied to the eighth exemplary embodiment. For example, when the user gives an instruction to use plural files (a use request) to the automatic response AI (for example, when the user transmits information of plural files as information of objects to be linked to the automatic response AI), the display of the conversation partner who is making a reply is switched from the display of the general-purpose automatic response AI to display of the plural files. Hereinafter, the process in a case where Modification 12 is applied to the eighth exemplary embodiment will be described with reference to FIG. 45.

Figure 45:
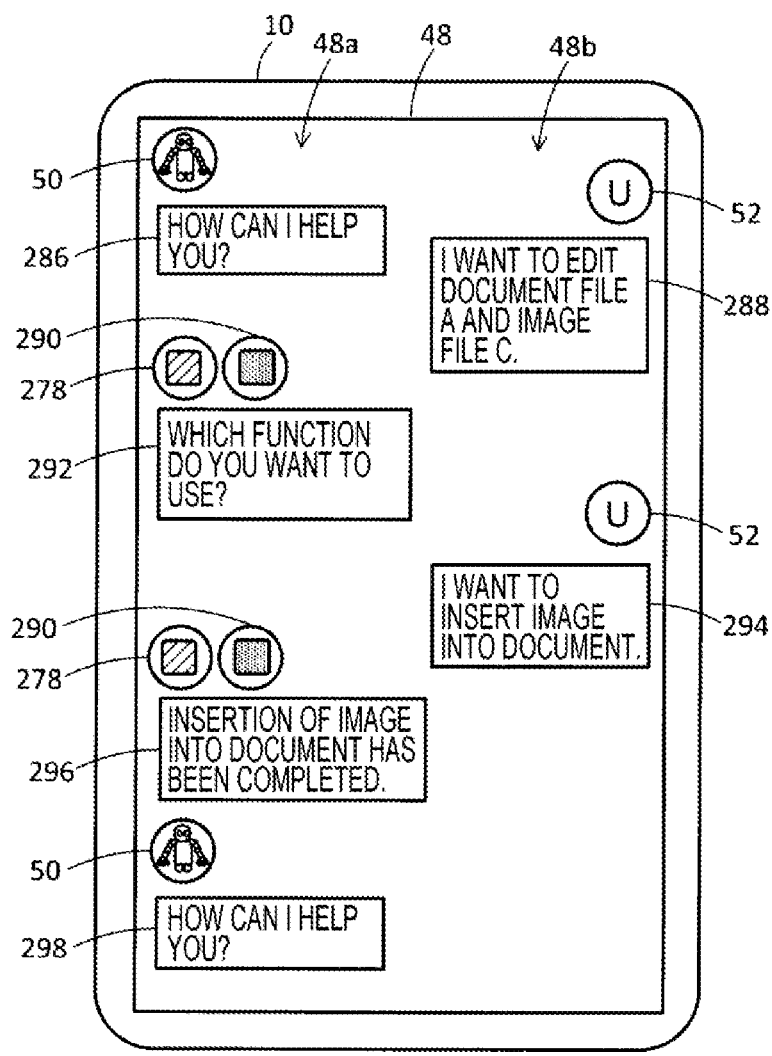
FIG. 45 is a view illustrating a screen.

FIG. 45 illustrates the screen 48. As in FIG. 8, the screen 48 displays the image 50 associated with the automatic response AI, the image 52 associated with the user, and information indicating a conversation between the user and the automatic response AI.

As in the example illustrated in FIG. 44, a message content 286 that "How can I help you?" is displayed in the display area 48a as a message content of the automatic response AI.

When the user designates plural files as files to be linked in response to the message content 286, the specifying unit 28 (the specifying unit 28 implemented by the automatic response AI) identifies the plural files as files to be linked. For example, it is assumed that the user makes a message content 288 of "I want to edit document file A and image file C" which indicates an instruction to use plural files (a use request). The controller 26 displays the message content 288 including the information of the document file A and the image file C in the display area 48b as a message content of the user, and transmits the message content 288 as information of objects to be linked to the automatic response AI. Accordingly, the information of the document file A and the image file C is transmitted as information of the files to be linked to the automatic response AI. The user may input character strings indicating the plural files (for example, file names) as a message content of the user to the terminal device 10, or designate file images associated with the files (for example, icons) as a message content of the user as in the fourth exemplary embodiment, by operating the UI unit 20. When designating file images, as illustrated in FIG. 34, the user may select the plural file images from the stock area 170 and move the plural file images to the position where a message content of the user is displayed, so as to designate the plural file images as a message content of the user.

The specifying unit 28 specifies a linkage function executable by using the plural files designated by the user by referring to, for example, the linkage function management table illustrated in FIG. 33. In the example described above, since the document file A and the image file C are designated, for example, the "function of inserting an image into a document" or the "function of superimposing a document on an image" is specified as a linkage function.

When the user designates the plural files and the plural files are identified, the controller 26 switches the display of the conversation partner from the display of the general-purpose automatic response AI to display of the plural files designated by the user.

In the example described above, since the document file A and the image file C are designated as files to be linked, the controller 26 displays the file image 278 associated with the document file A and a file image 290 associated with the image file C in the display area 48a as images associated with conversation partners in place of the image 50 associated with the automatic response AI. In addition, the controller 26 may display character strings indicating the document file A and the image file C (for example, file names) in the display area 48a as information indicating conversation partners in place of or along with the file images 278 and 290.

Further, the controller 26 displays a message content 292 that "Which function do you want to use?" in the display area 48a as a message content of the document file A and the image file C. The message content 292 itself is created by the general-purpose automatic response AI. In order to act as if the document file A and the image file C make the message content 292, the controller 26 displays the message content 292 in the display area 48a as a message content associated with the file image 278 of the document file A and the file image 290 of the image file C. The controller 26 may display a list of linkage functions specified by the specifying unit 28 in the display area 48a as a message content of the document file A and the image file C.

In response to the message content 292 described above, the user inputs a linkage function that the user wants to execute, as a message content of the user to the terminal device 10. In the example illustrated in FIG. 45, a message content 294 that "I want to insert an image into a document" which indicates a linkage function is input as a message content of the user to the terminal device 10.

The controller 26 specifies the linkage function requested by the user by analyzing the message content 294 of the user, and controls execution of the linkage function. In the example described above, the controller 26 activates the document application and the image application so as to insert the image file C into the document file A.

When the execution of the linkage function is completed, the controller 26 displays a message content 296 indicating that the execution of the linkage function has been completed, in the display area 48a as a message content of the document file A and the image file C. At this time as well, the controller 26 displays the file image 278 associated with the document file A and the file image 290 associated with the image file C in the display area 48a, and displays the message content 296 in the display area 48a as a message content associated with the file image 278 of the document file A and the file image 290 of the image file C. In addition, the message content 296 itself is created by the general-purpose automatic response AI.

When the execution of the linkage function is completed, the controller 26 displays the image 50 associated with the general-purpose automatic response AI in the display area 48a as an image associated with a conversation partner in place of the file image 278 associated with the document file A and the file image 290 associated with the image file C. Further, the controller 26 displays a message content 298 that "How can I help you?" which indicates a common question in the display area 48*a* as a message content of the automatic response AI.

In addition, the controller 26 may display a document editing screen and an image editing screen on the display unit of the UI unit 20 by activating the document application and the image application. When the linkage function described above is executed, the document file A in a state where the image file C is inserted into the document file A is displayed on the document editing screen. The user may edit the document file A or the image file C on the document editing screen. At the time point when the editing is ended or started, the controller 26 displays the image 50 associated with the general-purpose automatic response AI in the display area 48*a* as an image associated with a conversation partner in place of the file images 278 and 290.

In addition, the function image associated with the software (the application) for processing the file may be displayed in the display area 48*a* as an image associated with a conversation partner along with the file image associated with the file. In the example described above, a function image associated with the document application and a function image associated with the image application may be displayed in the display area 48*a* along with the file images 278 and 290.

As described above, in a case where Modification 12 is applied to the eighth exemplary embodiment, when an instruction to use plural files to be linked (a use request) is given to the automatic response AI (for example, when information of plural files to be linked is transmitted to the automatic response AI), the display of the conversation partner is switched to the display of the plural files, on the screen 48 for making a conversation with the automatic response AI. Accordingly, the user may visually confirm whether the process on the plural files may be performed.

In addition, when the plural files are displayed as conversation partners, the conversation partner of the user may be the general-purpose automatic response AI or may be switched from the general-purpose automatic response AI to the automatic response AIs equipped in the respective files.

In the example illustrated in FIG. 45, information of two files is transmitted to the automatic response AI. However, information of three or more files (for example, three or more file images or character strings indicating three or more files) may be transmitted to the automatic response AI. In this case, the three or more file images are displayed in the display area 48*a* as images associated with conversation partners in place of the image 50 associated with the automatic response AI.

In addition, Modification 13 may be applied to the eighth exemplary embodiment. That is, in the eighth exemplary embodiment as well, each device image may be displayed according to the display examples illustrated in FIGS. 39A to 39E and FIGS. 40A to 40E.

In addition, the combination of objects to be linked is not limited to those in the fifth to eighth exemplary embodiments. For example, when information of a combination of at least two of a device, a function (including a function executed by a device and a function executed by software), a file, or software is transmitted as information of objects to be linked to the automatic response AI, the display of the general-purpose automatic response AI may be switched to display of the combination.

For example, when information of a device and a file (for example, a device image and a file image) is transmitted as a message content of the user to the automatic response AI, the controller 26 switches the image associated with the conversation partner from the image 50 associated with the general-purpose automatic response AI to the device image and the file image. As a specific example, when the information of the multifunction machine B and the document file is transmitted as a message content of the user to the automatic response AI, the controller 26 switches the image associated with the conversation partner from the image 50 associated with the general-purpose automatic response AI to the device image associated with the multifunction machine B and the file image associated with the document file.

Similarly, when information of software and a file (for example, a function image associated with software and a file image) is transmitted as a message content of the user to the automatic response AI, the controller 26 switches the image associated with the conversation partner from the image 50 associated with the general-purpose automatic response AI to the function image and the file image. As a specific example, when the information of the document application and the document file is transmitted as a message content of the user to the automatic response AI, the controller 26 switches the image associated with the conversation partner from the image 50 associated with the general-purpose automatic response AI to the function image associated with the document application and the file image associated with the document file.

In addition, when information of a device, a function, and a file is transmitted as a message content of the user to the automatic response AI, the controller 26 switches the image associated with the conversation partner from the image associated with the general-purpose automatic response AI to the device image, the function image, and the file image. As a specific example, when the information of the multifunction machine B, the document application, and the document file is transmitted as a message content of the user to the automatic response AI, the controller 26 switches the image associated with the conversation partner from the image 50 associated with the general-purpose automatic response AI to the device image associated with the multifunction machine B, the function image associated with the document application, and the file image associated with the document file.

The combinations in the specific examples described above are merely examples. When information of another combination of a device, a function, a file, and software is transmitted to the automatic response AI, the display of the general-purpose automatic response AI may be switched to display of the combination.

Each of the terminal device 10, the devices 12 and 14, and the server 16 is implemented by, for example, cooperation of hardware and software. Specifically, each of the terminal device 10, the devices 12 and 14, and the server 16 includes one processor or plural processors such as a CPU (not illustrated). The function of each unit of the terminal device 10, the devices 12 and 14, and the server 16 is implemented in the manner that the one processor or the plural processors read and execute a program stored in a storage device (not illustrated). The program is stored in the storage device via a recording medium such as a CD or a DVD or a communication path such as a network. As another example, each unit of the terminal device 10, the devices 12 and 14, and the server 16 may be implemented by, for example, a hardware resource such as a processor, an electronic circuit, or an application specific integrated circuit (ASIC). For the implementation, a device such as a memory may be used. As yet another example, each unit of the terminal device 10, the devices 12 and 14, and the server 16 may be implemented by, for example, a digital signal processor (DSP) or a field programmable gate array (FPGA).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
a processor that controls to display an image of a speaker associated with information related to an object to be linked when a user transmits the information of the object to be linked to a conversation partner on an interface for making a conversation with the conversation partner, wherein
the image of the speaker associated with the information related to the object to be linked is an image associated with one or a combination of a device, a software, a file, and a function.

2. The information processing device according to claim 1, wherein
the image associated with the device is an external appearance image of the device.

3. The information processing device according to claim 2, wherein the external appearance image is obtained by capturing the device.

4. The information processing device according to claim 3, wherein the processor transmits the captured external appearance image to the conversation partner after the conversation partner makes a question about the device.

5. The information processing device according to claim 1, wherein
the object to be linked includes portions of the device, and
when information of the portions which corresponds to information of the object to be linked is transmitted to the conversation partner, the processor controls a notification of a linkage function executable by using the portions.

6. The information processing device according to claim 5, wherein as the notification of the linkage function, the processor controls a notification of an interface configured to control the device in order to execute the linkage function.

7. The information processing device according to claim 1, wherein
the object to be linked includes pieces of software, and
when information of the pieces of software which corresponds to information of the object to be linked is transmitted to the conversation partner, the processor controls a notification of a linkage function executable by using the pieces of software.

8. The information processing device according to claim 1, wherein
the object to be linked includes the file, and
when information of the file which corresponds to information of the object to be linked is transmitted to the conversation partner, the processor controls a notification of a linkage function executable by using the file.

9. The information processing device according to claim 8, wherein the processor changes the notification of the linkage function according to a format of the file.

10. The information processing device according to claim 1, wherein
the object to be linked is a combination of at least two of a device, a function, a file, or software, and
when information of the combination which corresponds to information of the object to be linked is transmitted to the conversation partner, the processor controls a notification of a linkage function executable by using the combination.

11. The information processing device according to claim 1, wherein
when there are a plurality of objects to be linked, a plurality of images of the speaker are displayed.

12. The information processing device according to claim 11, wherein
an instruction to execute a linkage function is given with a function of the plurality of displayed images of the speaker.

13. The information processing device according to claim 11, wherein
when information of the plurality of objects to be linked is transmitted to the conversation partner, the processor controls a notification of a linkage function which is executable by using the plurality of objects to be linked.

14. The information processing device according to claim 11, wherein the processor changes the notification of the linkage function according to an order of transmitting the information of the plurality of objects to be linked.

15. The information processing device according to claim 11, wherein when images representing the plurality of objects to be linked are transmitted to the conversation partner, the processor controls the notification of the linkage function executable by using the plurality of objects to be linked.

16. A non-transitory computer readable medium storing a program causing a computer to execute information processing, the information processing comprising:
controlling a display of an image of a speaker associated with information related to an object to be linked when a user transmits information of the object to be linked to a conversation partner on an interface for making a conversation with the conversation partner, wherein
the image of the speaker associated with the information related to the object to be linked is an image associated with one or a combination of a device, a software, a file, and a function.

* * * * *